(12) United States Patent
Meyer et al.

(10) Patent No.: US 11,548,833 B2
(45) Date of Patent: Jan. 10, 2023

(54) METHOD TO FORMULATE HUMIC SUBSTANCES

(71) Applicants: Michael J. Meyer, Albuquerque, NM (US); Timothy J. Strosnider, Albuquerque, NM (US); Charles E. Christmann, Albuquerque, NM (US); Craig White, Albuquerque, NM (US)

(72) Inventors: Michael J. Meyer, Albuquerque, NM (US); Timothy J. Strosnider, Albuquerque, NM (US); Charles E. Christmann, Albuquerque, NM (US); Craig White, Albuquerque, NM (US)

( * ) Notice: Subject to any disclaimer, the term of this patent is extended or adjusted under 35 U.S.C. 154(b) by 421 days.

(21) Appl. No.: 16/736,736

(22) Filed: Jan. 7, 2020

(65) Prior Publication Data
US 2020/0385320 A1    Dec. 10, 2020

Related U.S. Application Data

(63) Continuation-in-part of application No. 14/622,370, filed on Feb. 13, 2015, now abandoned.

(51) Int. Cl.
*C05G 3/80* (2020.01)
*C05G 5/10* (2020.01)
(Continued)

(52) U.S. Cl.
CPC .............. *C05G 3/80* (2020.02); *C05F 3/00* (2013.01); *C05F 5/002* (2013.01); *C05F 17/50* (2020.01); *C05G 5/10* (2020.02); *C05G 5/20* (2020.02)

(58) Field of Classification Search
None
See application file for complete search history.

(56) References Cited

U.S. PATENT DOCUMENTS

| 5,951,978 | A  | * | 9/1999 | Red'kina | ................ | C12N 1/205 |
| | | | | | | 435/252.4 |
| 8,361,186 | B1 | * | 1/2013 | Shearer | .................... | C05G 5/12 |
| | | | | | | 71/21 |

(Continued)

FOREIGN PATENT DOCUMENTS

WO     WO 2020/002472 A1 *  1/2020  ............. A01N 43/10

*Primary Examiner* — Wayne A Langel
(74) *Attorney, Agent, or Firm* — Alexander Chen, Esq.

(57) ABSTRACT

A method of formulating novel humic material is disclosed comprising mixing one or more portions of Dimethylphenylpiperazinium (DMPP) with one or more portions of N—(N-butyl) thiophosphoric triamide (NBPT) with one or more portions of Isobutylidene-diurea (IBDU) with one or more portions of Polyaspartic Acid with one or more portions of Chitosan and a portion of Mycorrhizae and *Rhizobia* to form a portion of biostimulant material; obtaining a portion of seaweed harvest and crushing and drying said portion of seaweed to form a portion of seaweed powder; Obtaining a portion of leonardite and crushing said portion of leonardite to form a portion of humic raw material; mixing one or more portion of animal manure with one or more portion of stover with one or more portion of organic waste to form a portion of compositing mix and composting said compositing mix to form a portion of composted product; obtaining a portion of plant waste and subjecting said portion of plant waste through an anaerobic combustion to form a portion of bio char; mixing said portion of bio char with said portion of composted product with said portion of humic product to form a portion of humic processed material; adding a portion of artificial taggant to said humic processed material to form tagged humic product; mixing said tagged humic product with said portion of biostimulant material to form a portion of biostimulant humic product; adding a taggant to said portion of biostimulant humic product to form a portion of tagged biostimulant humic (Continued)

product; mixing one or more portion of phosphorus with a portion of potassium and a portion of nitrogen and a portion of trace minerals to form portion of raw fertilizer; mixing said portion of raw fertilizer with said portion of tagged biostimulant humic product to form a portion of tagged fertilized biostimulant humic product.

16 Claims, 14 Drawing Sheets

(51) Int. Cl.
| | | |
|---|---|---|
| *C05F 17/50* | (2020.01) | |
| *C05F 3/00* | (2006.01) | |
| *C05F 5/00* | (2006.01) | |
| *C05G 5/20* | (2020.01) | |

(56) References Cited

U.S. PATENT DOCUMENTS

| | | | |
|---|---|---|---|
| 2006/0107589 A1* | 5/2006 | Rubin | B01J 20/16 47/59 S |
| 2015/0307408 A1* | 10/2015 | Thorpe | C05C 3/00 71/7 |
| 2017/0283335 A1* | 10/2017 | Rainey | C05D 3/00 |
| 2019/0048260 A1* | 2/2019 | Waliwitiya | C09K 15/06 |
| 2019/0345076 A1* | 11/2019 | Gaunt | C05F 17/80 |

* cited by examiner

PRIOR ART

PRIOR ART

Principal Global Carbon Pools.

PRIOR ART

PRIOR ART

PRIOR ART

PRIOR ART

METHOD TO FORMULATE HUMIC SUBSTANCES

CROSS REFERENCE TO RELATED APPLICATIONS

This application is a continuation in part of, and claims benefit of priority to, U.S. patent application Ser. No. 14/622,370 filed Feb. 13, 2015, which is hereby incorporated by reference in its entirety as if fully set forth herein.

TECHNICAL FIELD

The present disclosure relates to Humic substances technology, in particular, a green gas credit applied humic substances.

BACKGROUND

The earth's atmosphere is a complex gaseous system that is essential to support life on planet Earth. The atmosphere shields the planet from the harsh conditions that exist in space. The earth's atmosphere largely defines the planet's climate and acts like the glass in a greenhouse. In a greenhouse, energy from the sun passes through the glass and is absorbed by objects in the greenhouse including the plants and soil. Much of the absorbed energy is converted to heat, which warms the greenhouse. The glass helps maintain the greenhouse warmth by trapping this heat. While an estimated 31% of the energy received from the sun as sunlight is reflected back to space by the earth's atmosphere and surface (particularly those portions of the surface that are covered by snow and ice), 20% is absorbed by the atmosphere, and the remaining 39% portion of incoming radiation is absorbed by the earth's oceans and land, where it is converted into heat, warming the surface of the earth and the air above it. On an ongoing basis, the earth's average temperature is determined by the overall balance between the amount of energy that is received from the sun, the amount of radiant heat that is developed because of the atmosphere, and the amount that is reflected back to space. Certain naturally occurring gases in the atmosphere help to establish and maintain this balance. Water vapor is considered to be the largest contributor to the natural greenhouse effect. Other gases that naturally occur in smaller quantities in the atmosphere also contribute to the natural greenhouse effect. These gases include carbon dioxide, methane, and nitrous oxide. This natural balance, however, can be upset by a variety of factors including the overabundance of one or more of the natural greenhouse gases in the atmosphere.

The recent warming of the earth's climate has been largely attributed to human activity, primarily the release of greater amounts of carbon dioxide and other greenhouse gases (each a "GHG") into the atmosphere. These gases enhance the insulating properties of the atmosphere, reducing heat loss, thereby warming the planet. Continued emission of these gases is the primary cause for concern about climate change now and into the immediate future. Particularly important is the emission of carbon dioxide, which is released through the combustion of carbon-based fossil fuels. In some countries, over 80% of total national greenhouse gas emissions are associated with the production or consumption of fossil fuels for energy purposes. Some examples of GHGs are carbon dioxide, methane, perfluorocarbons, nitrous oxide, sulfur hexafluoride, and hydrofluorocarbons. The amount of global warming that a certain GHG can produce is often measured as the "carbon dioxide equivalent", that is, in terms of the amount of warming potential that carbon dioxide would produce.

A variety of strategies and policies have been proposed over the years by which the "carbon footprint"—that is, the amount of greenhouse gas emitted by a specific source—can be identified and reduced.

On a larger scale, governments have taken steps to limit emissions of carbon dioxide and other greenhouse gases. The reduction of the emission of greenhouse gases and global warming was a subject addressed at the 1992 United Nations Conference on Environment and Development. From this Conference, the United Nations Framework Convention on Climate Change resulted. This Treaty called for protocols to take place from time to time, the most famous of which is the Kyoto Protocol. This Protocol committed countries that became parties to the Treaty to reduce greenhouse gas emission based on the premises that global warming is occurring and the man-made carbon dioxide has caused it. Governments have also implemented a variety of measures to limit emissions of carbon dioxide and other greenhouse gases and, in some cases, put taxes on carbon emissions and higher taxes on fossil fuels.

A variety of individual and industrial strategies and policies have been proposed over the years to reduce greenhouse gas emissions. Individuals and companies are attempting to curb global warming by various conservation measures, recycling programs, driving and flying less, using lower amounts of highly processed products and components, and sourcing product and components locally. Much of these commonly adopted measures focus on reducing transportation and therefore the release of carbon dioxide and other gases from the combustion of fossil fuels to reduce greenhouse gas emissions. However, reductions in other economic sectors can produce significant reduction in greenhouse gas emissions.

The emissions from the agricultural sector are known to be very substantial. It is estimated that one fifth of all global GHG emissions are currently due to agriculture. Forty percent of this amount comes from direct agricultural production, another forty percent is caused by agriculture's role in driving deforestation and the loss of peat and fires, and twenty percent is caused by the use of fossil fuels along the agricultural supply chain and for on-farm machinery. Direct agricultural production emissions include two important greenhouse gases: nitrous oxide ($N_2O$) and methane ($CH_4$). Nitrous oxide is estimated to have a global warming potential that is 310 times that of carbon dioxide. Methane is estimated to have a global warming potential that is 23 times that of carbon dioxide.

The causes of some of these large amounts of GHG emissions are known and therefore may be susceptible to reduction. For example, 15% of direct agricultural emissions are due to the use of synthetic fertilizers. Synthetic fertilizers are problematic because coal is often used in the production of this product, particularly in developing countries, instead of the more efficient natural gas. Also, farmers tend to over apply nitrogen fertilizers to crops as insurance against low yields. However, by applying large amounts of nitrogen fertilizer to crops, the potent GHG nitrous oxide may be emitted similarly in large amounts.

Similarly, irrigation is also known to cause GHG emissions. The need to obtain and distribute water for crops in areas that do not have ready sources of water requires that fossil fuels be used not only to build but also to operate the pumps and other components of the irrigation systems.

The steps that can be taken to change current practices in the agricultural sector and reduce the GHG emissions by this sector are often known. For example, a reduction in the over application of synthetic fertilizers can be realized if farmers adopt better accounting practices by which they know how much fertilizer is needed for a particular crop and when that amount has been applied. To illustrate, it is thought that China—considered, like the U.S., and to a lesser degree, India, and the E.U., to be a "hotspot" for nitrogen fertilizer overuse—could reduce fertilizer application rates by 30 to 60 percent without harming yields. Switching to organic fertilizers can also help simply because lower amounts of fossil fuels are needed to produce them.

Better water management practices and the improvement of agricultural soils can similarly reduce the need for and constant operation of irrigation systems and thereby GHG emissions. The steady growth of GHG emissions may also be curtailed if agricultural output is intensified rather than expanded. Expansion requires the conversion of more land to agricultural purposes. Such conversion can involve the deforestation of land and thereby the destruction of a natural sink for carbon dioxide. Intensification, on the other hand, seeks to produce more with the same amount of land. Intensification practices include changing the varieties and breeds grown on the land, altering the substances used as fertilizers, and improving irrigation practices.

Even though many measures to reduce GHG emissions are known, farmers often fail to adopt many of them. One such reason for the reluctance is that at least some farmers may not appreciate that GHGs are air pollutants and air pollution can interfere with photosynthesis, stunt overall plant growth, and ultimately lessen agricultural yields. Another reason is that the benefits that farmers can realize by changing their practices to produce reductions in GHG emissions are difficult to quantify in economic terms. To illustrate this point, a naturally-occurring substance, humate, will now be discussed.

Humates are considered to be the most widely distributed organic substance resulting from biosynthesis on the planet. These substances—found in soils, peat beds, and coal deposits and in varying concentrations in rivers, lakes, and oceans—result from the decomposition of plant and animal matter. Given their diverse origins, humates are heterogeneous substances that may contain a variety of organic components—including aromatic and heterocyclic structures, carboxyl groups, nitrogen, fragments of DNA and RNA—and inorganic components—such as minerals. Humates may possess active hydrogen bonding sites, making the humate chemically reactive. The varied humate compositions are often considered to be composed of three fractions, commonly termed humic acid, fulvic acid, and humin. Humates are often termed humic substances.

The varied chemical compositions of humates make it possible for them to have varied chemical activities and allow them to achieve various functionalities. Humates, when used as a soil amendment or conditioner, have been shown to produce various localized benefits to soil—including increased soil aeration, decreased soil density, increased soil moisture, and overall promotion of soil health—and to plants—including increased root density, increased root depth, and increased nutrient uptake. Overall, the use of this naturally occurring substance in agricultural production can reduce the need for nitrogen fertilizers—thereby reducing the $N_2O$ emissions and $CO_2$ emissions associated with the production and application of such materials—and the same amounts of water needed by crops grown on soils on which humates have not been applied. Humates may also be used in efforts to remove toxins from soils and make the solid suitable for other uses. This global benefit of decreasing carbon emission by using humate during agriculture production demonstrates the localized benefit that is derived from crops grown with more natural-occurring levels of humate.

Carbon credits and carbon markets are components of national and international programs to reduce the growth in concentrations of greenhouse gases. One carbon credit is equal to one ton of carbon dioxide, or in some markets, gases that are equivalent to carbon dioxide. By capping greenhouse gas emissions, markets are established by which emissions can be financially transferred. Those who seek to emit more GHGs than they are permitted must purchase credits from those who have carbon credits, for example, by reducing their own carbon emissions.

Because GHG mitigation projects can generate credits, and therefore have financial value, an individual or company may be able to quantify the true cost of a carbon reduction strategy and obtain the financial backing to undertake it. For example, a famer seeking to apply a humic substance may find that the cost of the humic substance is higher than the cost of a synthetic fertilizer. However, the farmer also may determine that, by applying a humic substance instead of the synthetic fertilizer, the GHG emissions from the farming operation will decrease in the short run and in the long run. In the short run, the nitrous oxide emissions from the use of synthetic fertilizers will be eliminated. In the longer run, given that humic substances can improve the water retention capacity of soils, the need for irrigation may be lessened, thereby reducing carbon dioxide emissions. A farmer that can certify the application of such a substance and therefore the reduction in GHG emissions can use the reduction to generate a credit that can be sold. The financial return can aid the farmer to reduce the cost of the taking on the strategy.

A demand therefore exists for a system and methods to certify, quantify, verify, register, track and monetize the use and benefits derived from a naturally-occurring substance. Additionally a demand exists for system and methods through the use of which the benefits produced on agricultural land may be organized, quantified, compared, and managed. The present invention satisfies these demands.

Further, fraud in the greenhouse gas/water quality trading offset markets is pervasive, such that it is desirable now to track and validate such sort of processes, particularly if GHG credits are to be sold or exchanged with $3^{rd}$ parties who were not part of creating the credits. Additionally, the cost of creating offsets is often higher than the value of current market prices such that more practical cost benefit efforts must be enabled by way of tracking GHG reduction efforts with a greater granularity.

To date, efforts to identify offset potential has mostly focused on fossil fuel CO2 sequestration projects which are in many cases over budget and behind schedule. However, nitrous oxide (N2O), a greenhouse gas (GHG) with approximately 300 times more global warming potential than CO2, accounts for 6% of the GHG emissions in the United States. Seventy five percent of N2O emissions come from synthetic nitrogen (N) fertilizer usage in the agriculture sector primarily due to excess fertilization.

The "lowest hanging fruit" and the least costly carbon credits to create may in fact result from incentivizing the use of readily available, inexpensive, alternative bio-stimulant products, in this case, humus-based substances being applied towards agricultural and reclamation purposes in lieu of currently utilized nitrogen based commercial fertilizers.

The applications of humic substances to soils has many direct and indirect benefits in terms of lowering a farmer's overhead costs while maintaining or even increasing their crop yield. Additionally, humic substances are naturally occurring and do not carry with them the same soil and water table toxicity issues that commercial grade nitrogen-based fertilizers suffer from. As an added benefit, humic substances are typically located above coal and other mining veins and are discarded as waste product by the mining industry. As such, humate is inexpensive, accessible, and a large amount of is already mined and literally going to waste.

Despite the benefit, farming is not unlike most ancient industries, and adaptation and overcoming engrained behaviors is a problem unto itself. Fortunately, money motivates even the most stubborn.

As such, there is a need to create a protocol that incentivizes farmers to change their behavior such that there is a reduction in greenhouse gases, which addresses the much larger concern of climate change.

Traditional carbon credit systems reward participants with credits which operate as a commodity which carries with it ownership and contract rights and may be bought, sold, redeemed and applied towards GHG output as an offset, speculated, and the like.

However, unlike gold, silver, pork bellies, and all the other commodities bought and sold, carbon credits are unique in that they represent a net tonnage of GHG that wasn't created. Carbon credits cannot be packaged, transported, put in a safe, or even observed like traditional commodities, effectively carbon credits only exist on the ledger of whoever issued the carbon credit.

The effect of this is several disparate protocols for issuing carbon credits across a variety of issuers, which brings with it a lack of certainty in the carbon credits themselves. Further, without consensus across issuers, one issuer may have stricter standards for what merits issuance of carbon offsets versus another issuer. One carbon offset may be more trusted than another, whereas the commodities market requires that 1 oz of gold in Texas be the same volume and weight as an oz of gold in New Mexico. As such, not all carbon credits are viewed as equal, which complicates monetization and trading.

Likewise, having several disparate protocols brings with it substantial issues as to records and verification. As currently not all carbon credits are viewed the same, so too are the records and ledgers behind these different protocols differ. Traditional assets carry with them historical data, which are often as important as the asset themselves. Real property and substantial assets such as vehicles or artifacts necessitate tracking the title of the asset; when the home was built, who built the home, the ownership history of the home, and so on. This historical data brings with it assurances and peace of mind for both buyer and seller and creates stability within the asset class.

Current carbon credit models have yet to adequately address this need of tracking and cataloging credit creation, by who, when, how, and all of the various transfers of the credit that may take place long after issuance.

Cumulatively then, it can be said that carbon credits are ethereal and exist on many different systems and ledgers, which necessarily introduces the potential for fraud. There is little stopping a bad actor from simply creating credits from nothing.

Recently blockchain architecture has come to the forefront of the computing industry. Blockchain, a system where a singular ledger exists in many copies across many computers proposes that as communication and CPU speeds are now sufficient, consensus across a threshold amount of those computers can itself propel computer processes and be resistant to the traditional issues a localized server farm would face—downtime, fraud, data loss, and so on. In fact, many of the fledgling blockchain projects have illustrated that with consensus, data can be accessible, public, and even manipulated by participants, and the consensus driven protocol will maintain order and stability, discarding and reverting "bad" data.

As such, it is now possible to create a blockchain that would ground the ethereal carbon credit in reality. It is now possible, using blockchain architecture, to track the soil amendment the farmer would be using on their crops with such granularity that one could track what the specific mixture was, where it was purchased, where it was produced, what precursors were used to produce this particular fertilizer, and the history of the precursors which were mined, harvested, or otherwise.

Similarly, in the opposite direction it may be tracked when the farmer was rewarded, what actions the farmer took to be rewarded, and the subsequent buy, sell, and ultimately redemption and retirement history of the carbon credit.

There is a need to create a "Life Cycle Approach" (LCA) similar to the environmental industry methods for tracking hazardous waste (cradle to grave) and water samples (chain-of-custody) that addresses this particularized need for GHG credit creation, validation, verification, and retirement based upon the use of humic based bio-stimulant products, a LCA will bring the reassurances necessary to finally codify what a carbon credit actually represents, and backing each credit with title history may be the threshold catalyst which finally opens up the carbon credit market and places it on similar if not better basis than traditional well understood commodities.

The protocol disclosed contemplates and addresses all of these issues. Further, this specification will also acknowledge and discusssome of the weaknesses of traditional blockchain architecture, and proffer that many of these weaknesses can be solved by applying a multichain or multichain variant approach whereby, like a traditional blockchain, all data is tracked, and accessible in whole or part.

However, where a traditional blockchain is a single chain whereby all operations occur on that chain, the disclosed protocol contemplates additional embodiments that speak to these multichain or multichain variants which would have the benefit of allowing for subprocesses to occur on parallel sidechains or streams. When these sidechains resolve, the sidechain may be closed out and a final optimized record created, with the main blockchain then pointing to the optimized data. The effect of this is a substantial decrease in overall size of the mainchain, while maintaining the flexibility to have as much granularity as is needed for a side/subprocess. This is particularly important when what may be important as between the mining and fertilizer operations is not necessarily critical to a party downstream who is concerned with chain of title or if the credit is redeemed and retired.

To put it another way, multichain architecture operates similar to a Microsoft Excel Spreadsheet file; within that file may be several different pages, each with its own data tracked and formulas and manipulation. The disclosed protocol enables a blockchain, the excel file, to be created and then distributed, but the multichain features would enable different users to access what is relevant to them without cluttering up the pages of other interested parties who are focused on different data.

Carbon dioxide ($CO_2$) is considered the sole culprit for global warming; however, nitrous oxide ($N_2O$), a GHG with approximately 300 times more global warming potential than CO2, accounts for 6% of the GHG emissions in the United States. While most people associate CO2 and GHG emissions with passenger vehicles, this is far from the truth. In fact, transportation as a whole accounts for only 13% of GHG emissions by source. See FIG. 10.

Agriculture activity actually by itself accounts for just slightly more GHG emissions than transportation activity. That said, the public and politicians continue to focus on vehicles as one of the primary solutions to the looming climate change crisis.

When agriculture activity is considered, it is even more surprising to find that roughly seventy five percent of all N2O emissions stem from synthetic nitrogen (N) fertilizer usage in the agriculture sector, and shockingly this is primarily due to excess fertilization. Numerous studies have shown that changes in soil management practices, specifically optimizing N fertilizer use and amending soil with organic and humate materials can reverse soil damage and actually improve a farmer's or land reclamation company's balance sheet. Soil restoration is internationally recognized as one of the lowest cost GHG abatement opportunities available. Profitability improves in two ways: (1) lower operating costs resulting from lower input costs (water and fertilizer); and (2) increased revenue by participation in emerging GHG offsets markets (nitrogen and carbon), and water quality trading markets.

Nitrogen's Role as a GHG is an Increasing Concern

Since the Industrial Revolution there has been a significant atmospheric increase in the concentration of greenhouse gases ("GHGs") which science believes has led to an increase in the average global surface temperature of 0.6° C. since the late 19th century. The current warming rate of 0.17° C./decade is greater than the critical rate of 0.1° C./decade where it is thought that ecosystems cannot adjust, and anyone following news is now familiar with the mounting concerns.

While most people only associate greenhouse gases with Carbon and human activity, GHGs are created and reuptake occurs across what can be thought of as five principal global C pools. See Chart 2 below—Principle Global Carbon Pools The total soil Carbon/Greenhouse Gas pool is four times the biotic (trees, etc.) pool and about three times the atmospheric pool. All these pools are interconnected, and elements circulate among them, but most people have yet to consider other areas to address past carbon production, vehicle use, and energy being generated from oil and coal. See FIG. 11.

In its inert form, nitrogen is harmless and abundant, and benefits crops but the addition of synthetic nitrogen-based fertilizers has brought with it the unintended consequence of diminishing soil nutrition and disrupts the beneficial associations between plants and the soil microbial communities. Cropping practices and the use of nitrogen fertilizers are estimated to cause 78% of the total soil N2O emissions in the United States. These emissions have a greenhouse warming potential 310 times that of CO2. See Table 3 below—Global Warming Potentials, Lifetimes, and Horizon by GHG. The rate of industrial nitrogen fixation now approximately equals Earth's natural rate, resulting in a two to threefold increase in the total inventory of fixed N on the surface of the Earth through agricultural fertilizer applications.

Table 3. Global Warming Potential of Select Greenhouse Gases.

Nitrous oxide is produced in the soil predominantly by the microbial processes of nitrification and denitrification. Factors that control these two processes—available carbon, inorganic nitrogen, and oxygen as affected by soil moisture, porosity, and aggregate structure—regulate production of N20.

Currently, the intensive use of N fertilizers in modern agriculture and land reclamation is rapidly increasing both C and N in the atmospheric pool and contributing to global greenhouse gas accumulation.

| GWP values and lifetimes from 2013 IPCC AR5 p.714 (with climate-carbon feedbacks) | Lifetime (years) | GWP time horizon | |
|---|---|---|---|
| | | 20 years | 100 years |
| Carbon Dioxide ($CO_2$) | 50-200 | | 1 |
| Methane ($CH_4$) | 12.4 | 86 | 34 |
| HFC-134a (hydrofluorocarbon) | 13.4 | 3790 | 1550 |
| CFC-11 (chlorofluorocarbon) | 45.0 | 7020 | 5350 |
| Nitrous Oxide ($N_2O$) | 121.0 | 268 | 298 |
| Carbon tetrafluoride ($CF_4$) | 50,000 | 4950 | 7350 |

In 2012, N2O emissions from cropland soils in the United States were approximately 195 million metric tons of CO2—equivalent (CO2e) according to the U.S. Environmental Protection Agency's 2014 National Greenhouse Gas Inventory. This is equivalent to 41 million passenger vehicles annually. As crisis looms, it is wholly unreasonable for only certain contributing activities to be targeted. Further, some human activities such as transportation methods or fuels require substantial technological advances and investment, and while it is commendable to create cleaner energy, there are clearly atmospheric pools that are neglected, and inexpensive, readily available greenhouse gas gains stemming from other sources can no longer be dismissed.

Recently, using a new method for estimating greenhouse gases that combines atmospheric measurements with model predictions, Lawrence Berkeley Laboratory researchers found that the level of nitrous oxide in California alone may be 2.5 to 3 times greater than the current inventory estimates. "If our results are accurate, then it suggests that N2O makes up not 3 percent of California's total effective greenhouse gases but closer to 10 percent." Most of California's N2O emissions are believed to come primarily from nitrogen fertilizers used in agricultural production.

Breaking the Nitrogen Cycle with Humate

By closely tracking N2O emissions, crop yields and other ecosystem responses to fertilizers, it has been shown that N2O emissions increase exponentially with increasing nitrogen fertilizer use. Researchers have also successfully demonstrated that N2O emissions in row-crop production can be substantially reduced by using less nitrogen fertilizer with no related reduction in crop yield.

In other words, adding a small amount of fertilizer above the amount needed for optimal crop growth creates much more N2O than otherwise would have been produced with negligible benefits. The more excess nitrogen there is available, the greater the additional rate of N20 production.

Further, despite a strong inter-dependence between climate and soil quality, the role of soil organic carbon (SOC) dynamics on historic increase in atmospheric CO2, and its strategic importance in decreasing the future rate of increase of atmospheric CO2 have only recently been recognized. Whereas the exact magnitude of the historic loss of SOC may be debatable, it is important to realize that the process of SOC depletion can be reversed. Further, improvements in quality and quantity of the SOC pool can increase biomass/agronomic production, enhance water quality, reduce sedimentation of reservoirs and waterways, and in and of itself helps mitigate some of the risks associated with global warming.

Thus, a transition to an optimal application of N fertilizer and attention and improvements targeting soil health provide a clear path to overall GHG reductions. One way to dramatically increase a soil's overall heath is by amending the soil with humic substances.

Soil Generally

Organic matter is defined as a grouping of carbon containing compounds which have originated from living beings and deposited on or within the earth's structural components. Soil organic matter includes the remains of all plant and animal bodies which have fallen on the earth's surface or purposely applied by man in the form of organically synthesized pesticides. A fertile soil should contain from 2 to 8 percent organic matter. Most soils in fact contain less than 2% organic matter. In acidic, nutrient leached sandy soils substantial portions of the organic matter is in the form of plant debris and fulvic acids (FAs). In neutral and alkaline soils, a large percentage of the organic matter is present in the form of humic acids (HAs) and humin.

Humic and Fulvic Substances Defined and Explained

The nomenclature and classification of humus is truly complex and confusing to the layman and professional alike. Consensus among geologists, engineers, biologists, chemists, agronomists, and regulators, is difficult, primarily owing to a lack of uniform definitions of commonly used terms across professions.

Humus is most often referred to as a mineral or as an industrial mineral. Before a substance can be defined as a mineral, a substance must satisfy the following well-established long-standing, scientific criteria accepted by the international minerals community: a) the substance must be naturally occurring; b) the substance must be inorganic; c) the substance must have a definite chemical composition; d) the substance must have a highly ordered atomic (crystalline) structure; and e) the substance must have specific physical properties. Humate satisfies only (a), therefore, humate cannot be defined as a mineral and as such humate cannot be considered either an industrial or non-metallic mineral.

Humus is actually a naturally occurring, organic compound, composed of a variety of highly weathered organic compounds, and is commonly associated with coal, lignite, shale, claystone, and mudstones. The formation of humic substances is not completely understood but what is known is that humic substances arise during the decay of organic materials. As such, humic substances are often associated with coal, lignite, and mudstones because humic substances are most commonly found during mining operations and appear in a distinct layer above coal veins. Currently, humus is considered a waste product by the mining industry and is discarded with topsoils and mine leavings and their benefits largely ignored or underutilized.

Humus is defined as a brown to black complex variable of carbon containing compounds not recognized under a light microscope as possessing cellular organization in the form of plant and animal bodies. Humus is separated from the non humic substances such as carbohydrates (a major fraction of soil carbon), fats, waxes, alkanes, peptides, amino acids, proteins, lipids and organic acids by the fact that distinct chemical formulae can be written for these non humic substances. Most small molecules of non humic substances are rapidly degraded by microorganisms within the soil. In contrast soil humus is slow to decompose (degrade) under natural soil conditions. When in combination with soil minerals soil humus can persist in the soil for several hundred years. Humus is the major soil organic matter component, making up 65% to 75% of the total. Humus assumes an important role as a fertility component of all soils, far in excess of the percentage contribution it makes to the total soil mass.

Humic substances are the collectively the subcomponents of humus and as such are high molecular weight compounds that together form the brown to black hydrophilic, molecularly flexible, polyelectrolytes called humus. Many of the components of humus are heterogenous, relatively large stable organic complexes. They function to give the soil structure, porosity, water holding capacity, cation and anion exchange, and are involved in the chelation of mineral elements. The elemental analysis of humic substances reveals that they are primarily composed of carbon, oxygen, hydrogen, nitrogen, and sulfur in complex carbon chains (aliphatic components that make up approximately 40% 50% of the total) C C C C and 4, 5, and 6 member carbon rings (aromatic components that make up 35 60% of the total) with C C, C N and C=O groupings.

Humic substances have been shown to contain a wide variety of molecular components. Some typical components are polysaccharides; fatty acids; polypeptides; lignins; esters; phenols; ethers; carbonyls; quinones; lipids: peroxides; various combination of benzene, acetal, ketal, and lactol, and furan ringed compounds; and aliphatic (carbon chains) compounds. The oxidative degradation of some humic substances produces aliphatic, phenolic, and benzenecarboxylic acids in addition to n alkanes and n fatty acids. The major phenolic acids released contain approximately 3 hydroxyl (OH) groups and between 1 and 5 carboxyl (COOH) groups.

Humic substances can be subdivided into four major subcategories: (1) HUMIN, (2) HUMIC ACIDS (HAs), (3) FULVIC ACIDS (FAs), and (4) HUMATES. These subdivisions are arbitrarily based on the solubility of each fraction in water adjusted to different acid alkaline (pH levels) conditions.

1) Humins

Humins are that fraction of humic substances which are not soluble in alkali (high pH) and are not soluble in acid (low pH). Humins are not soluble in water at any pH. Humin complexes are considered macro organic (very large) substances because their molecular weights (MW) range from approximately 100,000 to 10,000,000. In comparison the molecular weights of carbohydrates (complex sugars) range from approximately 500 to 100,000. The chemical and physical properties of humins are only partially understood. Any humins present within the soil are the most resistant to decomposition (slow to breakdown) of all the humic substances.

Some of the observed benefits of maintaining a threshold concentration of humins within soil are: humins have been demonstrated to improve the soil's overall water holding capacity, an improvement in soil structure, improvements in soil stability, and humins themselves function as a cation exchange system, all of which markedly improve soil fertility and can even rehabilitate soil that either lacks adequate nutrition or soil that has become unbalanced and toxic. Because of these important functions, humin is a desirable and should be a key component of fertile soil composition, particularly when agriculture depletion or erosion are concerned.

2) Humic Acid

Humic acids (HAs) are thought to comprise a mixture of weak aliphatic and aromatic organic acids which are not soluble in water under acidic conditions but are soluble in water under alkaline conditions. Humic acids consist of that fraction of humic substances that are precipitated from aqueous solution when the pH is decreased below 2.

Humic acids (HAs) are termed polydisperse because of their variable chemical features. From a three-dimensional aspect these complex carbon containing compounds are considered to be flexible linear polymers that exist as random coils with cross linked bonds. On average 35% of the humic acid (HA) molecules are aromatic (carbon rings), while the remaining components are in the form of weak aliphatic (carbon chains) molecules. The molecular weight of humic acids (HAs) range from approximately 10,000 to 100,000. Humic acid (HA) polymers readily bind clay minerals to form stable organic clay complexes. Peripheral pores in the polymer are capable of accommodating (binding) natural and synthetic organic chemicals in a lattice (clathrate) type arrangement.

Humic acids (HAs) readily form salts with inorganic trace mineral elements. An analysis of extracts of naturally occurring humic acids (HAs) will reveal the presence of over 60 different mineral elements present. These trace elements are bound to humic acid molecules in a form that can be readily utilized by various living organisms.

As a result, humic acids (HAs) function as an important ion exchange and metal complexing (chelating) system which enhances the overall health of soil and improved interaction between the soil itself and plant root systems.

3) Fulvic Acid

Fulvic acids (FAs) are a mixture of weak aliphatic and aromatic organic acids which are soluble in water at all pH conditions (acidic, neutral and alkaline). Their composition and shape can be quite variable. The size of fulvic acids (HFs) are smaller than humic ads (HAs), with molecular weights which range from approximately 1,000 to 10,000. Fulvic acids (FAs) have an oxygen content twice that of humic acids (HAs). They have many carboxyl (COOH) and hydroxyl (COH) groups, thus fulvic acids (FAs) are much more chemically reactive. The exchange capacity of fulvic acids (FAs) is more than double that of humic acids (HAs). This high exchange capacity is due to the total number of carboxyl (COOH) groups present. The number of carboxyl groups present in fulvic acids (FAs) ranges from 520 to 1120 cmol (H+)/kg. Fulvic acids collected from many different sources and analyzed, show no evidence of methoxy groups (CH3) groups, they are low in phenols, and are less aromatic compared to humic acids from the same sources.

Because of the relatively small size of fulvic acid (FA) molecules they can readily enter plant roots, stems, and leaves. As they enter these plant parts, they carry trace minerals with them from plant surfaces into plant tissues themselves. Fulvic acids (FAs) are already considered to be a key ingredient of high-quality foliar fertilizers. Foliar spray applications containing fulvic acid (FA) mineral chelates, at specific plant growth stages, can be used as a primary production technique for maximizing the plants productive capacity. Once applied to plant foliage fulvic acids (FAs) transport trace minerals directly to metabolic sites in plant cells effectively enhancing and speeding up a plant's nutrition levels. Fulvic acids (FAs) are the most effective carbon containing chelating compounds known and nontoxic when applied at relatively low concentrations.

4) Humates

Humates are the metal (mineral) salts of humic (HAs) or fulvic acids (FAs). Within any humic substance there are a large number of complex humate molecules. The formation of a humate is based on the ability of the carboxyl (COOH) and hydroxyl (OH) groups (on the outside of the polymers) to dissociate (expel) the hydrogen ion. Once the hydrogen ions are dissociated a negatively charged anion (COO— or —CO—) results. Two of these anions can bind to positive metal cations, such as Iron (Fe++), copper (Cu++), zinc (Zn++), calcium (Ca++), manganese (Mg++), and magnesium (Mg++). The simplified reaction (COO—+ Fe++>>COOFe++H) proceeds to bind two anions, frequently a COOH and a COH group.

Ultimately, the humate composition of any one humic substance is specific for that substance and humus can be thought of as an overarching genus with several subspecies of naturally occurring compounds, and there exists a large variability in the molecular composition of different humic substances. Humates from different mineral deposits would be expected to have their own unique features, something that the disclosed protocol intends to account for, sample, measure, and catalogue as what may be a valuable soil additive sourced from a particular location may not necessarily make the most optimal soil additive for another particular location.

Humic Substances and their Indirect Benefits to Soil Health

Humic substances are an important source of nutrients and energy for beneficial soil organisms as well, which in and of themselves are an important component of overall soil health. Humic substances and non humic (organic) compounds provide the energy and many of the mineral requirements for soil microorganisms and soil animals. Beneficial soil organisms lack the photosynthetic apparatuses to capture energy directly from the sun and thus must survive on residual carbon substances in the soil. Energy stored within the carbon bonds functions to provide energy for various metabolic reactions within these organisms. Beneficial soil organisms (algae, yeasts, bacteria, fungi, nematodes, mycorrhizae, and small animals) perform many beneficial functions which influence soil fertility and plant health. For example, the bacteria release organic acids which aid in the solubilization of mineral elements bound in soil. Bacteria also release complex polysaccharides (sugar-based compounds) that help create soil crumbs (aggregates). Soil crumbs give soil a desirable structure. Other beneficial soil microorganisms such as the *Actinomyces* release antibiotics into the soil. These antibiotics are taken up by the plant to protect it against pests. Antibiotics also function to create desirable ecological balances of soil organisms on the root surface (rhizoplane) and in soil near the roots (rhizosphere). Fungi also perform many beneficial functions in soils. For example, mycorrhizae aid plant roots in the uptake of water and trace elements. Other fungi decompose crop residues and vegetative matter releasing bound nutrients for other organisms. Many of the organic compounds released by fungi aid in forming humus and soil crumbs. Beneficial soil animals create tunnel like channels in the soil. These channels allow the soil to breath, and exchange gases with the atmosphere. Soil animals also aid in the formation of humus and help balance the concentration of soil microorganisms. A healthy fertile soil must contain sufficient carbon containing compounds to sustain the billions of microscopic life forms required for a fertile soil and a healthy plant. A living soil is a fertile healthy soil.

Available water is without doubt the most important component of a fertile soil. The most important function of humic substances within the soil is their ability to hold water. Humus functions to improve the soil's water holding capacity.

From a quantitative standpoint water is the most important substance derived by plants from the soil. Humic substances help create a desirable soil structure that facilitates water infiltration and helps hold water within the root zone. Because of the large surface area and internal electrical charges, humic substances function as water sponges. These sponge-like substances have the ability to hold seven times their volume in water, a greater water holding capacity than sod clays. Water stored within the topsoil when needed, provides a carrier medium for nutrients required by soil organisms and plant roots.

Soils which contain high concentrations of humic substances can retain and hold water for crop use during periods of drought. This is why growers who apply humate based fertilizers and integrate production practices which preserve humic substances can frequently harvest a crop during periods of dry weather and reap the benefits of reduced water applications during their rain seasons.

Humic substances are key components of a friable (loose) soil structure and help curb loss of topsoil to erosion. Various carbon containing humic substances are key components of soil crumbs (aggregates). Complex carbohydrates synthesized by bacteria and humic substances function together with clay and silt to form soil aggregates. As the humic substances become intimately associated with the mineral fraction of the soil, colloidal complexes of humus-clay and humus silt aggregates are formed. These aggregates are formed by electrical processes which increase the cohesive forces that cause very fine soil particles and clay components to attract each other. Once formed these aggregates help create a desirable crumb structure in the top soil, making it more friable. Soils with good crumb structure have improved tilth, and more porous openings (open spaces). These pores allow for gaseous interchange with the atmosphere, and for greater water infiltration.

Humic substances also have rehabilitative qualities. Degradation or inactivation of toxic substances is mediated by application of humic substances. Soil humic substances function to either stabilize or assist in the degradation of toxic substances such as: nicotine, aflatoxins, antibiotics, shallots, and most organic pesticides. In the microbial degradation process not all of the carbon contained within these toxins is released as CO2. A portion of these toxic molecules, primarily the aromatic ring compounds are stabilized and integrated within the complex polymers of humic substances. Humic substances have electrically charged sites on their surfaces which function to attract and inactivate pesticides and other toxic substances. For this reason, the Environmental Protection Agency recommends the use of humates for cleanup of toxic waste sites. Many bioremediation companies apply humate based compounds to toxic waste sites as a part of their cleanup program. Growers interested in cleaning up their soils (destroying various toxic pesticides) can accelerate the degradation of poisons (toxins) by applying humic substances. Growers who farm soils low in humus need to include the purchase of humic substances in their fertilizer budget. The cost of humic substances can be more than offset by reduced costs of other fertilizer ingredients and generation of resulting carbon offsets.

Humic substances also help to stabilize and buffer (neutralize) the soil pH and liberate carbon dioxide. Humic substances function to buffer the hydrogen ion (pH) concentration of the soil. Repeated field studies have provided experimental evidence that the addition of humic substances to soils helps to neutralize the pH of those soils. Both acidic and alkaline soils are neutralized. Once the soil is neutralized, then many trace elements formerly bound in the soil and unavailable to plant roots, because of alkaline or acidic conditions, become available to the plant roots. Humic substances also liberate carbon dioxide (CO2) from calcium carbonates present within the soil. The released CO2 may be taken up by the plant or it may form carbonic acids. The carbonic acids act on soil minerals to release plant nutrients.

Soil enzymes themselves are stabilized and inactivated by humic substances. Soil enzymes (complex proteins) are stabilized by humic substances within the soil by covalent bonding. Stabilization renders these enzymes less subject to microbial degradation. Once stabilized and bound to the humic substances enzyme activity is greatly reduced or ceases to function. However, many of these bonds are relatively weak during periods of pH change within the soil, these enzymes can be released. When some components of humic substance react with soil enzymes they are more tightly bound. For example, phenolic enzyme complexes are frequently attached to clays, further stabilizing the enzymes. These enzyme stabilization processes help to restrict the activity of potential plant pathogens. As the potential plant pathogen releases enzymes designed to break down the plant's defenses, the pathogen's enzymes become bound to humic substances. As a result, the pathogens are unable to invade potential host plants.

Soil temperature and water evaporation rate and thus retention is additionally stabilized by humic substances. Humic substances function to help stabilize soil temperatures and slow the rate of water evaporation. The insulating properties of humic substances help maintain a more uniform soil temperature, especially during periods of rapid climatic changes, such as cold spells or heat waves. Because water is bound within the humic substances and humic substances reduce temperature fluctuations, soil moisture is less likely to be released into the atmosphere.

The electrical features of humic substances influence known chemical reactions. Both groups of complex organic acids, humic acids (HAs) and fulvic acids (FAs) have been proven to be involved in three specific chemical reactions. These reactions are commonly termed: (1) electrostatic (columbic) attraction (2) complex formation or chelation, and (3) water bridging.

Electrostatic attraction of trace minerals reduces leaching into subsoil. Electrostatic attraction of metal cations to anionic sites on the humic substance keeps these ions from leaching into the subsoil. The metal cation is loosely attached, thus can be released when attracted to another stronger electrical charge. The cation is readily available in the soil environment for transport into the plant roots or exchanged for another metal cation.

Electrically charged sites on humic substances function to dissolve and bind trace minerals. When a complex reaction with metal cations occurs on the humic substance surface it is termed chelation. Two negatively charged sites on the humic substance attract metal cations with two negative charges. As a result, the cation binds itself to more than one charged anionic site. By forming organic metal claws these organic acids bring about the dissolution of primary and secondary minerals within the soil. These minerals then become available for uptake by plant roots. The greater the affinity of the metal cation for humic acid (HA) or fulvic acid (FA), the easier the dissolution of the cation from various mineral surfaces. Both the acidic effect and the chelation effects appear to be involved in dissolution of minerals and binding processes. Evidence for the dissolution of minerals can be supported by x ray diffraction and infrared analysis. Chelation of plant nutrients such as iron (Fe), copper (Cu), zinc (Zn), magnesium (Mg), manganese (Mn), and calcium (Ca) reduces their toxicity as cations, prevents their leaching, and increases their uptake rate by plant roots.

The chelation exchange reaction involves a transition element. The release of these trace minerals into the plant is quite different from the classical cation exchange system. The cations with a plus two charge, present in the chelate, cannot be replaced by a singly charged cation such as $H+$, $K+$ or $Na+$. Cations with one positive charge are unable to replace a metal ion, such as $Cu++$ with two positive charges. The elated metal ion can be exchanged by another transitional metal ion that has two positive changes. The chelates provide the carrier mechanism by which depleted nutrient elements are replenished at the root surface. The chelation process also increases the mass flow of micronutrient mineral elements to the roots. The chelation of heavy toxic metallic elements present within the soil is also influenced by humic substances present. When toxic heavy metals such as mercury (Hg), lead (Pb), and cadmium (Cd) are chelated these organic metal complexes become less available for plant uptake. Detailed studies of chelation, of heavy metals in industrial sludge has illustrated the value of humic substances in preventing uptake of these toxic metals. Keep in mind that free metal cations such as $Fe+2$, $Cu+2$, and $Zn+2$ are incompatible with plant cells. Direct applications of metallic salts, such as iron sulfate, copper sulfate, and zinc sulfate, to correct trace element deficiencies, can cause serious problems when the soils lack sufficient humic substances for buffering. Trace minerals should be applied in an organic chelate, preferably by humic acids (HAs) and fulvic acids (FAs). Many scientific studies have shown that humic substances [humic acids (HAs) and fulvic acids (FAs)] present in the root zone reduce the toxicity of metal cations.

Water bridging is an important function of humic and fulvic acids. Water bridging by humic substances involves the attraction of a water molecule followed by the attraction of a mineral element cation (simply illustrated by ($COO-H_2O-Fe+$) at an anionic site on the humic (HA) or fulvic acid (FA) polymers. The water holding capacity of humic substances and their ability to bind trace mineral elements function together in water bridging. Water bridging is believed to improve the mobility of nutrient ions through the soil solution to the root. These mechanisms also help reduce leaching of plant nutrients into the subsoil. Recent experiments indicate that water bridging may be more common in humic substances than originally believed.

Humic substances aid in the position of soil minerals by forming metal organic clay complexes, a process termed soil genesis. Soil formation (soil genesis) involves a complexing of transition mineral elements, such as copper (Cu), zinc (Zn), iron (Fe), and manganese (Mn) from soil minerals with humic acids (HAs), fulvic acids (FAs) and days. This complexing process inhibits crystallization of these mineral elements. The complexing process is in part controlled by the acidity of these weak acids and the chelating ability of humic substances. In the absence of humic substances trace minerals elements are converted to insoluble precipitates such as metal carbonates, oxides, sulfides and hydroxides. Thus, the presence of humic acids (HAs) and fulvic acids (FAs) within soils inhibit the development of new soil minerals. For example, crystallization of iron to form iron oxides is inhibited by the presence of humic acids (HAs) and fulvic acids (FAs). Soils deficient in humic substances may contain adequate iron, however the iron present is frequently bound in forms which render it unavailable to plant roots. As the concentration of fulvic acids (FAs) increases within a soil, transition metal crystallization is first delayed and then inhibited at high fulvic acid (FA) concentrations. Cations of these transition metals (e.g. $Cu++$, $Zn++$ and $Fe++$) are held in large humic polymers, by chelation, for future release to sod organisms or plant roots. These physical and chemical processes prevent leaching of plant nutrients into the subsoil.

Stored energy and trace mineral content of humic substances helps sustain sod organisms involved in transmutation. The presence of humic substances within saline soils (those soils which contain high salt concentrations, e.g. sodium chloride) aid in the transmutation of the sodium ions. The transmutation reactions, a biological process that occurs within living organisms, result in the combining of sodium with a second element, such as oxygen, to form a new element. Although the theory of transmutation has met considerable opposition by some traditional physicists and chemists, biologist have recorded convincing data to prove that transmutation occurs in living organisms. Application of humins, humic acids, and fulvic acids to saline soils, in combination with specific soil organisms, results in a reduction in the concentration of sodium salts (e.g. NaCl). The reduction is not correlated with a leaching of the salt, rather with an increase in the concentration of other elements. The addition of humic substances to soils containing excessive salts can help reduce the concentration of those salts. By reducing the salt content of a soil its fertility and health can be "brought back" to provide a more desirable environment for plant root growth.

Humic Substances and their Direct Benefits to Plant Life and Crops

Plant growth itself is influenced both indirectly and directly by humic substances. Positive correlations between the humus content of the soil, plant yields and product quality have been published in many different scientific journals. Indirect effects, previously discussed, are those factors which provide energy for the beneficial organisms within the soil, influence the soil's water holding capacity, influence the soil's structure, release of plant nutrients from soft minerals, increased availability of trace minerals, and in general improved soil fertility. Direct effects include those changes in plant metabolism that occur following the uptake of organic macromolecules, such as humic acids, fulvic acids. Once these compounds enter plant cells several biochemical changes occur in membranes and various cytoplasmic components of plant cells. Some of the biochemical improvements in plant metabolism as influenced by humic substances, are summarized in the flowchart illustrated in FIG. 12.

The absorption of humic substances into seeds has a positive influence on seed germination and seedling development. The application of humic (HA) or fulvic acids (FA) to seeds will increase the seed germination; resulting in higher seed germination rates. Application rates of humic acids (HAs) or fulvic acids (FAs), required for improved seed germination, range from 20 to 100 mg/liter of seed. In order for improved germination to occur the humic substances must be present within the cells of seeds. As the humic substance enters the seed cells, respiration rate increases, and cell division processes are accelerated. These same respiratory processes enhance root meristem development and activate other growing points within the seedlings. Humic substances have been demonstrated to enhance mitotic activity during cell division under carefully controlled experiments. Placement of these humic substances on seeds (seed treatment) or within the seed furrow will significantly improve seed germination and seedling development. Excessive concentrations of humic acids (HAs) and/or fulvic acids (FAs) can inhibit seed germination and at high concentrations can kill young seedlings. Therefore, follow recommended rates when applying humic substances.

Humic substances have a very pronounced influence on specifically the growth of plant roots. When humic acids (HAs) and/or fulvic acids (FAs) are applied to soil enhancement of root initiation and increased root growth are observed. Thus, the common observation that humic acids (HAs) and fulvic acids (FAs) are root simulators. In most experimental studies plant root growth is stimulated to a greater extent compared to stimulation of above-ground plant parts. Carefully designed experiments have been conducted under controlled conditions to measure plant response. For example, replicate treatments of plants grown within the greenhouse, with and without humic acid and fulvic acids has illustrated how humic substances influence root growth. In repeated experiments the treated root weights averaged from 20 to 50% heavier compared to the weights of non-treated roots. The type of humic substance applied had a significant influence on the percent of increase. Not all humic substances contain a desirable molecular mixture of humins, humic acids (HAs) and fulvic acids (FAs) capable of rapidly stimulating root growth. Some humic substances, because of their large molecular sizes, failed to stimulate plant root development. Root stimulation occurs when the smaller molecular components within fulvic acid (FA) occur at a concentration which ranges from 10 to 100 mg/liter of solution. Growth is further stimulated when fulvic acids (FAs) are used in combination with humic acids (HAs) and other required plant nutrients. Humic substances improve plant nutrition, however they are not complete nutrients by themselves. Excessively high concentrations of humic substances can result in a reduction in root weight. For optimum plant growth humic acids (HAs) and fulvic acids (FAs) should be applied at relatively low concentrations. Applications of humic substances within a fairly wide range of concentrations are highly beneficial to plant root development.

Humic acids (HA)s and fulvic acids (FAs) have direct effects on plant cell membranes. Humic acids (HAs) increase the permeability, ease by which mineral elements move back and forth through the cell membranes, resulting in an increased transport of various mineral nutrients to sites of metabolic need. Humic substances influence both hydrophilic (having water affinity) and hydrophobic (lacking water affinity) sites on the membrane's surfaces. In addition, many scientists believe that the phospholipid components of the membranes are electrically altered by humic substances. As a result of these electrical changes, the membrane surface becomes more active in the transport of trace minerals from outside the plant cell into the cell cytoplasm. Energy metabolism is accelerated, and the chlorophyll content of plant leaves is enhanced by the presence of humic substances. When humic acids (HAs) and fulvic acids (FAs) are applied to plant leaves the chlorophyll content of those leaves increases. As the chlorophyll concentration increases there is a correlated increase in the uptake of oxygen. Chlorophyll development within plant leaves is more pronounced when fulvic acids (FAs) are present in the foliar fertilizer. Organic acids [humic acids (HAs) and fulvic acids (FAs)] also increase the concentration of messenger ribonucleic acids (m RNA) in plant cells. Messenger RNA is essential for many biochemical processes within cells. Activation of several biochemical processes results in an increase in enzyme synthesis and an increase in the protein contents of the leaves. During these metabolic changes an increase in the concentration of several important enzymes is detected. Some of the enzymes which are reported to increase are catalase, peroxidases, diphenoloxidase, polyphenoloxidases, and invertase. These enzymes activate the formation of both carrier and structural proteins.

Humic acids (HAs) and fulvic acids (FAs) are excellent foliar fertilizer carriers and activators. Application of humic acids (HAs) or fulvic acids (FAs) in combination with trace elements and other plant nutrients, as foliar sprays, can improve the growth of plant foliage, roots, and fruits. By increasing plant growth processes within the leaves an increase in carbohydrates content of the leaves and stems occurs. These carbohydrates are then transported down the stems into the roots where they are in part released from the root to provide nutrients for various soil microorganisms on the rhizoplane and in the rhizosphere. The microorganisms then release acids and other organic compounds which increase the availability of plant nutrients. Other microorganisms release "hormone like" compounds which are taken up by plant roots. The required concentration of humic acids (HAs) and/or fulvic acids (FAs) within the foliar spray should be relatively low, generally less than 50 mg of concentrated dry humic substance per liter of water. Foliar fertilizers containing humic acids (HAs) and fulvic acids (FAs) in combination with nitrogen, potassium, phosphorus and various trace minerals have been demonstrated to be from 100 to 500% more efficient compared to applications of similar fertilizers to the soil. Foliar fertilizers are also more economical because smaller quantities of fertilizer are required to obtain significant plant response. Plant nutrients within foliar fertilizers are rapidly absorbed by the plant leaves. Within 8 hours after humic substances are applied changes in many different metabolic processes are detected. Enhanced carbohydrate production can be detected within 24 to 48 hours after foliar feeding by use of a refractometer. Enhanced carbohydrate production can either result in improved product quality or increased yields.

Some molecular components of humic substances act to regulate plant growth hormones. Both humic acids (HAs) and fulvic acids (FAs) inhibit the enzyme, indole acetic acid oxidase (IAA oxidase) thereby hindering IAA destruction. The plant growth regulator, indole acetic acid (IAA) performs many important functions within growing plant parts. When IAA is protected from IAA degrading enzymes the IAA continues to stimulate growth processes. Unfractionated humic acids (HAs) are the most effective in regulating plant growth hormones. Humic substances also influence other enzymes involved in growth regulation. When the activity of growth regulators is maintained within plant tissues, plant metabolism remains functional and normal growth processes continue to occur.

Humic substances increase production of high energy adenosine triphosphate (ATP) within plant cells. As various metabolic systems are activated by humic substances an increase in the production of high energy phosphate bonds (ATP) occurs. The high energy phosphate bonds of ATP function as a major driving energy for many different metabolic reactions.

Humic substances provide free radicals to plant cells. Free radicals are "active sites" on the polymers which function as electron donors. Free radicals assist in exerting positive effects on seed germination, root initiation and plant growth in general. Free radicals contain one or more unpaired electrons, are highly reactive, short lived, and capable of participating in many different reactions. Humic acids (HAs) contain two types of free radicals. The free radical content of humic substances is related to the humification state of the humic substance. The greater the humification (low H:C ratios) the darker the color of the humus. Thus, humic acids (HAs) contain a higher free radical content compared to fulvic acids (FAs), which have a high H:C ratio. The relatively low free radical content of fulvic acids (FAs), associated with high H:C ratios, is indicative of a low degree of chemical condensation for these substances. The first class of commonly found free radical within humus permanent, stable type which persists for longer periods. The second class is a transitional paramagnetic type which is transitory. Each free radical type has a specific function (e.g. catalysts, photosensitizer, and activators) in various metabolic processes within living cells and both are desirable to find within a particular soil sample.

The mean residence times of these organic mineral complex aggregates varies with different humic substances. The mean residence time of humic substances within these aggregates, based on radiocarbon dating, using extracts from non-disturbed soils, is as follows: humin, 1140 years; humic acid, 1235 years; and fulvic acid, 870 years.

Synthetic N P K Fertilizers and the Problems they Cause; why Humate is Preferable While the benefits of humate and humic substances are becoming better understood, their necessity as a soil additive still lacks acknowledgement by the commercial farming industry, owing to adherence to traditional farming practices, the cheapness of synthetic NPK fertilizers, and a lack of understanding given the complexity of soil composition and the numerous components and beneficial additives that continue to emerge. See FIG. 13.

Properly managed fertilizers support cropping systems that provide economic, social and environmental benefits. On the other hand, poorly managed nutrient applications can decrease profitability and increase nutrient losses, potentially degrading water and air. As can be expected, with such a vast amount of soil additives as potential candidates, it is relatively easy for one lacking proper information or guidance to bring about potentially long lasting negative consequences in their soil conditions.

The general 4R Nutrient Stewardship principles as purposed by the Fertilizer Institute, apply globally, but how they are used locally varies depending on field and site-specific characteristics such as soil, cropping system, management techniques and climate. The scientific principles of the 4R framework include:

RIGHT SOURCE—Ensure a balanced supply of essential nutrients, considering both naturally available sources and the characteristics of specific products, in plant available forms.

RIGHT RATE—Assess and make decisions based on soil nutrient supply and plant demand.

RIGHT TIME—Assess and make decisions based on the dynamics of crop uptake, soil supply, nutrient loss risks, and field operation logistics.

RIGHT PLACE—Address root-soil dynamics and nutrient movement and manage spatial variability within the field to meet site-specific crop needs and limit potential losses from the field.

In retrospect, it is now clear that the industrial farming complex became distracted from the importance of organic compound cycling when it was discovered that soluble acidic based nitrogen (N), phosphorus (P) and potassium (K) "fertilizers" could stimulate plant growth. To analogize, industrial farming has developed the same psychology that many people themselves fall victim to when visiting their family physician and has been treating the symptoms while ignoring underlying causes which continue to worsen.

There is an immediate connection between applying the right nutrient source, at the right rate, right timing, and right placements, and beneficial impacts on components of the natural capital evidenced through better crop performance, improved soil health, decreased environmental pollution, and the protection of wildlife.

Similarly, positive effects are expected on financial capital, as farmer profits improve, bringing about improvement in their quality of life and increased economic activity in their communities.

Soils abused by over-application of this anhydrous ammonia and by other destructive farming practices which destroy humic substance can shorten residence times of humic substances by several hundred years. For context, the turnover time of organic carbon added each year from plant and animal residues averages approximately 30 years, under ideal conditions.

To make matters worse, since N P K fertilizers typically have been relatively inexpensive in comparison to other farm costs and have remained low relative to corn prices, one of the United States largest cash crops, application of N P K fertilizers at rates in excess of plant need is common as farmers will tend to hedge against even a perceived risk of insufficient N. Continued use of these acidic fertilizers in the absence of adequate humic substances is only now being understood to create downstream ecological problems which now must be addressed themselves.

N Fertilizer Overapplication is a Common Problem, Counter-productive, Toxic to Environment, Application of Humic Substances Directly Counter These Issues For years the conventional thinking has been that application of synthetic nitrogen fertilizers improved soil carbon while producing more crops. Research data from the Morrow Plots, the oldest research plots in the country, now indicates the opposite at work and a measurable decline in soil carbon can be linked to the use of synthetic N fertilization.

Further, it is now observable that the overuse of synthetic nitrogen causes a "nitrogen cascade" resulting in imbalances in the natural ecosystem by disrupting the desirable and necessary soil microbial communities which in turn only exacerbates problems. See FIG. 14.

Finally, excess N has been shown to speed up the natural decomposition rate of organic matter and humus, and physically changes the soil structure itself. The resulting soil will have less pore space and less sponge like qualities and therefore be less efficient at storing nutrients, water and air. This typically results in a farmer applying more fertilizer and requiring more irrigation needed to maintain the same crop yield seen in previous years, which in turn both requires more energy and which brings additional GHG output with it.

This negative impact of these fertilizers on soil health and plant growth has been shown to be reversable by augmenting or replacing the use of these synthetic fertilizers with humic substances.

The United States Environmental Protection Agency has accessed humus and currently recognizes humate and humic acid as naturally occurring, organic materials or substances, commonly associated with coal, lignite and mudstones, non-toxic to both human health and the environment. The Agency believes that both humic acids and potassium salts are practically non-toxic to mammals. Due to the ubiquitous nature of these naturally occurring materials, and the high molecular weights of the humic materials, no chronic or acute effects are expected to occur. There is also no available information to indicate that these naturally occurring substances are carcinogenic, mutagenic, or expected to have any effect on the immune or endocrine systems. As such, humic substances are considered exempt from a requirement of a maximum application tolerance and overapplication does not carry with it the same downstream health issues seen in N P K fertilizers.

Further, when adequate humic substances are present within the soil the requirement for N P K fertilizer applications is significantly reduced. As the level of humic substances in soils become depleted the misleading demand for higher concentrations of N P K results.

Many growers have over the past several years reported increasing demands for soluble acid fertilizer in order to maintain crop yields. Such observations indicate something is wrong within the soil and its composition and additional, increased applications of N P K fertilizers is both misplaced and counterproductive.

Further, increased leaching of nitrate fertilizer ingredients into the ground water is also a warning of problems to come. These symptoms reflect the losses in soil humic substances.

As discussed, the uptake of major plant nutrients is mediated by humic substances. One stimulative effect of humic substances on plant growth is enhanced uptake of the major plant nutrients: nitrogen (N) phosphorus (P), and potassium (K). As such, in soil with elevated N P K levels, humic substances will enhance a plant's ability to uptake and process these excess nutrients into inert or significantly less detrimental elements and compounds, and eventually rehabilitate and stabilize the soil.

Growers could reduce their future fertilizer requirements and retain the fertilizer ingredients already existing within the plant's rooting zone by the application of humate based fertilizers. The application of either dry or liquid humic substances to soils has been demonstrated to dramatically increases fertilizer efficiency.

Growers, however first need to implement production practices which prevent the decomposition and deterioration of existing humic substances within their soils. Growers also need to develop practices which improve the residence time of humic substances. It is essential that growers move towards avoiding destructive fertilization practices, rotate crops consistently, minimize their pesticide usage, avoid deep plowing, and mix crop residues back into the topsoil using minimum tillage practices. Soils which contain adequate humic substances have improved tilth (workability) and are thus more efficiently maintained for crop production.

The transitioning of unhealthy agricultural soils and pre-reclamation sites nationwide from their present state to a more natural condition where organic matter and humus is sufficient will require soil amendments to restore optimal soil conditions. The replacement of the nitrogen with humic products as described carries no adverse effect on crop yields or quality; yet provides the benefits of less nitrous oxide emissions, less water use, and less nitrogen run-off in the form of nitrate from fields into the watershed. In the agricultural arena this concept is known as "additionality", meaning that there are no adverse effects to a crop by replacing nitrogen fertilizer with a humic product.

Further, a farmer who reduces N output from their soils, will also be reducing C output that would have as a natural course flowed from their previous water and energy demands as they can now effectively sustain the same yields with less effort.

Incentivizing Farmers to Change Longstanding Practices, Habits, and Behavior

The farmer, the manager of the land, is the final decision-maker in selecting the practice suited to local site-specific soil, weather, and crop production conditions, and local regulations that have the highest probability of meeting the goals.

Because these local conditions can influence the decision on the practice selected, right up to and including the day of implementation, local decision-making with the right decision support information would perform better than a centralized regulatory approach.

Ideally the assessment of practice performance would be done on the basis of all indicators considered important to incentivizers and what has been set forth by the 4R Nutrient Stewardship concept. Essentially, this becomes the practice of adaptive management—an ongoing process of developing improved practices for efficient production and resource conservation by use of participatory learning through continuous systematic assessment.

While humic substances offer a solution as to the issues of soil itself, the problem then turns to adaptation and participation. How do you incentivize farmers to change their behavior with minimal disruption to their current operating practices without incurring substantial or prohibitive costs?

One thought has been the creation of greenhouse gas credit programs, which reward observed behavior and reduction of greenhouse gas output with credits that may be redeemed against gas output from other activities.

The advent of nitrogen GHG credit programs such as the Delta Institute's Nitrogen Credit Program (NCP) can generate additional revenue for a farmer adopting a nutrient stewardship strategy aimed at reducing total N fertilizer applied to their crops. In many of these credit programs, the credits themselves carry ownership rights and the credits themselves are bought and sold, often being applied by disparate industries whose operating practices cannot be further optimized to lower emissions.

In successive meta—analyses of available field data, simple ratios have been developed to relate the amount of N fertilizer applied to croplands to subsequent emissions of N2O. The current global mean value for fertilizer-induced N2O emissions (synthetic and manure)—derived from over 1,000 agricultural field studies—is ~0.9% or 0.009. In short, for every 100 kg of N fertilizer applied, 0.9 kg of N in the form of N2O—N is assumed to be emitted directly into the atmosphere.

MSU and EPRI developed an N2O offsets accounting "protocol" or "methodology." It is the only offsets methodology in the world today published in a peer-reviewed scientific journal. The MSU-EPRI N2O Offsets Protocol is based on the empirical relationship observed in regionally based studies of the relationship between fertilizer nitrogen rate and N2O emissions. This relationship provides us the basis for the development of a transparent, scientifically robust offset protocol that can be used by developers of agricultural offset projects to create exchangeable GHG emission reduction credits for U.S. carbon cap-and-trade markets.

By combining the N2O emissions predicted using the MSU-EPRI N2O Offsets Protocol with a recently developed approach for applying economically optimized nitrogen input rates to corn, called the maximum return to nitrogen (MRTN), the protocol provides the basis for incentivizing N2O reductions without adversely affecting crop yields. The protocol uses an Intergovernmental Panel on Climate Change "Tier 2" approach based on a regional N20 emissions factor that was derived from eight site years' worth of N2O emissions data measured from field studies conducted at KBS and on commercial farms in Michigan. Tier 2 emissions factors can also be used to credit practices other than fertilizer rate reduction that reduce N20 emissions. While nitrogen fertilizer rate is the best predictor of N2O flux, a reduction in rate can also reflect the effects of, for example, adopting improved fertilizer timing and placement, and the use of nitrification inhibitors.

FIG. 15 illustrates an equation and its graph of Observed Mathematical Relationship Between Applied Fertilizer Rate and Observed Nitrogen Dioxide Emission. The equation shows the currently accepted equations used to compute N2O emissions per year based upon nitrogen application rates. Tier 2 is the latest and better equation shown as the exponential curve in the graph versus the liner Tier 1 equation.

Compute carbon offsets produced on farming project by computing two values using the Tier 2 equation: one for the normal N application rate and one for the reduced nitrogen rate. The N application rate reduction is shown by "B" and the N2O reduction is shown by "A" on the graph. The difference in the two calculated values is the N2O reduction in kg/yr. This value is converted to metric tons per year by dividing by 1000 (1000 kg/mT) and then multiplied by 298 to convert to CO2 equivalent. The result is metric tons of CO2 equivalent greenhouse emissions per hectare. One metric ton of CO2 is defined as one carbon offset.

By using this modeling, GHG credits can now be accurately dispensed according to a farmer's actions and what they may have done, or added to their soil or, importantly, reduction in other behaviors.

Therein however, are many problems that must first be addressed when creating something as enigmatic and intangible as a carbon credit system if one expects people to equate credits with the same reverence as gold, oil, or other physical commodities that the markets are currently comfortable and familiar with. A protocol must be designed which can somehow observe and track behavior and then reward that behavior with a credit that has been tracked, validated and is trusted, as these credits exist only in ledger books and may represent actions and behaviors of farmers that are distant from purchasers both in physical distance and time.

Problems with Current Credit Markets Overview

Compliance and Voluntary Green House Gas and Water Quality Trading ("WQT") markets exist in the United States and globally. "Compliance markets" are comprised of the trading of credits and offsetting of greenhouse gas emissions by countries that are legally bound to comply with the Kyoto Protocol. Outside of these markets, greenhouse gas offset credits can be traded in the voluntary market by any citizen or institution looking to offset their greenhouse gas emissions. Within these markets the responsibility falls on individual companies to trade credits with each other. The intent is to ensure the free market (private sector) determines the least costly emission cuts.

While the free market solution has worked for other sectors, growth within the compliance markets has been slow, far too slow to provide the global solution necessary to stave off global warming.

Offsetting one ton of nitrogen with a nitrogen credit means there will be one less ton of nitrogen dioxide in the atmosphere than there would otherwise have been. By purchasing GHG credits to offset their emissions, businesses contribute essential finance to renewable energy, forest protection and reforestation projects around the world that would not otherwise be financially viable. While this seems like it would be desirable and businesses that can't reduce their own carbon emissions would create a steady supply of customers for the carbon credit market, this hasn't translated to the real world. These separate third parties, those not directly involved in the credit creation scheme, have been reticent to invest and speculate on such an intangible commodity, stemming from prevalent fraud within this market, as well as just a lack of trust in what the carbon credits purport to be backed by.

As such, the market is viewed as more of a niche market, and one that still requires substantial investment in the form of government and private donation.

Water quality trading is another innovative market-based approach that allows permitted dischargers (such as power plants) to purchase nutrient reduction credits from sources such as farmers. When designed well and combined with other watershed efforts, WQT can help keep water clean in a way that benefits landowners, communities and the environment.

Typically, farmers implement conservation practices that reduce soil erosion and runoff, generating a credit. A buyer (e.g., a permitted source such as a municipal wastewater facility) purchases these water quality improvements, or credits, from farmers. The transaction compensates the farmers for the costs of their conservation practices while improving the overall health of the environment. Participation in these markets has progressed somewhat better than the carbon market, likely lending to that simply water is a more critical issue for farmers, a reduction in tonnage of water more readily observed, and unlike soil, a fertilizer or additive cannot be added to water to simply skate past deeper underlying water quality.

However, because this market tracks observable behavior on the part of participants, this market suffers many of the same trust and fraud issues which have overall had a throttling effect.

The Carbon trading market is the world's fastest growing commodities market. As it continues to emphasize, unlike traditional tangible commodities however, the advent of "carbon", "nitrogen" and "water" credits or offsets, it has created a new international commodity that is intangible and exists only in ledgers. Considering both the speed and the influx of money involved in these new "intangible asset" markets, especially carbon trading, the potential for fraud has been high, and sidelines many conservative investors and participants.

Interpol, in its June 2013 report titled "Guide to Carbon Trading Crime", identified five areas ripe for fraud within the carbon markets:

1. fraudulent manipulation of measurements to claim more carbon credits from a project that were actually obtained;
2. sale of carbon credits that either do not exist or belong to someone else;
3. false or misleading claims with respect to the environmental or financial benefits of carbon market investments;
4. exploitation of weak regulations in the carbon market to commit financial crimes, such as money laundering, securities fraud or tax fraud; and
5. computer hacking/phishing to steal carbon credits and theft of personal information.

The Disclosed Life Cycle Approach Protocol Solves the Potentiality of Fraud While Enabling Significant Tracking and of Credit Genesis and Tracking of Corresponding Chain of Title Like any traditional commodity market, within these intangible asset markets, every asset (offset) must be identifiable and trackable to ensure market integrity or participants will be reluctant or even disincentivized to participate. Genuine carbon standards must be set, with the goal of providing assurances to buyers that the emissions reductions generated by a particular project are indeed real and quantifiable.

While there are registries such as the Gold Standard and Verifiable Carbon Registry that take efforts to assure that all its projects meet robust and stringent methodology requirements for sustainable development in the local area, none of these registries provide an accurate Chain of Title or accurate Life Cycle Approach to the offsets they track. This has led to persistent fraud in these voluntary markets.

Because a variety of industries can benefit from either the direct or indirect use of humate substances to attain carbon, nitrogen and/or water offsets, linking this tangible asset— "humate" to the corresponding "intangible" offsets is critical.

A "Life Cycle Approach" (LCA) will minimize the potential for fraud related to GHG reduction via humate by tracking a credit created under the LCA from "cradle to grave" tracking the entire chain of custody and other historical data of note along the way until the credits eventually are retired.

An effective LCA approach will be able link the tangible asset and precursors—humus from the initial mining, to refinement, to commercial product (humic substances refined for purposes of crop fertilizer), to intangible behaviors, in this case the farmer using said fertilizer and subsequent testing verifying the reduction of greenhouse gases, to what is an intangible asset—the offset in a ledger which represents these combined efforts. The value of the intangible asset, the credit, is now undeniably enhanced due to now carrying with it the same sort of title that is seen in real property transactions. Further, because the described inventive protocol contemplates the consensus driven architecture borrowed from blockchain, the title that these credits carry with them not only reassures a potential downstream purchaser that these credits carry clean title, but the credits themselves are now fraud resistant, as it is difficult if not impossible for bad actors to simply create assets on a blockchain, the consensus protocol simply dismisses bad data and fraudulent or suspect nodes.

What is required to do this however is an asset management/tracking system that would assign an identification number or string (ID) to a unit of humate creating with it a "Chain-of-Title" that geographically identifies where the humate originated, the characteristics of that humate unit (sample analysis), the movement, the use (purpose and location), the linkage to any corresponding offset (carbon, nitrogen, and/or water) and the final disposition.

Every GHG credit that is generated by way of the disclosed protocol is considered unique and has a single use identification number or string assigned to it, allowing the unique credit to be tracked from cradle to credit issuance to eventual retirement.

As such, when a business subsequently purchases these GHG credits to offset its emissions, these GHG credits have been accounted for through a through a consensus driven network of third-party registries that account for discrepancies. This operates to ensure that the retirement of these distinct GHG credits have been validated and that a business can with greater granularity that before, trace the credits that they reduced to date, site location, and even the source of the humus that was applied. The additional benefit is that this same system ensures that the same unique credit cannot be sold to anyone else and that all credits are valid unless considered redeemed.

In addition to providing a proof of application of these products, this same protocol allows for verification of the correct application of prescriptive humic and bio-stimulant products is required and the disclosed architecture even allows for tracking of granularity down to the specific formulation that A method to assure application rate is required through the use of taggants. The Compliance Markets are more robust but the method of tagging the project intentions with the project verifiable results are still missing or significantly neglected. Now that appropriate nanomaterials consisting of organic phase change products and other inorganic materials are commercially available and feasible, validation of application rates are now assured.

Verification can now be accomplished using sensors checking for organic solid to liquid phase changing nanoparticles of various types and melting temperatures which have been added to the naturally occurring materials, providing a unique, natural "barcode". Or, in the alternative, as described the composition of humus comes from a wide variety of sub-compounds and particles such that it is feasible that the identified structures alone are enough to provide markers for subsequent measurement and detection.

Further, while other non-organic materials are currently available as taggants, the organic tags as contemplated are natural, biodegradable and safe for the environment, thus allowing for taggant use and verification during all stages.

The addition of these materials can later be collected from soil samples or plant materials to validate the application of humic and fulvic products.

The verification of product quality and application is a requirement to validate benefits known as ISO/TC 134. ISO/TC 134 offers an analytical procedure for humic and fulvic acid which is currently under review by the Humic Products Trade Association (HPTA), International Humic Substance Society (IHSS), and California Department of Food & Agriculture (CDFA). Because at its core this invention also aims to be a "green" endeavor, additional consideration and standards for product quality may also be sourced from the Organic Materials Review Institute (OMRI), which provides organic certifiers, growers, manufacturers, and suppliers an independent review of products intended for use in certified organic production, handling, and processing. When companies apply, OMRI reviews their products against the USDA Organic or Canada Organic Regime standards.

Further, inherent to the disclosed LCA protocol, alongside the taggant, tracking, and verification protocol is a pre and post analysis of soil biochemistry. This allows for verification that the humic substances were applies and green house gas reduction achieved, but additionally serves as building a historical database such that it is not unreasonable to believe that formulation of customized and optimal fertilizers will eventually be able to be a prescriptive process that only requires an initial sample test of a particular field's characteristics. Eventually the protocol in addition to tracking and verification can be leveraged and soil amendment formulation that suits a particular end-user's requirement can be created with minimal intervention while moving soil conditions to what is most optimal for that particular location, crop, and or purpose. Similarly, not unlike a visit to your physician, it becomes far easier to track what has been tried, what has worked, and if additional treatments are necessary, more specific and targeted treatments can be formulated and applied to achieve best results.

By optimizing formulation, the disclosed protocol addressed current problems with over-application of products that may be a waste of money or not wholly appropriate, while also addressing potentially far more pressing problems such as soil toxicity for what may be a inappropriate fertilizer formulation.

Ultimately, to ensure the purchase of high-quality carbon offsets, it is imperative that companies pursue offsets that have been subjected to rigorous third-party monitoring, reporting and verification procedures.

As previously noted, and emphasized, given the potential for bad actors it is important that participants in a carbon credit market are able to source carbon credits from a reputable offset supplier who can offer transparency in terms of the projects, pricing and retirement of the carbon credits. The disclosed protocol is designed to both address the tracking of the application of humic products, while also measuring the corresponding reduction of application of nitrogen-based fertilizers and water quality and water savings while also providing for efficient, low cost, continuous $3^{rd}$ party blind or double-blind monitoring and validation of the GHG credits that are being created, exchanged, sold, and eventually retired within the system.

Blockchain Protocol

The disclosed protocol is designed to track a vast number of relevant data points, and then using a block chain architecture or a modified block chain multichain architecture, the disclosed protocol is then able to ensure the validity of information on that chain.

In simple terms, the standard blockchain can be described as an append-only transaction ledger. What that means is that the ledger can be written onto with new information, but the previous information, stored in blocks, cannot be edited, adjusted or changed. This is accomplished by using cryptography to link the contents of the newly added block with each block before it, such that any change to the contents of a previous block in the chain would invalidate the data in all blocks after it.

Blockchains, as it is reasonable to infer from previous discussion, are typically consensus driven. Recording transactions through blockchain virtually eliminates human error and protects the data from possible tampering and accounts for bad data. Records are continuously being accessed and monitored and are verified every single time they are passed on from one blockchain node to the next, usually by checking what is about to be sent against other existing copies on other nodes within the network. In addition to the guaranteed accuracy of your records, such a process also leave a highly traceable audit trail should forensics be necessary later to determine causality within the system.

In terms of physical structure, a large number of computers are connected to the network, and to reduce the ability for an attacker to maliciously add transactions on the network, those adding to the blockchain must compete to solve a mathematical proof. The results are shared with all other computers on the network. The computers, or nodes, connected to this network must agree on the solution, hence the term "consensus."

If an irregularity is detected somewhere along the supply chain, a blockchain system can lead you all the way to its point of origin. This makes it easier for businesses to carry out investigations and execute the necessary actions. For example, one use-case for blockchain tracking would be the food sector, where tracking the origination, batch information and other important details is crucial for quality assurance and safety.

This also makes the work of appending data to the ledger decentralized. That is, no single entity can take control of the information on the blockchain. Therefore, one need not trust a single entity since the system is predicated on the reliance and agreement of many computers spread across what are likely and ideally wholly sperate entities. The beauty of this construct is that the transactions recorded in the chain can be publicly published and verified, such that anyone can view the contents of the blockchain and verify that events that were recorded into it actually took place.

In layman's terms, the blockchain is a virtual, public ledger that records everything in a secure and transparent manner. Unlike banks that facilitate transactions with traditional currencies, the blockchain allows the free transfer of data through a decentralized environment, typically in exchange for a cryptocurrency reward to incentivize participation and the creation of numerous nodes across the network. Rather than maintaining separate records, businesses are only required to keep a single, joint register, which in and of itself may not represent all the data. Potentially many nodes only contain the data that is relevant to the work occurring on those nodes, or may only contain limited data because of the slow connection or processing power of that particular node. By employing such an architecture and then applying it to recorded data, the integrity of a company's financial information is also guaranteed. All the data is held across an interlinked network of computers, owned and run by none other than the users themselves. This has an additional benefit of giving the network an organic structure, whereby as some nodes go offline due to downtime or issues unique to those nodes, other nodes may be added, giving the network stability unavailable to a centralized record keeping system.

Specifically, for supply chain management, the blockchain technology offers the benefits of traceability and cost-effectiveness. Put simply, a blockchain can be used to track the movement of goods, their origin, quantity and so forth. This brings about a new level of transparency to B2B ecosystems—simplifying processes such as ownership transfer, production process assurance and payments.

Disclosed Multichain and Improvements to Blockchain Architecture

The disclosed protocol borrows several foundational principles from blockchain architecture, but there are several limitations blockchain, and some specific to the problem being address, such that it may be necessary to build upon the protocol to achieve the desired participation in the contemplated improved carbon credit markets.

Number of Chains a) As mentioned above, most blockchain, like Bitcoin, are a single ledger. This means that the entire Bitcoin network is focused on three tasks 1) nodes looking to the current block, and waiting for a solution to that block that the network agrees upon, 2) nodes participating in consensus, 3) and nodes with portions of ledger stored sending copies of ledger out to new nodes so the new nodes can be established. When data is added, this data is added to the main blockchain, and waits for consensus to confirm or discard.

Multichain as the name should quickly communicate, allows for numerous chains, or streams. There is still a main blockchain within multichain that the additional sidechains or streams all point towards, and this main blockchain can be thought of as the master copy.

However, unlike blockchain, multichain enables the main blockchain to be more of a reference source than a working area. While some manipulation can and will occur on the central chain in the multichain structure, the thought is that the system can be better optimized if some processes are allowed to occur on side chains, and once side chain processes provide data that is validated and ready to enter into the main blockchain, a final clean copy of the results of the side-chain process are entered one time into the main blockchain, with a pointer established to the side process if someone later wishes that the side-process "show its work".

One of the weaknesses that has begun to emerge in many of the blockchain protocols is the issue of bloating file sizes. As a traditional blockchain will contain all data, and everything that occurred, there is often a lot of unnecessary data that begins to add onto the overall file size.

Using the disclosed protocol, a side chain may be created when a process is occurring that may not necessarily be important to the rest of the network. Then, when that process works itself out and resolves, it has been considered that many times a simplified or cleaned up data set is all that the rest of the network requires.

As such, in the multichain environment, a process can resolve on a sidechain or stream, at which time a smaller consensus occurs. If amongst that local consensus the data is considered to be "good" and ready to enter into the main blockchain, the sidechain can be closed out. The sidechain may be stored, but only the "good" data is added to the main blockchain and then distributed to the rest of the network.

This works to keep the main blockchain optimized, and easier to work with and access while still allowing for forensics if someone wishes to trace back and check events.

While this does introduce some rigidity into the architecture, that is, some of these multichains may only exist as backups on a limited number of nodes, there are means to address that, perhaps by denoting "power" nodes on the network, those with the storage capacity that are willing to be sidechain archivists, but the benefits of a cleaner blockchain and allowing more dynamic sidechain "work spaces" seems more than worth it.

Decentralization a) Blockchains are decentralized so there is no need for a trusted third party or intermediary to validate transactions; instead a consensus mechanism is used to agree on the validity of transactions.

The disclosed multichain protocol does not modify this as this is one of the principle reasons for and benefits of using blockchain.

Transparency of Data b) Blockchains are shared and everyone can be allowed to what is on the blockchain, which serves to establish transparency and trust.

While often times the data on blockchain may be encrypted, it is not uncommon for the data to be raw and viewable, or for web-based blockchain explorers to be available. The contemplated protocol may employ either raw or encrypted data or some combination of both as there may be sensitive data or corporate clients that wish that at least some data be obfuscated.

Immutability c) Typically, once the data enters the blockchain it comes in discreet chunks, "blocks", which may relate either to a particular action that occurred or may just be representative of a ceiling limit on individual block sizes. It is extremely difficult to change it back often requiring a threshold consensus. Occasionally the term "51% attack" is mentioned in blockchain news, and specific to Bitcoin, occurs when 51% of miners to conspire to change block.

Multichain, as implemented in the disclosed multichain protocol is configurable and the current design provides for that after a set number of blocks, for example every 10 blocks, everything is considered to be set in stone in the chain.

The effect of this is two-fold, by making it possible for the timing window for nodes to object to a particular block relatively narrow, it raises what is required of a 51% attack. Now instead of merely staging a coup with a majority of nodes/miners, the revolt must also be swift. While it doesn't eliminate the possibility of a blitz, it increases the amount of effort and speed required.

Second, by keeping a narrow window to object, it adds reassurance and stability to the blockchain itself. Now if data is older than the 10 blocks in our example, this data is locked and unquestionable.

Transaction Integrity and Security

Blockchain transactions are typically cryptographically secured and provide integrity. Transactions are also essentially duplicated across all ledgers, so the system is not vulnerable to data crashes.

The contemplated multichain protocol operates effectively the same, whereby every active node has a copy of the data or may request a copy of the data if it hasn't received one. As stated, this may not always be desired, the computer file holding the chain can get quite large. When a node first connects to the network, it requests an update from its peers. The longest chain in blocks received from the network is used as the current truth.

Multichain sidechains would work the same way. By only requesting what is necessary or required, a single problem may be broken up with greater granularity than what is achievable on a single blockchain.

Unlike past accounting ledgers where multiple entities maintain and have their own databases which causes all kinds of problems, blockchain provides a single digital ledger available to all parties; but multichain goes a step further by having a database on each node that can index transaction in various blocks and form a relationship. These are called a stream. Each steam appears to be a separate ledger but is actually a subset of the block chain.

Transaction Speeds

The Bitcoin network runs on a set of previously-agreed-upon rules that are built into the Bitcoin client software.

One such rule is that the difficulty should be changed every 2016 blocks to make a new block take, on average, 10 minutes to mine. As the economics change, miners will startup and shutdown making the average block take more or less than 10 minutes to find but the next time another 2016th block is mined, the difficulty will again be re-adjusted.

Bitcoin and many of its derivatives can be relative slow. There is significant work and cost involved in its proof of work, requiring large high-power computers with specialized hardware. This is because anyone can "mine blocks", so there is a difficult math problem to solve which makes the validation of blocks (which are a consolidated set of transactions) costly. Miners make the calculations to solve the problem and validate the transactions, and then add the block to the chain. There is a race to solve the problem, and only the miner that solves the problem is rewarded with the mined Bitcoin.

For that reason, there are additional fees paid to miners who successfully solve the math problem by those who post transactions. These fees are in addition to the preprogrammed fees created by the blockchain to increase the total amount of currency available (the fees are decreasing over time and will eventually go to zero so the max number of Bitcoins will be around 21 million). Miners collect all of the fees contained in the transactions that comprise the block. Because the math problem is so difficult, transactions can take more than 10 minutes to be verified and the math problem are designed from the start to gradually get more difficult.

Multichain has a feature that allows the chain administrator to specify who can mine and the math problems are much less difficult to solve. The thought here is that there is benefit to vetting miners on the frontend, so that the initial miners can create a trusted pool.

Miners merely make the simple calculations to solve the problem and validate the transactions, and then add the block to the chain. There is a race to solve the easy problem, but it is done such that the work is spread around the approved miners—every miner gets a turn at validating blocks. With multichain, the current goal is a transaction time of around a minute.

This substantial difference between architectures stems from intended design of the rewards, or coins or tokens that are rewarded.

Within Bitcoin and many other currencies, there is an established limit of coins. As stated, Bitcoin is designed to only ever allow for 21 million Bitcoins to exist. These coins however derive their value from sheer existence, and the coins themselves are what are bought and sold, being sent to unique addresses to be stored until someone spends the coin by sending it to a new address.

Within the disclosed multichain protocol, it has been established that coins have a life cycle. The coins are created, and like Bitcoin they may move around from address to address being bought and sold; but critically, unlike Bitcoin, the tokens within the multichain protocol are intended to be eventually redeemed and then lose all value. The real world offset that a unique coin represented are eventually applied against a business's output, but then by design is voided and never intended to be bought or sold again.

As such, there is not a need within the disclosed protocol to ramp up difficulty in order to maintain rarity and increasing difficulty would only punish those who created nodes on the network later than others, while a round-robin simple approach maintains fairness.

Further, because the coins created within the disclosed protocol are only created when significant actions have occurred in the physical world, in this case a farmer amending their field soil chemistry and subsequent measurements and verifications of his actions have occurred, there is less concern of a bad actor attempting to simply create and issue credits to themselves.

Further, Bitcoin does not add transactions in order. Transactions are queued and distributed to all nodes on the network. Miners themselves then select transactions from the queue, attempting to maximize their fees. Eventually, all transactions are processed, but it may take more than a block cycle time, or a party wishing to transact can offer to pay a higher fee to the miners to get priority processing, creating effectively a pay-to-play system.

In the disclosed multichain, there are no mining fees, so transactions are taken in sequence from the node's transaction queue. Unfortunately, each node cannot guarantee the queue receives transactions in the same order as another because of network latency, delays, and disconnects.

OBJECTIVE OF THE INVENTION

It is an object of this invention to tether and verify nontraditional ledger-based commodities, in this case GHG credits and WQT credits, by utilizing an LCA that addresses the creation, validation, monitoring, and retirement of carbon credits that have been directly linked to the utilization of humic substances in soil rehabilitation efforts.

It is a further object of this invention that such an LCA would contemplate the application of a fertilizer amendment to soil, in this case the substitution or addition of humic substances as to traditional N based synthetic fertilizers, and participants within this system would be rewarded with title to carbon credits that they may then use, store, or sell.

It is a further object of this invention such that the contemplated GHG and/or WQT credits would be generated based upon the calculated reduction of nitrogen oxide that would have otherwise occurred, or the verifiable water savings or improvement affected as a result of the farmers' participation in the LCA program and treating their soils with these humic substance based amendments.

It is further an object of this invention that by validating and tracking the life cycle of GHG/WQT credits that fraud, error, and other malfeasance may be addressed and eliminated, increasing market confidence and participation and incentivizing and creating forward momentum within these markets to better address concerns as to the planet increasing in temperature due in part to human activity which has added additional greenhouse gases to the planet's atmosphere.

It is further an object of this invention to provide for improvements to blockchain architecture which address problems inherent in standard blockchain design as well as problems specific in creating a blockchain, multichain, or other such blockchain variant for the purposes of issuance, tracking and retirement of carbon credits.

SUMMARY

In one aspect of the invention, a method of formulating novel humic material is disclosed comprising: mixing one or more portions of Dimethylphenylpiperazinium (DMPP) with one or more portions of N—(N-butyl) thiophosphoric triamide (NBPT) to form a portion of non-organic biostimulant material; obtaining a portion of seaweed harvest and crushing and drying the portion of seaweed to form a portion of seaweed powder; obtaining a portion of mined material and crushing the portion of mined material to form a portion of humic raw material; mixing one or more portion of animal manure with one or more portion of stover with one or more portion of organic waste to form a portion of compositing mix and composting the compositing mix to form a portion of composted product; obtaining a portion of plant waste and subjecting the portion of plant waste through an anaerobic combustion to form a portion of bio char; mixing the portion of bio char with the portion of composted product with the portion of humic raw material to form a portion of humic processed material; mixing the humic processed material with the portion of non-organic biostimulant material to form a portion of biostimulant humic product; adding a taggant to the portion of biostimulant humic product to form a portion of tagged biostimulant humic product; mixing one or more portion of phosphorus with a portion of potassium and a portion of nitrogen and a portion of trace minerals to form portion of raw fertilizer; mixing the portion of raw fertilizer with the portion of tagged biostimulant humic product to form a portion of tagged fertilized biostimulant humic product.

In one embodiment, the portion of humic processed material is in powder form. In one embodiment, the portion of humic processed material is in liquid form. In one embodiment, the method of formulating novel humic material further comprising analyzing the tagged fertilized biostimulant humic product and generating a tagged fertilized biostimulant humic product report outlining the analysis and associating the tagged fertilized biostimulant humic product report to the tagged fertilized bio stimulant humic product. In one embodiment, the method of formulating novel humic material further comprising identifying a portion of farmland and analysis a portion of soil of the farm land to generate a soil sample report of the portion of farm land and associating the soil sample report to the portion of farm land. In one embodiment, the method of formulating novel humic material further comprising applying tagged fertilized biostimulant humic product to the portion of farmland and grow agriculture crop on the portion of farm land.

In one embodiment, the method of formulating novel humic material further comprising collecting a yield data of the crop to generate a yield report and analyze the yield report to verify the application of the tagged fertilized biostimulant humic product by comparing the yield report to the soil sample report and to the fertilized bio stimulant humic product report and generating a carbon credit document for the application of the tagged fertilized biostimulant humic product.

In one embodiment, the carbon credit document is associated with the yield report and the soil report and the fertilized biostimulant humic product report. In one embodiment, the process of forming a portion of non-organic biostimulant material further comprising mixing with one or more portions of Isobutylidene-diurea (IBDU). In one embodiment, the process of forming a portion of non-biostimulant material further comprising mixing with one or more portions of with one or more portions of Polyaspartic Acid. In one embodiment, the process of forming a portion of non-organic biostimulant material further comprising mixing with one or more portions of Chitosan. In one embodiment, the process of forming a portion of non-organic biostimulant material further comprising mixing with one or more portions of Mycorrhizae.

In one embodiment, the process of forming a portion of non-organic biostimulant material further comprising mixing with one or more portions of *Rhizobia*. In one embodiment, the mined material is selected from a group consisting of Leonardite, oxidized lignite, carbonaceous shales, and humates. In one embodiment, in the method of associating the report to the tagged fertilized biostimulant humic product is selected from a group consisting of utilizing blockchain data synchronization and utilizing multichain data synchronization.

In one embodiment, in the method of associating the report to the tagged fertilized biostimulant humic product is selected from a group consisting of utilizing blockchain data synchronization and utilizing multichain data synchronization. In one embodiment, the method of associating the carbon credit document the yield report and the soil report and the fertilized biostimulant humic product report is selected from a group consisting of utilizing blockchain data synchronization and utilizing multichain data synchronization.

In yet another aspect of the invention, a novel humic material with green gas credit prepared by process is disclosed comprising the steps of mixing one or more portions of Dimethylphenylpiperazinium (DMPP) with one or more portions of N—(N-butyl) thiophosphoric triamide (NBPT) to form a portion of non-organic biostimulant material; obtaining a portion of seaweed harvest and crushing and drying the portion of seaweed to form a portion of seaweed powder; obtaining a portion of mined material and crushing the portion of mined material to form a portion of humic raw material; mixing one or more portion of animal manure with one or more portion of stover with one or more portion of organic waste to form a portion of compositing mix and composting the compositing mix to form a portion of composted product; obtaining a portion of plant waste and subjecting the portion of plant waste through an anaerobic combustion to form a portion of bio char; mixing the portion of bio char with the portion of composted product with the portion of humic raw material to form a portion of humic processed material; mixing the humic processed material with the portion of non-organic biostimulant material to form a portion of biostimulant humic product; adding a taggant to the portion of biostimulant humic product to form a portion of tagged biostimulant humic product; mixing one or more portion of phosphorus with a portion of potassium and a portion of nitrogen and a portion of trace minerals to form portion of raw fertilizer; mixing the portion of raw fertilizer with the portion of tagged biostimulant humic product to form a portion of tagged fertilized biostimulant humic product.

In one embodiment, the portion of humic processed material is in powder form. In one embodiment the portion of humic processed material is in liquid form. In one embodiment in the method of formulating novel humic material further comprising analyzing the tagged fertilized biostimulant humic product and generating a tagged fertilized biostimulant humic product report outlining the analysis and associating the tagged fertilized biostimulant humic product report to the tagged fertilized biostimulant humic product. In one embodiment, the method of formulating novel humic material further comprising identifying a portion of farm land and analysis a portion of soil of the farm land to generate a soil sample report of the portion of farm land and associating the soil sample report to the portion of farm land.

In one embodiment the method of formulating novel humic material further comprising applying tagged fertilized biostimulant humic product to the portion of farmland and grow agriculture crop on the portion of farmland. In one embodiment in the method of formulating novel humic material further comprising collecting a yield data of the crop to generate a yield report and analyze the yield report to verify the application of the tagged fertilized biostimulant humic product by comparing the yield report to the soil sample report and to the fertilized biostimulant humic product report and generating a carbon credit document for the application of the tagged fertilized bio stimulant humic product.

In one embodiment the carbon credit document is associated with the yield report and the soil report and the fertilized biostimulant humic product report. In one embodiment the process of forming a portion of non-organic biostimulant material further comprising mixing with one or more portions of Isobutylidene-diurea (IBDU). In one embodiment the process of forming a portion of non-biostimulant material further comprising mixing with one or more portions of with one or more portions of Polyaspartic Acid. In one embodiment the process of forming a portion of non-organic biostimulant material further comprising mixing with one or more portions of Chitosan. In one embodiment the process of forming a portion of non-organic biostimulant material further comprising mixing with one or more portions of Mycorrhizae. In one embodiment the process of forming a portion of non-organic biostimulant material further comprising mixing with one or more portions of *Rhizobia*. In one embodiment the mined material is selected from a group consisting of Leonardite, oxidized lignite, carbonaceous shales, and humates. In one embodiment in the method of associating the report to the tagged fertilized biostimulant humic product is selected from a group consisting of utilizing blockchain data synchronization and utilizing multichain data synchronization. In one embodiment wherein in the method of associating the report to the tagged fertilized biostimulant humic product is selected from a group consisting of utilizing blockchain data synchronization and utilizing multichain data synchronization.

In one embodiment wherein the method of associating the carbon credit document the yield report and the soil report and the fertilized biostimulant humic product report is selected from a group consisting of utilizing blockchain data synchronization and utilizing multichain data synchronization.

BRIEF DESCRIPTION OF THE DRAWINGS

The present invention will be understood and appreciated more fully from the following detailed description taken in conjunction with the drawings in which:

—FIG. 1 is a flowchart diagram illustrating the broad top-level exemplary embodiment of a method for sourcing and refining humic substances and reducing them to a fertilizer additive.

DETAILED DESCRIPTION OF THE DRAWING

The figures and flowcharts as indicated set forth various embodiments of the present invention and are intended to communicate the preferred embodiment of the invention unless otherwise indicated.

Figure 1:
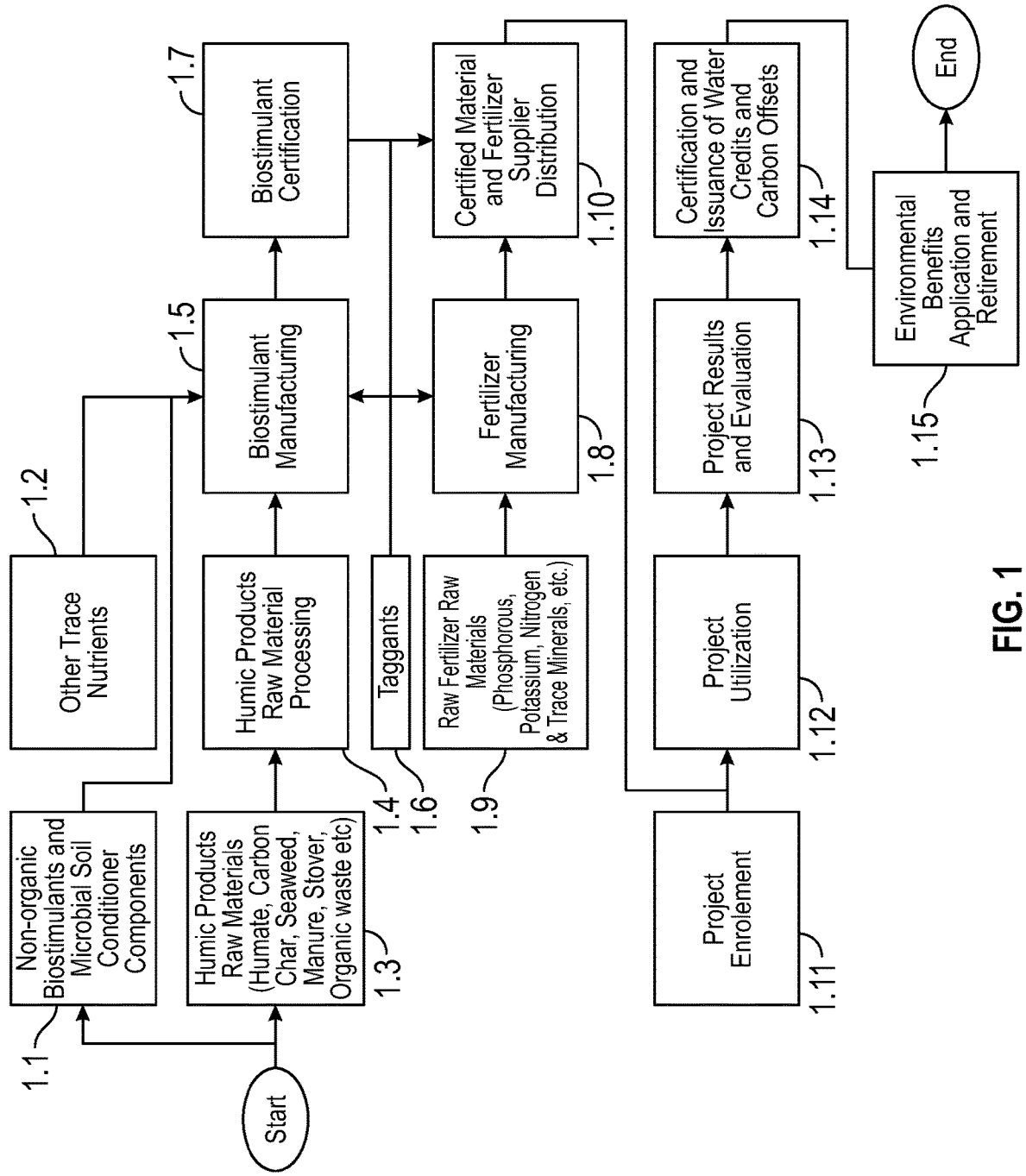
FIG. 1.

Before diving into FIG. 1 itself, it must be observed that critical to the described invention, and in order to address the problems as described above several necessary sub-processes must be described, in depth, in order to sufficiently address the sourcing and refinement of humic substances into a refined biostimulant.

As such, this specification will divulge and describe many of these processes such that a practitioner can understand how to source and produce the refined bio stimulants, and later in the specification, now that these manufacturing processes are understood the focus can be then shifted to the blockchain and multichain architectures and how these sub-processes and physical materials are accounted for. As it will be explained further below, many of theses sub-processes have critical "measurement points" where, in a preferred embodiment, data is collected and entered into the blockchain or multichain to be tracked for various quantitative or determinative purposes.

To reiterate, in order to address global warming and the problems which currently plague the greenhouse gas credit system which is meant to incentivize GHG reduction, the divulged invention contemplates a system which tracks and verifies these previously ephemeral GHG credits, and describes processes which grounds these credits with observable, verifiable physical processes which account for and track a produced GHG credit from its inception to eventual retirement. By applying this Life Cycle Approach, a carbon credit no longer is something that is created from thin air to exist only in disparate ledgers. By grounding a carbon credit to a real and physical process that is tracked with an electronic record that is fraud resistant, the very notion of carbon credit markets can then be bolstered and traditional issues concerning lack of trust or mutuality dismissed.

With this in mind, FIG. 1. sets forth a top-level overview flow chart of a preferred embodiment of the invention, indicating the various primary processes, some of the critical subprocesses and communicates the overall recommended order of operations.

As the invention requires a humic substance derived biostimulant, it must first be explained what components go into this biostimulant, where these components are sourced, and a preferred processing and manufacturing process described.

The contemplated biostimulant is derived from a combination of non-organic biostimulants and microbial soil conditioner components (FIG. 1.1); processed humic substances that have been derived from at least one of a variety of identified raw materials known to contain humic substances (FIG. 1.3); and when appropriate, additional trace nutrients (FIG. 1.2) that have been deemed lacking in the target soil to be enriched.

As will be explained later when the blockchain/multichain architecture is explained, when a farmer enrolls in the described GHG Credit Awarding program, a sample of the initial state of the target soil to be treated is obtained. It is on the basis of this initial sample, the health of the soil can be determined, and in conjunction with the crop requirements, time-line restrictions, and the physical location of the target field and expected weather conditions and the like, a recommended biostimulant additive formulation can be prescribed and produced, tailor made for the unique circumstances this particular soil would require to achieve the desired health. These check-ups also ensure that the farmer is participating and applying the recommended treatments as prescribed. Put another way, it can be analogized to a doctor attempting to treat a sick patient, but with the ability to synthesize medicine designed specifically for that patient. This alone is something far more beneficial than the current state of farming which until now has been content to farm or fertilize soil until it is either barren or toxic, without even considering the potential to reduce GHG emissions.

The purpose and benefit of creating these tailor-made soil treatments explained, let us return to the contemplated precursor components themselves and examine each individually.

Figure 2:
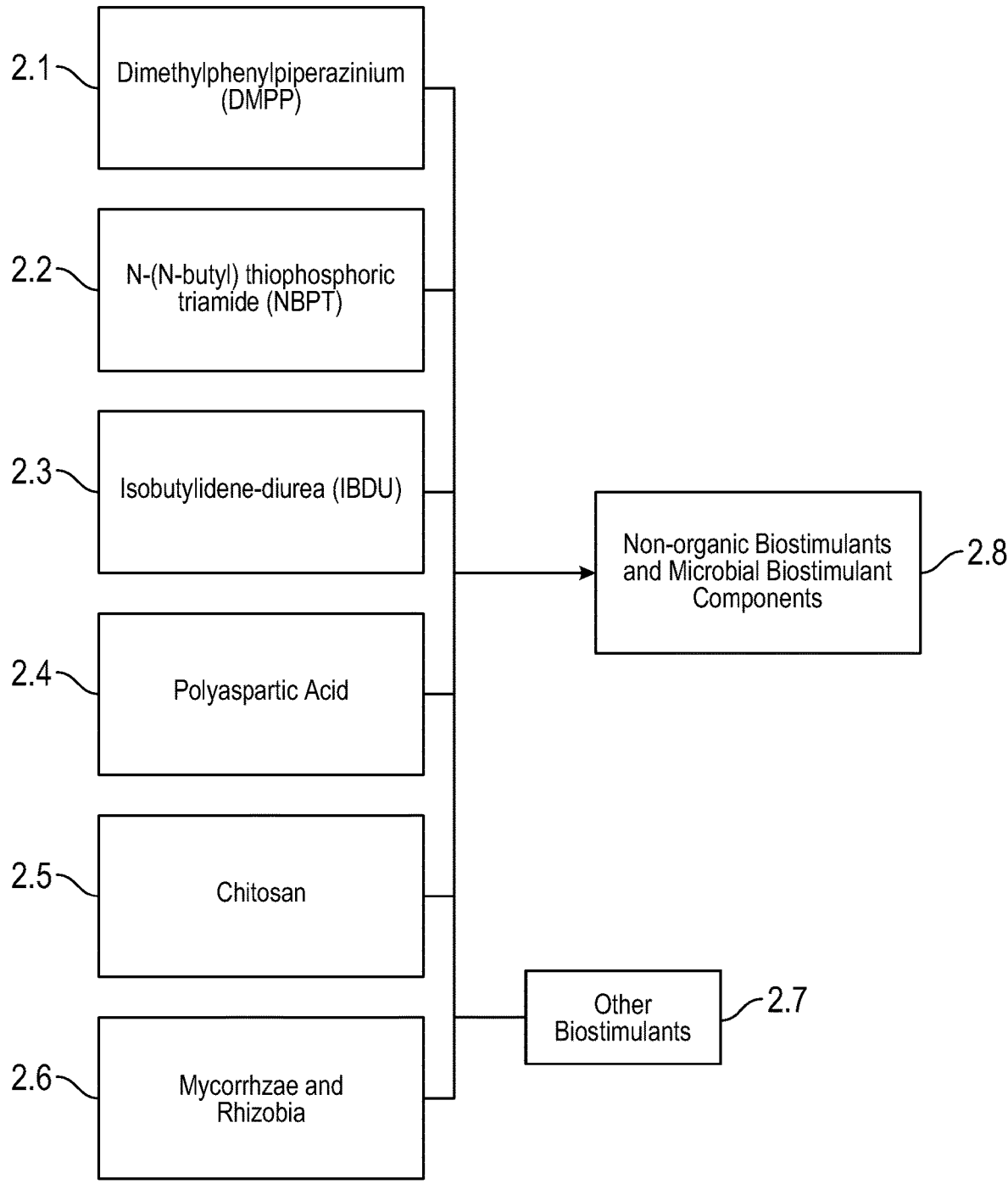
FIG. 2.—Non-organic Biostimulants and Microbial Biostimulant Components (1.1 of FIG. 1)

Non-Organic Biostimulants and Microbial Soil Conditioner Components (FIG. 1.1; FIG. 2)

Contemplated non-organic biostimulants and microbial soil conditioner components (1.1) are indicated with specificity in subsequent FIG. 2—Non-organic Biostimulants and Microbial Biostimulant Components, and currently discloses the inclusion of dimethylphenylpiperazinium (DMPP) (2.1); N—(N-butyl) thiophosphoric triamide (NBPT) (2.2); isubutylidene-diurea (IBDU) (2.3); phosphoric triamide (BNPO) (2.7); polyaspartic acid (2.4); chitosan (CHT) (2.5); mycorrihizae (2.6); *rhizobia* (2.6); formalized casin (2.7); and/or other chemically similar non-organic biostimulants (2.7).

DMPP (2.1) is effective during the first step of nitrification. It reduces the activity of ammonium oxidizing bacteria (represented by *Nitrosomonas*) in the soil, and then hinders the conversion of NH4-N to NO3-N, so as to avoid the leaching or volatilization of nitrogen. It has no effect on the second step of nitrification, but as long as the first step of nitrification is inhibited, the whole nitrification reaction is inhibited.

An experiment was conducted to relate the effectiveness of N-(n-butyl)thiophosphoric triamide (NBPT) (2.2) and its oxon analog N-(n-butyl)phosphoric triamide (BNPO) (2.11) in controlling urea hydrolysis in soils to their corresponding soil concentrations. Both compounds were applied to an acid soil (pH 4.9) and to the same soil that had been neutralized (pH 1.1) by long-term liming or by the recent application of Ca(OH)2. Hydrolysis of urea applied with the inhibitors was monitored along with the disappearance of the compounds themselves. Both compounds-controlled urea hydrolysis much more effectively in the neutral soils than in the acid soil. HPLC analysis of soil extracts demonstrated that both compounds disappeared more rapidly in the acid soil, and that the compounds disappeared at similar rates for both neutral soils, indicating that pH governed disappearance rates in these soils. Disappearance rates were generally first order for both compounds, although NBPT disappeared at an accelerated rate at low concentrations, presumably due to its simultaneous conversion to BNPO. The effectiveness of both compounds in controlling urea hydrolysis was closely related to the concentrations of BNPO found in the soil. BNPO was generally maintained at higher concentrations following NBPT application than when BNPO was applied directly to soil.

IBDU (2.3), has been shown in experiments to influence soil pH and Nitrogen recovery and release pattens. IBDU is used as a slow acting nitrogeneous fertilizer and may be used—instead of conventional urea—as a source of nitrogen in the nutrition of ruminants.

Polyaspartic acid (PASP) (2.4) is a nontoxic, biodegradable, environmentally friendly polymer and is widely used as a fertilizer synergist in agricultural production. In many old orchards and vegetable gardens, highly fertile soil is often accompanied by severe heavy metal contamination.

Chitosan (CHT) (2.5) is a natural, safe, and cheap product of chitin deacetylation, widely used by several industries because of its interesting features. CHT has been proven to stimulate plant growth, to protect the safety of edible products, and to induce abiotic and biotic stress tolerance in various horticultural commodities. The stimulating effect of different enzyme activities to detoxify reactive oxygen species suggests the involvement of hydrogen peroxide and nitric oxide in CHT signaling. CHT could also interact with chromatin and directly affect gene expression. Recent innovative uses of CHT include synthesis of CHT nanoparticles as a valuable delivery system for fertilizers, herbicides, pesticides, and micronutrients for crop growth promotion by a balanced and sustained nutrition. In addition, CHT nanoparticles can safely deliver genetic material for plant transformation. This review presents an overview on the status of the use of CHT in plant systems. Attention was given to the research that suggested the use of CHT for sustainable crop productivity.

Mycorrhiza (2.6) refers to mycorrhizal fungi, which are actually living organisms. A plant's root system, however big, can never be as extensive as the network of fungal fibres. The microscopic filaments grow through the soil and reach much more nutrients than the roots would. When you treat your plants with mycorrhiza, you can be sure that they will use the whole potential of the soil.

*Rhizobia* (2.6), another organism, are nitrogen-fixing bacterium that are common to healthy soil, and are found especially in the root nodules of leguminous plants. In general, they are gram negative, motile, non-sporulating rods.

Other potential biostimulants which may be added depending on the needs of a particular soil treatments FIG. 2.7 and might include substances from the 4 major classifications of soil additives, a non-exhaustive listing of sub-types that fall under 1 or more of these 4 major subcategories as indicated in Chart 5—The Emerging Landscape of Soil Additives pg 28 above.

Additional Trace Nutrients (FIG. 1.2)

Plants need thirteen different minerals from the soil in order to fully develop. Six of these nutrients are needed in large quantities. These six essential nutrients are nitrogen, phosphorus, potassium, magnesium, sulfur and calcium.

Plants also need small quantities of iron, manganese, zinc, copper, boron and molybdenum, there are known as trace elements because only traces are needed by the plant.

Pre-Processed Humic Substances (1.3)

While the traditional non-organic bio stimulants and microbial soil conditioner components (1.1) and trace nutrients (1.2) are already fairly well understood, it is one of the primary purposes, and the intent of the disclosed protocol to account for humic substances and promote their benefits and use as an alternative to the previously discussed artificial nitrogen based fertilizers in order to lead to the reduction of GHG released into the atmosphere.

Figure 3:
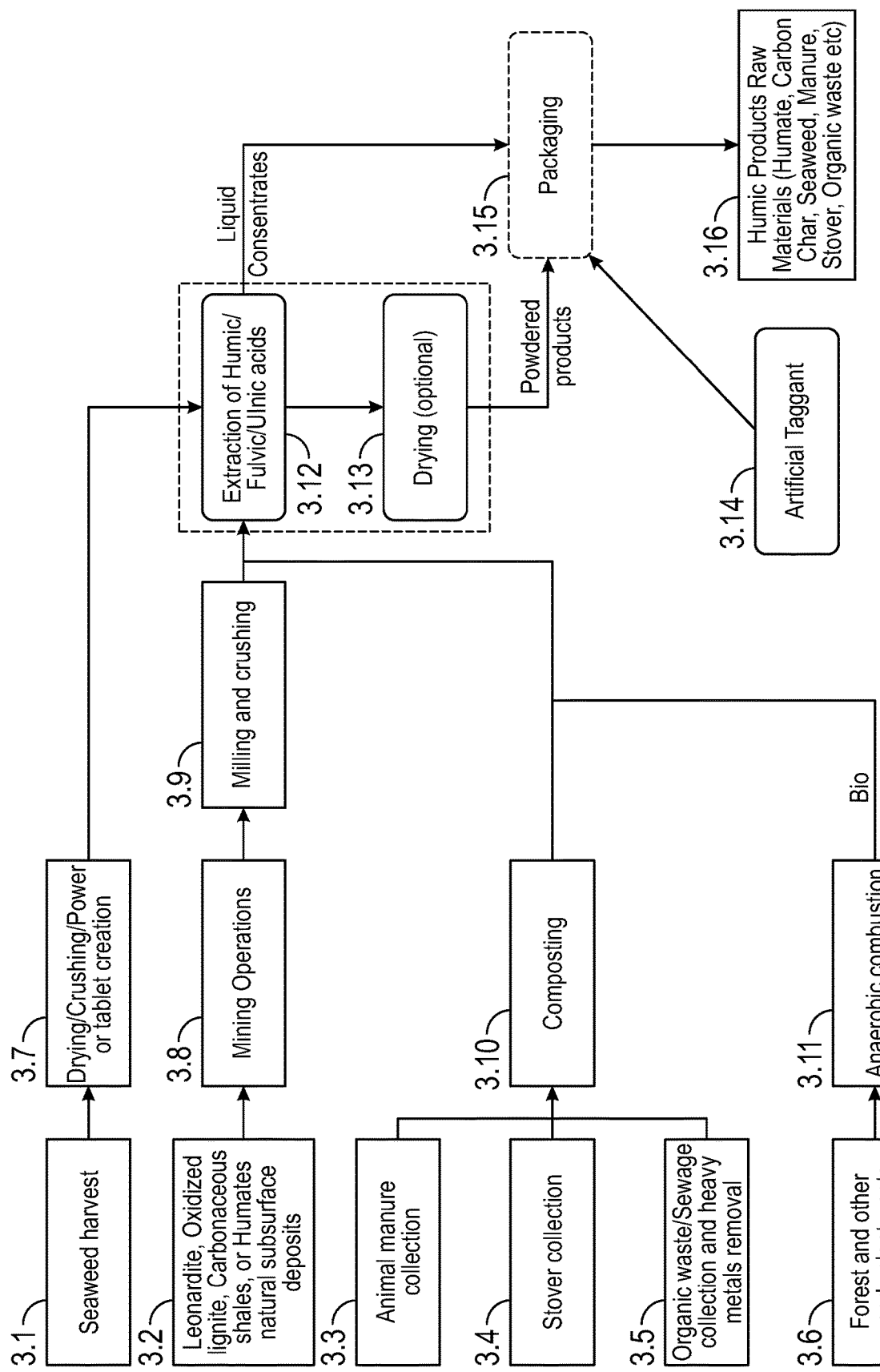
FIG. 3.—Humic products Raw Materials (Humate, Carbon Char, Seaweed, Manure, Stover, Organic Waste) (1.3 of FIG. 1)

Subsequent FIG. 3—Humic Products Raw Materials explores and explains the four subcategories of considered raw material sources for these additives which are processed for the purposes of the invention, and attempts to explain preferred methods of sourcing, processing, and the benefits derived.

These subcategories can be first broadly described as 1. Seaweed (3.1) 2. Composted products (3.3, 3.4, 3.5) 3. Woody products (3.6) and 4. Naturally occurring minerals which are mined. (3.2) Each will be discussed and described in detail next.

Humic Products Raw Material Source Subtypes (1.3; FIG. 3)

Seaweed (3.1)

Raw material source: Kelp products

Dried kelp will usually contain 1.6 to 3.3% nitrogen, 1 to 2% $P_2O_5$ and 15% to 20% $K_2O$.

Purpose:

Valued as a growth stimulant because of rich concentrations of trace minerals (over 60), amino acids, vitamins, and growth hormones, including cytokinins, auxins and gibberellins. Available in meal, powder, and liquid forms. Very good for seedlings and transplants.

Process for refinement: drying/crushing/powder or tablet creation (3.7)

Naturally Occurring Mined Minerals (3.2)

Raw material source: Leonardite, oxidized lignite, carbonaceous shales, or humates Humus is the stable, end product of the decomposition of soil organic matter. It holds water and nutrients, aids soil aggregation, is a source of humic acid and chelates, and contains huge microbial populations.

Humates, the boarder term used to describe the raw mined ancient organic soil, is distinguishable from peat. Unlike peat, humate is thoroughly decayed or mineralized, so nutrients are instantly available to plants. Humate typically will contain up to 35% humic acids material that helps dissolve other nutrients for plant utilization. Manures and yard waste compost also contain humic acids Purpose:

Potassium humate is the potassium salt of humic acid. It is manufactured commercially by alkaline extraction of brown coal (lignite) Leonardite to be used mainly as a soil conditioner. Depending on the source material product quality varies.

High quality oxidised lignite (brown coal), usually referred to as leonardite, is the best source material for extraction of large quantities of potassium humate.

Leonardite is a soft brown coal-like deposit usually found in conjunction with deposits of lignite. Leonardite contains a higher oxygen content than lignite and is believed to be an oxidized form of lignite. Chemical studies of the composition of leonardite have revealed that it is mainly composed of the mixed salts of acid radicals found in humus, a product of the decay of organic matter which contains both humic and nonhumic material. Such acid radicals are collectively termed humic acids, individual fractions of which are humic acid, ulmic acid and fulvic acid. Oxidized forms of humic acids such as phenyl acetic acid and indol acetic acid have been found with the humic acids in the leonardite.

The less oxidized the coal the less potassium humate extracted. Sources low in ash produce the best quality. Less oxidized brown coal contains a higher proportion of the insoluble humin fraction and along with peat which is lower in humic acid content and usually high in ash content requires separation by filtration or centrifugation to remove ash, humin.

Process for Refinement:

mining (a); milling and crushing (b) (3.8, 3.9)

Composted Products (3.10)

Raw Material Source: Animal Manure Collection (3.3); Stover Collection (3.4); Organic waste/sewage collection/heavy metals removal (3.5); or compost (3.6) (commercial or "home-grown"): made from decayed organic materials such as straw, corn cobs, food wastes, cocoa bean hulls, poultry litter, grass clippings, leaves, manure widely available from farms that has been mixed with bedding material and allowed to compost and age for at least 4-6 months; and/or mushroom compost, used or "spent" compost from mushroom farming which itself is typically some combination of manures, wheat straw, corn cobs, feathermeal, peanut meal, peat moss, lime, etc.

Purpose:

Composts improve soil structure and slowly release nutrients to plant roots.

Farm manures usually contain 1% or less each of N, P, and K. Rabbit, sheep and chicken manure are higher in these nutrients. Manure mixed with urine-soaked bedding will be higher in N. Approximately 20-40% of the nitrogen is available to plants the first year after application. Weed problems may occur when the entire compost pile does not reach sufficiently high temperatures. A heavy organic mulch will help smother weeds.

Mushroom compost—Mushrooms grown in this media use only a small portion of the many nutrients. Nutrient analysis: 2.75-1.5-1.5. Can have high soluble salt levels and should be fully incorporated and watered prior to planting.

Process for Refinement:

composting (3.10)

Woody products (3.6) Types: Forest and other woody plant waste; wood ashes; peat moss; and peat.

Purpose:

Wood ash analyses shows it tends to run from 1 to 2% phosphorus and from 4 to 10% potassium. Hardwood ashes are 45% carbonate equivalent and are half as effective as lime for raising soil pH. Softwood ashes are less effective than hardwood. Ashes are too fine to improve soil structure. The recommended yearly application rate is 25-50 lbs./1,000 sq. ft. At higher rates, test soil pH yearly.

Peat is a high in non-humified organic matter that needs to be reduced to produce a high-quality product. The benefit of peat is that it is usually 2-3 times higher in fulvic acid content, which are the low molecular weight fractions of humic acid that are high in oxygen containing functional groups and soluble at a low pH of <1. Fulvic acids have a higher cation exchange capacity and therefore have a higher chemical interaction with fertilizers and are able to form soluble chelates of trace metals.

Peat moss itself is partially composted moss mined from prehistoric non-renewable bogs. Light and porous, it absorbs 10-20 times its weight in water. Its high surface tension causes it to repel water when it's dry, so do not use as mulch or top-dressing. Contains little nutrient value but has a high nutrient-holding capacity. Acidic (as low as 3.0 pH); good for working into azalea and blueberry beds.

Process for Refinement:

anaerobic combustion which creates bio char (3.11)

Pre-Processed Humic Subtype Discussion (FIG. 1.1; 3.16)

This is by no means an exhaustive analysis of natural sources for humic products, and it is reasonable to believe that as technology continues to evolve that additional sources might be discovered, or other commercially impractical precursors may be utilized in the future.

One point that is important to identify, and will be explored and explained in greater depth below as the blockchain/multichain architecture is discussed is that these materials can be sources from many different places globally, and that because these raw materials are sourced from nature, there is necessarily variability, such that it is reasonable to expect that for example seaweed sourced at one geo-location at a particular point in time is unlikely to be identical to another sample of seaweed sourced from another location, or perhaps even from the same location but different time of year. Much as wineries have illustrated, one vintage of wine from one year is unlikely to be the same the following year, there are simply too many variables, such as weather, that are currently impossible to account for.

The divulged invention and system is meant to address this in that inherent to the blockchain/multichain architecture are points in time during sourcing, harvesting, and production process, sampling and cataloguing occurs.

The intent of this is to allow for greater granularity than is currently seen in many industries, specifically the fertilizer industry, and to allow for optimal formulation of a fertilizer biostimulant treatment for a specific target field, effectively designer fertilizer will be enabled. This addresses the current "one size fits all" mentality that currently plagues the commercial farming industry, such that for example, a farmer may now potentially be using the most optimal seaweed based fertilizer sourced down to the most optimal seaweed precursor.

Additionally, this measurement and cataloging process serves a wholly separate but equally valuable purpose, it operates as a validator, and proof of work as to both the final treatment that a farmer applies, and gives up-chain information on all that was done, and what went into that particular formulation. This helps to deter concerns of fraud, as it is easier to perform forensics if there is any question.

Another benefit of having all of this information entered into the blockchain/multichain as to when, where, and what as far as the precursors utilized is that it builds an enormous database, which in conjunction with the information and outcomes observed in fields post-treatment allows for effectively a artificial intelligence type system, whereby the predictive treatments for soils and crops become better and better. It is reasonable to believe that on a long enough timeline, several breakthroughs will be discovered, much as the medical community has experienced whereby some obscure plant from the rainforest is later observed to have tremendous benefits to very particular diseases.

These subcategories of natural sources of humic substances each goes through their own distinct preprocess to get the materials workable (1.4), for the next stage of production (1.5; 3.12): the one or more precursors will be added to a mixture, such that the desired humic/fulvic/ulnic acids can then be mechanically and chemically extracted as a liquid concentrate from that mixture (1.5; 3.12)

As such, it is desirable that these raw organic materials be preconditioned for extraction and distillation by composting, digestion, mechanical grinding or screening processes sufficient to obtain a particle size of one-fourth inch (¼) or less from the post-processed raw organic material.

Biostimulant Manufacturing (FIG. 1.5; 3.12)

In dry granular production, in most cases, the organic material will need to be at least thirty percent (30%) by dry weight of the finished product in order to produce enough humic acid molecules to bond to the added inorganic elements or plant nutrients. In practice, it has been found that if the amount of organic material is not adequate or the plant nutrient materials are formulated too high, the excess will create regular soluble salt forms of fertilizer as there will not be enough available humic acid molecules for the inorganic salts to bond with the molecular clusters. At this point, trace mineral elements can be added in small amounts to one percent (1%) or less of the mix to fulfill specific needs as required.

Humic Substance Extraction Process (FIG. 1.5; 3.12)

Extraction of humic acid and related materials from carbonaceous raw materials has been practiced for years and is accordingly known in the art. Process steps vary, but the goal output is generally a particulate material with suboptimal solubility in water such that the humic materials may be easily formulated and reincorporated into soil and soil treatments at a later date.

For most organic materials it has been observed that the requisite hydrolysis can be accomplished by the introduction of an initial acid, other than humic acid, to the mixture, the most commonly utilized and generally preferred acids being sulphuric and/or phosphoric acid, to achieve a pH thereof to at least 1.5 but ideally less and more in the range of 1.5 to 0.2.

After mixing the described components, a reaction occurs whereby there is both a rise in temperature and a release of gas sufficient to increase air pressure. As such, a base such as anhydrous and/or aqua ammonia should then be added to the mixture to then raise the pH above 2 again, past the initial pH and generally recommended at or around 6.5 pH, the general recommended pH for soil treatments.

In the alternative, where the soil is significantly damaged and requires greater treatment and care, this pH can be adjusted to match the ideal purpose of the soil or for what the crops may be expected to require.

Effectively this becomes a mixture whereby it has first been treated with an acid, and then a second treatment with a base to readjust the pH back to levels required of the soil to be treated.

Because of the variability of organic matter being utilized, the acid-ammonia ratios must first be determined by actual reaction tests to be accurate. However, in practice, it is usually the case that around three parts (by weight) of one of the acids to one part of anhydrous ammonia will be needed in order to formulate an end product having a neutral pH of 7.

Next, a measured amount of the sulphuric and/or phosphoric acids must be used which will be sufficient to initially drop the pH of the mixture to a level of 1.5 or less. The amount of acid used is generally going to be from fifteen to thirty percent (15% to 30%) by weight for a granular end product, and from five to fifteen percent (5% to 15%) for a slurry mixture end product. The aqua and/or anhydrous ammonia added thereafter must likewise be in a sufficient amount to raise the pH of the acidified mixture to that desired as the finished fertilizer pH. Therefore, the nitrogen present in the organic matter and the inorganic elemental forms of nutrients must be measures, considered, and balanced against the nitrogen which will also be provided by consequence of the ammonias which are introduced later in the process.

It is contemplated that it is beneficial in some circumstances to then add the additional process of drying (FIG. 3.13) this liquid concentrate such that a powdered residue is produced. The primary benefit derived from drying would be a reduction in packaging and shipping costs. The expectation however is that powdered concentrate would only be appropriate when the farmer or end user had the necessary skill and equipment to add this dry additive to a hydrated fertilizer mixture on the farmers end to the disperse the soil treatment to the same efficacy as if the farmer had received a complete prepared fertilizer from the manufacturing facility. (1.5; 1.6; 1.7; 1.8)

Drying extraction (3.13) is performed in water with the addition of potassium hydroxide (KOH), as well as sequestering agents and hydrotropic surfactants that are both sufficient to react, but selected, again in relation to what is necessary to improve the soil which is being targeted for treatment. Heat is then used to increase the solubility of the humic acids which increased the strength of the reaction and its corresponding yield, allowing more potassium humate to be extracted.

This resulting liquid is then dried, typically by heat lamp or indirect heat in moisture-controlled environments in order to produce the amorphous crystalline like product which can then be added as a granule to fertilizer when the fertilizer is being reformulated for use. The potassium humate granules by way of chemical extraction will lose their hydrophobic properties and are now soluble as consequence.

Aspects of several such processes are described below to illustrate certain aspects known processes such as is described in various embodiments herein and is not to intended to be construed as strictly limiting a practitioner who may reduce a prepared slurry mixture in one of these described methods, a combination of these methods, or perhaps other methods which may be available.

In an example, production of a granule enriched in humic acid was undertaken as a multi-step process comprising the blending of raw material and an alkaline mixture in a blend tank; screening of the blended mixture that was made in the blend tank; drying of the liquid derived from screening of the blended mixture, thereby forming a fine powder; and conversion of the fine powder to form granules.

In another example, the selected organic material is prepared and mixed with measured amounts of the major elements and other plant nutrients as needed, and the mix placed in a closed vessel. For most organic material, an acid, either sulfuric or phosphoric, is added and mixed therewith to provide hydrolysis of the constituents via a drastic pH change. At this stage the mix temperature will be elevated responsive to the acid reaction, the mix will be under pressure, and will have a mix pH that is usually less than 1.5. This step initiates the breakdown of the organic material to humic acid and formation of molecular clusters of plant nutrients around the humic molecules. Next, a basic solution is introduced into the closed vessel and mixed with the constituents, reacting with the acidic mix to further elevate the temperature and pressure within the vessel, which elevated temperature and pressure completes the reaction and molecular bonding, and raises the mix pH to a less acidic pH, usually from 4 to 7 pH. The selection of which pH is dependent upon the type of soil that the humic acid fertilizer is intended for use in. The finished mix is then processed through a granulator to obtain a desired particle size or is pumped into a storage vessel or pit if a slurry is produced.

Returning then to the top level FIG. 1, this bio stimulate is either considered complete and ready for packaging (3.15), tagging (1.6; 3.14) and certification (1.7), or it is contemplated in some instances, the tagged bio stimulate will be additionally be first incorporated into a fertilizer, and this fertilizer as a whole is what is certified. (1.8)

Where it is the later, the additional raw components contemplated to manufacture this fertilizer to be certified would include phosphorous, potassium, nitrogen, and other traditional, well-known soil conditioners. (1.9)

To produce a desired end fertilizer typically requires that the relative percentages of constituents thereof that are commonly known as the fertilizer major elements N—P—K—S (Nitrogen-Phosphate-Potash-Sulfur) are first taken into account along with the quantities of the major elements contributed by the selected acid and base in determining the amounts of these major elements to be added to the mix to produce the desired finished fertilizer. As has been discussed, because soil health and restoration is a goal of the described invention, a further step is to also account for the soil to be treated such that often the result is a finely tuned "designer" fertilizer meant to maximize the potential of the treatment and achieve maximum benefit to the farmer or other end user of the targeted soil.

Prior to mixing of the inorganic elements with the select organic materials, the organic materials should and will to have been preprocessed by composting, mechanical grinding or other sufficient processes such as to obtain a raw material particle size of at least one-fourth inch (¼) or less.

In dry granular production, in most cases, the organic material will need to be at least thirty percent (30%) of the mixture by dry weight of the finished product in order to produce enough humic acid molecules sufficient to bond to the added inorganic elements or plant nutrients.

At this point, additional trace mineral elements may also be added in small amounts to one percent (1%) or less of the mix to in order to address and fulfill specific needs of the targeted soil as required.

With sufficient processes described to produce either a dried bio stimulant additive for transport and fertilizer formulation or a final prepared humate enriched fertilizer, we can return to the top-level diagram, and discuss the necessary taggants (1.6) and certification (1.10) processes which will be required by the disclosed invention in order to track, validate, and award greenhouse credits.

Tagging (1.6; 3.14)

Regardless if the resulting extracted and refined powdered or liquid mixture, or if a fertilizer treatment itself is produced, an additional taggant (1.6; 3.14) is either determined on the basis of the formulation by sample analysis, or other instances, it may be preferable that an additional inert taggant will be included in the mixture. Traditional bar/QR/label are a human convenience. The problem with these identifiers however is the potential for counterfeiting which may then require expensive countermeasures. Because one of the main purposes of the disclosed invention is to deter fraud in order to bring some stability to the carbon credit market, it is important that at multiple stages measurement and validation occur, and desirable to allow for verification to occur, perhaps many years down the road.

In some instances where mined minerals are sourced for the extracted concentrate humic/fulvic/ulnic acid mixture, there is the potential to consider the trace minerals which naturally occur at a particular mine site to be unique enough such that these trace minerals themselves might be used as an inert natural taggant. (3.14). While trace minerals are innocuous and common, it is rare to find the same concentrations of trace minerals from one mining site as to a sample taken from another mining site, or even among different depths at the same mining site. In many instances, these organic tags as prescribed may be sufficient or preferred as they are inherently natural, biodegradable and safe for the environment and there may be unique concentrations such that it is highly unlikely that the same "tag" is to be found elsewhere.

Alternatively, a method that is currently in wide use in the commercial explosive, pharmaceutical, and cosmetics industries, are the inclusion of micro taggants. These are normally microscopic artificially created items that are added to the product during production to prove the origin and/or manufacturer. Inert solid to liquid phase changing nanoparticles of various types and melting temperatures are now readily available and can be added to synthesized materials to provide a unique, harmless, natural "barcode" which can be measured for years down the road. In the case of pills or expensive cosmetics, these are inert and designed to pass through the body or otherwise be unnoticeable.

As mentioned previously, at its core, the disclosed invention, in order to successfully lower greenhouse emissions, must account for and influence human behavior itself.

As such, at all stages, from procurement, to refinement, to use, so too then must one be able to measure and hold those at that stage accountable. In order to address these concerns, the described invention contemplates a system which allows for cataloging, measurement, and comparison across multiple data streams to defeat any attempts to defraud and to ensure compliance.

In the case of the described invention, as to the manufactured products created from the humic acids extracted from humate precursors, using a taggant has two important contemplated purposes:

1. Tracking formulation batches and the precursors that were used to create them both enables to verify the validity of a formulated soil treatment, as well as enables greater granularity in precursor inventory management as to both what is available, but also what alternatives are preferable if optimal precursors are in short supply.

Prior to the formulation of a treatment, beginning with the sourcing of the precursors, the described system enables one to create effectively an entire inventory catalogue of humic precursors, including what was mined or harvested, the gsp locations of the procurement site, the date of procurement, and additional granularity specific to precursor subtype. For example, as was described, mining material is not expected to be consistent, and thus it is important to distinguish what was mined at a location 50 feet down from what was obtained 250 feet down.

Similarly, if the precursor is seaweed material, it may be beneficial to indicate the subspecies of seaweed harvested, as well as other indicators important for maritime sourced material, potentially sampling of the waters themselves for trace minerals, weather, water temperature, depth, and the like.

Reaching back to the winery analogy that was discussed above, as with wine quality and taste will depend on the grapes, the primary precursor, and as there are so many variables to account for, it has been difficult if not impossible for wineries to replicate vintages; so too is it an oversimplification to believe that all humic precursors can be swapped and the same results expected or achieved.

As will become clearer in subsequent discussion and examples, an additional goal of the disclosed invention is to provide a method for creating and prescribing optimal soil treatments. As such, it is wholly reasonable to believe that a particular "vintage" of humic precursor might be found to work the best on particular initial soil conditions. As such, it is critical to enable a user of the invention to catalog and track all materials. Only then, can those precursors be tracked down and included. But further than that, it is equally reasonable to believe that should the determined optimal precursor be in short supply or not financially feasible, it may be a wholly different precursor subtype that might work as the next best treatment.

For example, Farmer A elects to enroll his field in the described soil treatment/greenhouse gas credit program. A sample of the current state of his field occurs and it is determined that the field requires precursor A, precursor B, and a small amount of precursor C to restore field health, reduce emissions, and for the farmer to receive credit for program participation. However, it is found that the optimal precursor A is a mined humic substance, which was mined 2 years ago in Cuba, N. Mex. at a depth of 100 ft, of which 20 tons were shipped to warehouse X. This precursor A, while known, is depleted and all has been used. Because enough trials have been run, it has been determined that the next best precursor is precursor D, a seaweed which was harvested and dried last year, sourced from the coast of Santa Barbara and stored at warehouse Y, of which 2 tons are available.

This setup uniquely allows for the system to determine the next best precursor, which may be disparate in originating time, location, place, and material.

Further, it allows for a unique opportunity of cost-benefit analysis whereby perhaps the precursor D has 98% efficacy and is a less than optimal, but good substitute. In other instances, though, it may be that any other available precursors are suboptimal. As such, this serves to operate as a precursor inventory management system, whereby it becomes more obvious if and when mining operations may be required again in Cuba, N. Mex. to obtain this rare precursor A, or if alternatives are readily or more easily obtained, then effort, money, resources, and notably additional green house gas output costs associated with refinement may be avoided entirely.

As a natural consequence of tracking the precursors upstream from when a particular formulated batch of soil treatment is created, as a natural consequence of tracking all of those precursors as well as the point in time that those precursors are utilized and accounted for in the blockchain or multichains, so too then is the genesis of a particular batch validated.

That is, if the system is tracking that 10 ton batch was created on 1/1/2020 which contained precursor A in 3 tons, and precursor B in 5 tons then on the blockchain or multichain which accounts for activity on precursor A and on a separate precursor accounting for precursor B, corresponding transactions will occur indicating use occurring and for what purpose. Because so many measurements are occurring, on distinct data streams, it becomes significantly more difficult, if not wholly impossible for a fraudulent batch to be created.

This of course, relates back to the underlying architecture of multichain-blockchain hybrid architecture whereby at all times there are multiple copies of ledgers being compared across nodes. With traditional blockchain, it becomes a task whereby a bad actor must control the consensus threshold to validate a "bad" transaction. Effectively a bad actor must control enough nodes that they vote on their preferred version of the transaction, and others in the minority then adopt that transaction.

In multichain architecture, such a proposition becomes significantly more difficult as the bad actor no longer is attempting to insert their modified copy of the ledger, but now is faced with modifying several separate streams which are more that likely going to have different witness/consensus nodes. Now instead of the bad actor "rail-roading" their ledger they must attempt to railroad several different data points, simultaneously, which in of itself broadcasts that a particular node is attempting to defraud the system.

2. Subsequent Verification of the Formulated Treatment being Formulated According to Prescription and Verification of the Treatment being Applied to Target Soil The inclusion of micro taggants also has consequences downstream of batch creation which speak to quality controls and other types of counterfeiting and fraud.

Necessarily, because what is being attempted is effectively a highly tuned, designer soil treatment, it becomes important that sampling can be taken of formulated treatments to audit the factories which are producing the treatments. If each batch is indicated with a unique identifier, which then points towards a formulation catalogued on a fraud resistant data stream, it becomes a simple effort to then sample that physical product and compare it chemically with the associated description.

This operates as an additional security feature against fraudsters as each batch is known and identifiable.

It also serves to ensure that aside from concerns of fraud, that batches are being produced according to formulation and if a particular factory comes under question, appropriate investigation can occur to determine where problems lie.

Assuming that there are no issues or concerns with the soil treatment until it is left in the custody of a enrolled farmer, there is yet a final benefit to be gleaned from these taggants, that is if the taggants are known and if the taggants can be found in the farm soil, it shows application of the product was actually performed and the farmer is following the prescribed protocol.

Figure 4:
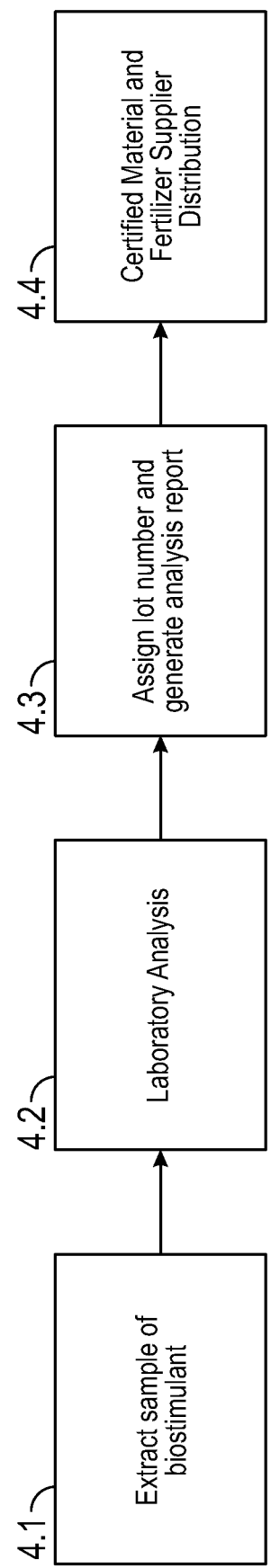
FIG. 4.—Certified Material and Fertilizer Supplier Distribution (1.10 of FIG. 1)
Figure 5:
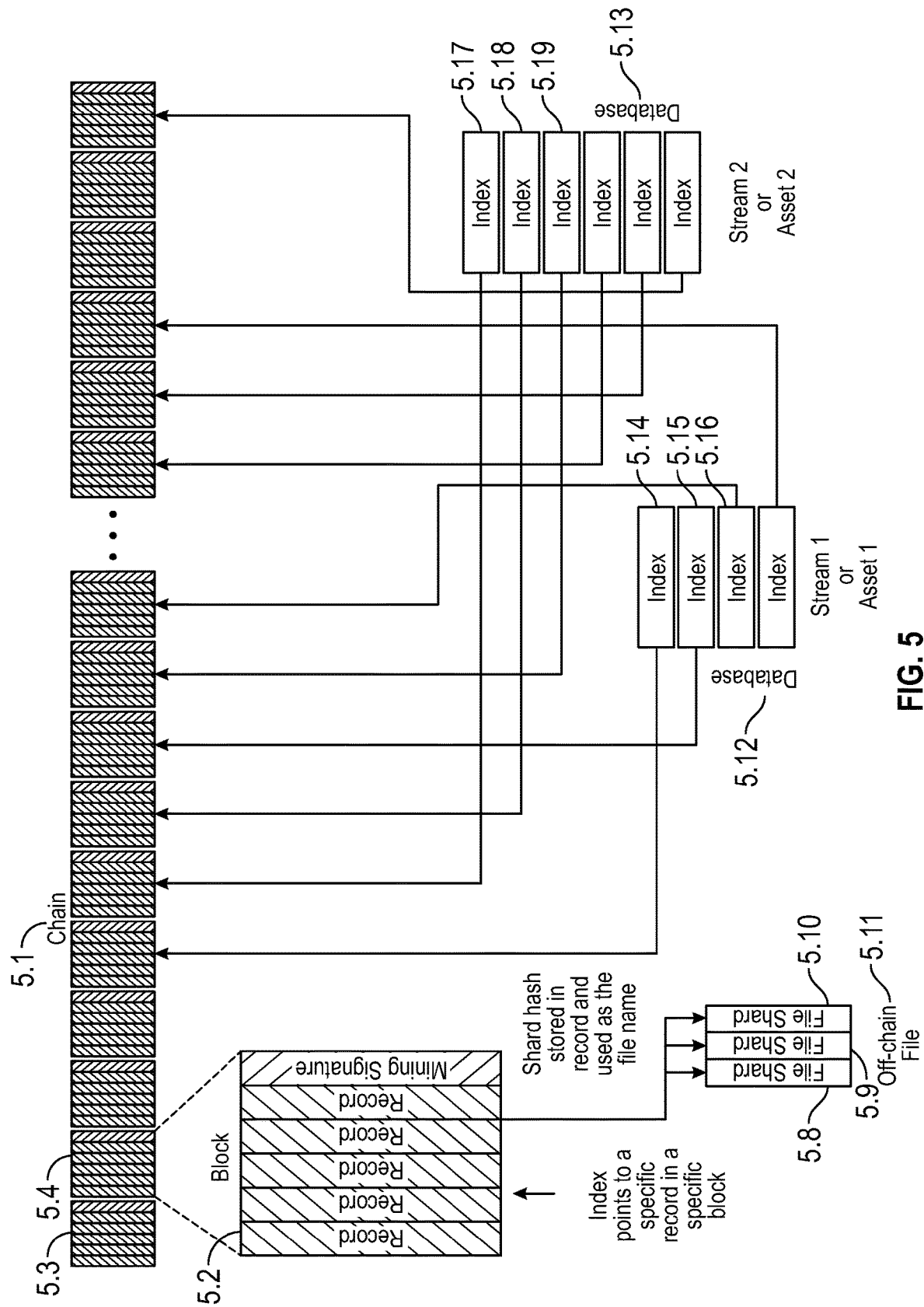
FIG. 5.—Multichain Architecture Explained

Certification (1.10; FIG. 4; FIG. 5)

Regardless of the taggant, either naturally present trace minerals or post processing inert micro markers, the resulting product that should be leaving processing facilities bound for a particular farm and field will be either a certified biostimulant which is added to fertilizer mixture at the destination or a complete fertilizer that is prepared at managed facilities and itself ready for certification. (1.10)

During the certification process, a finalized sample of the biostimulant is taken (4.1), and laboratory analysis conducted whereby the biochemical composition of the sample is determined, (4.2), then an analysis report is generated, and a unique lot number assigned to the batch of biostimulant/fertilizer. (4.3)

While the described steps themselves are hardly novel and functionally are themselves little more than a quality control procedure before shipment of product, what is notable is when either the soil treatment or prepared fertilizer certified, the unique lot number creation 4.3 is the point of genesis of a potential green house gas credit being created on the underlying blockchain. Additionally, when a batch is created, a data stream relevant and unique to that particular batch is created which will allow for enhanced functionality versus what can be accomplished efficiently, if at all, on a traditional blockchain architecture.

These data streams address much of the scalability problems which have limited existing blockchain architectures, and enable greater granularity, address issues of overall scalability, and allow users to store files on the blockchain in addition to data. Furthermore, these files may be larger than what a single block by itself could accommodate. Additionally, individual participants in the blockchain, node operators, are permitted to maintain local working data and files which may not necessarily uploaded to the blockchain but are referenced such that they are retrievable.

This is important as the described protocol is something well past what a traditional blockchain structure like bitcoin could accommodate. This is because bitcoin itself is a less complicated, more linear process, whereby the blockchain is concerned with only a few data types and a few limited activities. Bitcoin's blockchain itself is a record of transactions concerning bitcoins. The blockchain tracks denominations of bitcoin, and movement of these denominations among the various addresses or wallets. The node operators which participate in bitcoin, the miners, provide computing power which requires physical upkeep from the operators, but the computers themselves are designed to run unattended. These computers themselves, per the bitcoin protocol, are largely concerned with two tasks, a) attempting to solve complicated mathematic problems which are self-generated by program, and b) comparing the copy of the blockchain that is locally stored against the copies of blockchain which exist on other nodes in the network.

In order to incentivize these node operators into running these computation servers, the miners are paid in two ways: 1) when transactions occur on the network, the person sending an amount of bitcoin pays an additional amount which is awarded to node operators who are willing to direct their computing power towards confirming the transaction, and then spreading and confirming the "true" copy of the ledger which indicates the transaction occurred; and 2) potentially when a complicated mathematic problem is solved by their particular node, that node is awarded a newly mined bitcoin, which the miner may keep to speculate on, or sell on the open market through one of the exchanges which traders are purchasing and selling bitcoins.

The proposed protocol is significantly more dynamic and taxing than what traditional bitcoin blockchain can accommodate, that is, when in operation, there will be a significant number of node operators, enrollees, who are at various stages of an assigned protocol which requires the enrollees themselves to perform physical real world tasks, from obtaining soil samples, to applying the formulated soil treatment, to calculating end of season crop yield. In addition to these physical tasks, there is corresponding data being collected which account for time, location, weather, and other variables which are necessary for trial evaluation to occur.

Concurrently, there are projects which have reached evaluation and the data is now being calculated and results and similar now to be associated with projects. Each of these projects were also assigned a soil additive, which has been traced back to precursor information which would include where the precursors were obtained, their own lab work, and so on.

Bitcoin's mathematic problems, while retrievable, are largely disposable, and meant to provide proof-of-work as to the node operators.

In the described protocol however, the operators are providing proof of work by actually working, and the chain itself, a record which is meant to be accessed and used. Each unique project in the described protocol will have a complete biographical record, which as indicated previously, serves to addressing and preventing fraudulent activity.

In addition to allowing all of this biographical data to be stored on the blockchain record, multichain architecture can also accommodate assets, and transactional information tied to those assets.

As such, when a project completes, is deemed successful, and an enrollee awarded gas reduction offset credits, those credits will also exist as assets on the blockchain, so while a particular project may have ended, the results of it, these credits, will still be trackable, and forever tied to the original biographical data which led to the credit's genesis.

In order to better understand how this is accomplished, we will describe the multichain architecture and how a large variety of information and data can be stored on a large ordinately ordered chain but still quickly made assessable.

FIG. 5 is an illustration which explains the basic architecture of multichain. Beginning with the obvious, 5.1 represents the blockchain itself. A blockchain itself comprises a multitude of individual data blocks (5.3; 5.4) which are of a fixed size, and a particular order. As new information is appended to the blockchain, new blocks are created and appended to the end, and as a natural course, over time the blockchain as a whole will become significant in terms of file size and storage requirements.

The reason for this parsing is that one of the fundamental purposes of blockchain is that data contained within it is continuously compared to other participants on the blockchain in order to facilitate consensus. Consensus is pretty much as one would think, whereby as comparisons occur, any sort of irregularities begin to be discovered, and the blockchain seeks to adopt the copy of a particular block that is found the most often. While there are ways to potentially defraud bitcoin, it is far more difficult and expensive to do as it requires inserting a block with the fraudulent data, and then the capacity to confirm this is the "true" block from adjacent nodes. Instead of bad data being simply overwritten on a master copy on a single computer, a bad actor now has to make it appear across numerous copies of the blockchain spread across numerous nodes at the same time, in significant numbers, that the bad copy of data is seen to be the consensus determined good copy. Not impossible, but the larger the network, the cost scales to the point of being potentially impractical as the bad actor must defeat an increasing number of copies of the blockchain that would vote against the bad actors bad data.

In Bitcoin's blockchain, as discussed, the data within is information all of an ordinate type itself, the data itself is a massive ledger which tracks bitcoin creation and movement among addresses as the bitcoin is exchanged. As such, early blocks will have transactions that occurred in time before more recent blocks. The information itself is all of one data type as well, that is, it is all transaction records. As such, each individual block in bitcoin's blockchain looks relatively the same in terms of contents. Suffice to say, for the purposes of bitcoin type blockchain, the blockchain is the database, and it isn't particularly dynamic or scalable.

As such, one of the drawbacks in bitcoin's architecture is that, as time passes, and more data is contained on the blockchain, the blockchain itself becomes massive, and node operators face issues with navigate these files when they only desire very particular information.

In multichain architecture, by design, indexing is enabled. What this means is that when a particular batch is created, an indexing identifier can be created unique to that batch, and relevant data can be easily associated despite being at separate locations along the blockchain.

Multichain architecture begins with the same basic components, that is there is a master blockchain 5.1 also in multichain, and this blockchain is also made of blocks 5.2 which are ordinately arranged 5.3; 5.4 with new blocks being appended to the end of this blockchain. 5.1

However, the design of the individual blocks 5.2 in multichain significantly differs, such that unique datastreams 5.12; 5.13 can be created which are able to reference individual blocks and allow for enhanced functions.

Notably, within each individual block 5.2 in addition to the records within 5.5; 5.6 is the inclusion of a mining signature 5.7. This signature itself, indicates the individual blocks relative position in the chain, and biographical data as to this block's genesis, but unlike traditional blockchain also identifies the records contained within and where each record resides within the space of the allotted block. The reason for this is the blocks themselves are subdivided based upon the contents. Whereas traditional blockchain will just be a series of transactions until the blocksize is exhausted, multichain allows for a variety of data to exist on the blockchain. Raw data might be entered the same way it enters traditional blockchain, but multichain contemplates and is intending to allow and improve on other data types being entered as records and blocks into the master blockchain.

That is to say, in a hypothetical block 5.2, the records within might constitute one record 5.5 which simply contains the raw native data expected to be entered into the blockchain, but the same block might then also containing a record 5.6 which is a picture, audio, proprietary file (excel, word, PowerPoint, etc.), video, or otherwise.

This is enhanced further in that a file that may be too large to be contained in a single block may be subdivided and then spread across as many individual blocks are needed to store the file to the blockchain, with the mining signatures and records data referencing the subsequent blocks needed to store the file.

Where the two models diverge even further is that multichain can accommodate file shards 5.8; 5.9; 5.10.

A file shard is a file which isn't stored on the blockchain 5.11, but instead a hash of that shard is stored in a record as a filename, indicating where that file may be retrieved, and sufficient biographical data to confirm the contents of the file which is retrieved.

The effect of this is it enables scalability far past what the traditional blockchain model can accommodate. Moreover, it is an acknowledgement that in many, if not early all databases, there are files which are less critical to other users wishing to retrieve information. For example, there may be iterative files, redundant backups, cache files, working files and the like which are not reasonably going to be accessed often, if ever, and as such, it would be inefficient to have these files entered as blocks in the master blockchain which would necessitate all participants not being required to download this portion of the blockchain and occasionally verify and participate in consensus as to their contents. To do so would more likely than not, be a waste of the resources of the greater population of participants, particularly as more and more of this rarely accessed data is entered into the blockchain for storage.

The next significant deviation from traditional blockchain architecture is that multichain allows for the creation of data streams, a component whereby if the master blockchain is the "hard drive", streams act as working directories on that hard drive.

On a physical hard drive, files are written to the drive according to where they will fit, and where there either is no data, or it has been indicated that old data is considered deleted and may be over written. While the file explorer on your computer will show files grouped together, this is only for the convenience of the user, on the hard drive itself, rarely will a folders contents all be located on the physical device together.

A data stream is similar to this convenient visualization in that the data within is likely to be spread across the blockchain and located at different blocks, and as we have explained with sharding capabilities, some files may even reside locally on the user's computer.

Traditional blockchain does not have this sort of indexing, so a user intending to work with data stored across the blockchain must download the entire chain, and then search the chain to locate data relevant to their purposes. While there are blockchain explorers which have been developed to facilitate this process, there is currently nothing that is built into the initial blocks themselves the way blocks are created on multichain variant of blockchain.

This variety of accepted data format, and quick access is vital to the described protocol as because the data entered in the described blockchain is entered on the basis of real world processes and measurements, which simply due to the temporal requirements to effect improved biochemical composition of a project soil, may be entered into the master blockchain after a significant amount of time has passed, and thus, blocks are likely to be spread far distances down the blockchain when program evaluation for a particular project occurs.

How a data stream works in practice can be thought as such, as each node operator in the system is carrying out certain real-world tasks, those tasks are being accounted for and corresponding data and files is being created. Potentially there is also already preexisting data on the blockchain which a particular project will reference. There is also the issue of the iterative files, redundant backups, cache files, working files mentioned previously. When a node operator begins a new project, a data stream is created which indicates that it is the "working space" for that particular project. The stream itself doesn't contain the files or data, as indicated 5.12; 5.13, but instead is database of index addresses which indicate where the relevant files or data is to be found. As one would anticipate by FIG. 5 and the discussion thus far, this means that one index address in the stream may be pointing to a block which contains data 5.14, one index may be pointing to another block some distance away that is a fragment of a larger file that has been split across several blocks 5.15; 5.16, and potentially another index may be pointing towards a block which itself contains file shards which redirect to the off-chain files and where they may be retrieved 5.8; 5.9; 5.10.

As new data related to the project is created, the stream can append to indicate this new data and where it may be located. More interesting, and of particular utility is once created, a stream itself may then be shared. This is substantial as the described protocol covers such a wide variety of disciplines, many of which may be performing work far from where a parcel of soil is undergoing a prescribed soil treatment.

As such, once a project is potentially concluding and results are being evaluated, it becomes a much simpler task for a distant node operator to pull up a data stream and by the indexes contained within be led to the specific files they would need to perform their own tasks required to evaluate what sort of green house gas savings was achieved. Once a program participant enters a post project evaluation, all of this data is already indexed on the blockchain, expediting evaluation by witness nodes who themselves are likely to be less concerned with some of the day to day data and may simply wish to prioritize critical files. It is because of this indexing that these witnesses are able to quickly jump along the blockchain and pull up the relevant portions of chain necessary for the witness nodes to perform whatever evaluation or tasks that they wish to conduct.

Thus, by using streams a later in time observer is being first presented with the required and relevant data and files, and not a massive number of files which aren't going to generally be accessed by others. That said, with the shard capabilities allowed by multichain, should this later in time observer wish to elect to do more of a forensic investigation of what occurred, there is a means for them to see these less critical data files indicated as shards and request that these files be made available for review.

Streams also allow a particular block to be referred to by a number of streams simultaneously. This becomes important for the described protocol because of the variety of participants in the described protocol and their relatedness.

It is contemplated that in one embodiment of the described protocol, a data stream may be created and assigned to a particular mining site which is physically excavating humic substances. Another data stream would be created for a participant whose roll is harvesting the seaweed products destined for additives. As both of these participants carry out their duties, the mining stream is adding indexes which refer to the gps location of the mine, when the mining operation occurred, the depth at which the humate was mined, and the amount mined. Similarly, for the seaweed harvester, they would be creating data which describes the particular species, where, when, quantity and so on.

Quite separate from both of these operations would be an operator responsible for refining these materials. This refiner would have access to both of these streams and be able to indicate when the shipment of raw materials was received, confirming quantity, and other similar metrics, but then this refiner is likely to create data of their own which might define lab analysis indicative of quality, how the precursors were refined, and other information important to the refiner, but of little importance to the miner and the harvester participants. The data that this refiner creates nevertheless can be indexed by the stream, and the information easily located by other node operators.

The same logic and process would then similarly apply to the data created by the agronomist, the farmer who applies the biostimulant prescribed by the agronomist, project evaluators, and so on whereby some data is created, and additional indexes created in the stream indicated where this data might be found.

This allows for a large number of participants to have access to a particular project, and do additional work with the data, but work which is of a non-destructive nature, the data which is indexed within data streams is not modified by subsequent participants, but these subsequent participants can access the data to do their own functions and then indicate what they did with the data and add that information to the data stream.

Effectively, the multi-stream architecture allows for a working space which suits the needs of a particular node operator to be created and exist alongside the blockchain whereby if anyone wanted to at any time they could jump to and view that projects critical data and then, if they wanted to, request shards such that they could biographically observe everything that has happened on a particular project.

Moreover, this flexibility allows for the creation of streams for particular operations occurring in the system.

For example, per FIG. 5, we see that there are two sub-databases indicated, 5.12, and 5.13. Potentially, Stream 1, 5.12, is created for the same hypothetical humate mining operation which is occurring in Cuba, N. Mex. All the biographical information as to this mining operation is contained in 5.12 and nothing more. Stream 2, 5.13 however has been created for a particular land parcel which is set to undergo restorative efforts. Stream 2 can index data being created by the efforts of Stream 1, that is, the agronomist entering data indexed by Stream 2 may wish to indicate that one of the components of the formulation created for Stream 2 efforts was humate mined by the efforts of Stream 1. As such, a block created on the blockchain by Stream 1 can be simply referenced by Steam 2 as being a source component. Recursively, an observer reviewing data indexed under Stream 2 can trace that Stream 1 played a role and observe that if they elect to do so, however as hinted at, this at least initially allows those creating streams to elect on and set the granularity of the data contained within.

Finally, it must also be addressed and explained that in addition to grouping indexes as data streams, there is also the capability within multichain to indicate indexed blocks as being assets instead of data, files, or shards.

This functionality is what allows digital assets to be created and then tracked on the multichain's master blockchain.

In bitcoin's blockchain environment, as described, occasionally a node operator is rewarded with a bitcoin when their node solves a mathematic problem posited by the bitcoin protocol. Bitcoins themselves act as currency within the bitcoin blockchain, so when one is created, the bitcoin blockchain begins to track this bitcoin as it is traded within the system.

In the described protocol, instead of a greenhouse gas offset being created by the blockchain or multichain, it has been created through the real-world actions of the node operators and participants. While these offset credits are also exchanged like an asset and tracked within the system, they are more similar to a coupon than currency. That is to say, eventually an offset credit will be redeemed against a parties commercial activity and be considered exhausted.

As such, these offsets are anticipated to have a finite "lifetime" whereas bitcoin at its outset was created with a predetermined maximum number of bitcoins, 21 million. Bitcoins like an actual coin are intended to last until they are inadvertently lost.

The disclosed protocol doesn't anticipate any sort of finite limit to the number of offset credits the system can create, and by design, the system needs to allow for redemption and creation of new offset credits to be awarded when expectations have been satisfied.

As such, it is possible within blockchain or multichain for those evaluating field trials that occurred under a datastream 5.12 to declare that expectations were met and the program enrollee due an award of greenhouse gas credit offsets. These greenhouse gas credit offsets would be awarded as an asset 5.13 but the information within this asset would still behave somewhat like a datastream. That is the indexes contained within the asset 5.13 would index a block which would represent the green house gas offset credits 5.17. Subsequent indexes within the asset would be able to refer to the project that led to the award of the credit itself 5.18, indexes which would indicate subsequent trading of the offset credits 5.19, and other data which would be meaningful to a subsequent purchaser or auditor of the gas offset.

Again, this ability to create steams or assets with only what would be immediately relevant, and references to allow forensics is worth emphasizing as a trader purchasing a gas offset credit is going to be immediately far less concerned with issues such as where the humate which treated the field which led to the creation of the offset and more concerned with chain of title and validity issues.

As mentioned, eventually a purchaser will purchase this asset 5.13 and apply it, exhausting the value of the credits it represents. On redemption, the block(s) representative of the credit(s) themselves can be either indicated as exhausted, or the blocks sent to a burner address at which point the block is broadcast burned to the blockchain network, and the block effectively inaccessible. The blockchain will know that a block occurred, and the chain is not broken, merely the block now exists in a ghostlike state where it cannot be referred to. That said, the other indexes within the asset and the blocks they reference are not destroyed, and a complete history of everything that led to the creation of a particular carbon offset, from the location of the field, the initial state of the soil, the final state, the prescription the field received, the amount of credits that were generated, and the parties they were exchanged by and through until application in an immutable biographical format on the blockhain or multichain.

It has been considered that this parsing and indexing of files might lead to one embodiment of the invention whereby nodes themselves are able to scale involvement, participation, and trust levels.

As mentioned above, in blockchain, and a majority of multichain models, all node operators must download the entire blockchain in order to participate as a node operator. It has also been indicated that the longer a blockchain runs and appends, the blockchain itself naturally becomes of such size that the necessary computing and data storage requirements become an issue.

As such, it may be of benefit to enable nodes to perform particular, enhanced functions at a necessary sacrifice of other functions. For instance, it may become necessary or desirable to allow some nodes to be designated archival nodes which primary purpose is to store earlier blocks of the blockchain and to be less involved with data entry or block creation. Other nodes may on the other hand rarely use archived blocks and may be designed to prioritize or perhaps only witness and verify blocks more recently created.

In such an embodiment, it may be able to carry this design further such that node operators might create or access a stream and only the relevant blocks themselves are downloaded locally whereas other archived, unassessed blocks are indicated, but instead of data, the local machine creates placeholders that acknowledge the location and size of these blocks without the need of downloading the data itself. Of course, should the node operator later wish to access these placeholder blocks, they would need to them download copies of these missing but verified blocks to the local machine for viewing.

This would allow those concerned with specific projects to only download the blocks or shards flagged by the datastream index significantly lowering the local infrastructure and computing costs. In same way placeholders are created on the local machine indicating missing content, it may also be desirable to have what this limited node operator is doing to the rest of the multichain network.

The unique data stream in this limited node environment could is updated and appended to, indicating new files and information destined for submittal to the blockchain as the limited node operator proceeds through their tasks. Disinterested parties on the blockchain would only be informed that a new project has been created, where the relevant files for that project would be found on the blockchain, but not need to necessarily update the local copies of the blockchain on the disinterested operator's computers. In the same way, that blocks could be ghosted on a limited operator's node, it would be possible for disinterested operators to indicate that new blocks were available to be retrieved but the disinterested operator could at least control when these ghosted blocks were retrieved.

This would allow certain operators to limit the demands on their local machines, but of course, the multichain network would need to reconcile this in some way. Likely nodes that operated in such a capacity would need to be deemed less trusted on the network in terms of when blocks are compared against nodes, as there would be some nodes that do not have complete copies of the blockchain. Similarly, other nodes which have entire copies of the blockchain might be deemed to be oracles or arbiters, whereby the blocks retrieved from these nodes would be slightly more trusted against limited node blocks, or the limited node blocks submitted to the network might require additional vetting and assurances versus blocks entered by these oracle nodes.

In such an embodiment, this sort of node participant designation design would more readily accommodate the sort of disparate computing power different operators are likely to have. The hypothetical farmer who is merely intending to have information entered reflecting what activities he has conducted is unlikely to be interested in investing in significant computing resources. However other operators may have the resources to accommodate the increasing size of the blockchain but wish to specialize some of their computing resources on the network towards archival and data verification but free up other computing resources on different machines for other tasks.

In the same way that data streams and multichain architecture provide more flexibility on a blockchain database model, this variety of node operators may be desirable or necessary to address costs and scaling issues.

So far we have described how greenhouse gas emissions may be reduced, and soil health improved, by way of a farmer applying prescribed soil treatments to their fields, and we have described how these treatments are created, that is samples of soil are submitted and drawing upon various described sources for soil nutrients, designer fertilizers may be created. We have also discussed the need for tracking of massive amounts of data, and have provided a network architecture which can accommodate the requirements of such a system while also describing the need for incentivizing participation in gas reduction efforts as well as methods to ensure validity and thus long term value of awarded carbon credits.

Now, the discussion can shift towards how a hypothetical farmer would enroll in such an award system, and we will step through the various processes this farmer would encounter and what occurs before credits are awarded and the rationale behind these processes. This enrollment, evaluation, enrollment, and eventually credit retirement system is collectively deemed the Life Cycle Approach.

Figure 6:
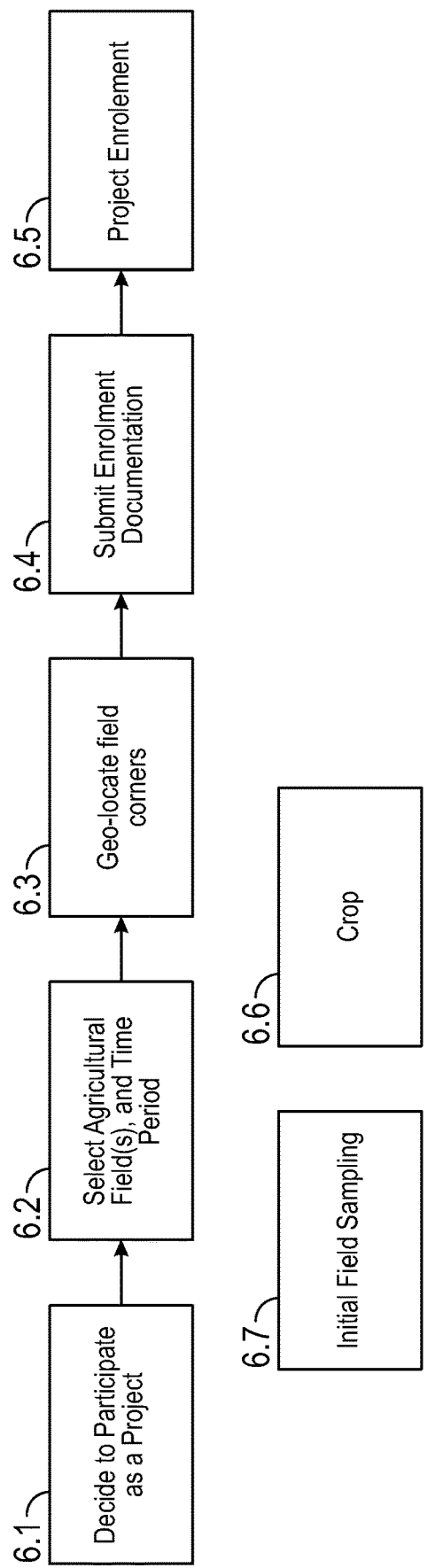
FIG. 6—Project Enrollment (1.12 of FIG. 1)

LCA Participant Enrollment Process (FIG. 1.11; FIG. 6)

In order for a person to generate and receive a verified green house carbon offset credit under the described system they must enroll as a participant such that they can be bound to certain expectations and requirements and have their performance tracked, recorded, and evaluated.

A person does not have to register as a participant if their only interest is in purchasing credits that have generate by the described system and only wishes to consume the credits or perhaps speculate on the credits and trade them as they would trade other more traditionally known and understood commodities, but in order for a credit to be created on the system a target field must be measured as to its initial state, and what the state is on purported completion of a soil treatment regiment in order to verify that the soil treatment protocol was followed and that computation would confirm that the new status of the field would according to computer models produce less green house gases, and thus the participant now eligible for payment, in this case a offset credit to be used or sold.

That said, the preferred and prescribed method for enrollment can be stated as such:

When a farmer elects to participate in the LCA program FIG. 6.1, they would first need to submit which fields they would want to enroll in the program. The first threshold that an enrollee will need to meet is the simple matter of square footage and time that they are willing to take direction as to how a particular parcel is to be rehabilitated. 6.2

This is a simple, but necessary gatekeeping measure as the computer models which determine the current output a field is expressing, and the total savings in greenhouse gas output that can be estimated all require the area of the field in order to extrapolate what restorative measures are likely to lead to estimated reduction in volumetric tonnage of emissions.

Hand in hand with the volume would be a subjective measurement, but as a simple matter because the enrollee is subscribing to the program and expected to take direction, so too are they effectively sharing in the management of this parcel for a particular timeframe. As one can expect, if the enrollee is not willing to share or take direction for a sufficient time-frame and much of the overall reductions require the overall state of the health of the soil to shift, if the enrollee cannot enroll a property for a sufficient amount of time, it will be unclear, and maybe even unknowable if any reduction in output occurred.

Suffice it to say, there is a requisite baseline of both size of property, and length of enrollment required in order for observable and thus verified results to be achieved. Fortunately for an enrollee, and one practicing the invention, this is a simple matter of inputting the square footage and commitment, and then seeing if the models predict a rewardable reduction is likely to occur. Suffice it to say, if a plot is not large enough, or an enrollee only willing to commit to short time frames, it is unlikely that they will be recruited or offered the opportunity to proceed to the next steps towards project enrollment.

The next steps to occur will that technician determined the physical geo-location coordinates of the field 6.3, and a physical sampling of the field soil is procured for analysis 6.7.

In some instances, this technician may be employed by the central authority that acts as system operator and overseer of the describe protocol, but there may be instances in which a trusted $3^{rd}$ party neutral takes these measurements on behalf of the system.

In either case, the physical location of the field 6.3 is determined and catalogued and is used to help identify and index the project. As described previously, in the implemented version of the invention, effectively at all times there are various projects around the globe at various states of progress. Theoretically on a long enough timeline, some of this land may change ownership or be rehabilitated in different ways. As such, the easiest way to identify and index projects is first by time, and then by physically determined and mappable location. This also serves the additional purpose as being a check and verification of the plot size of the parcel at issue.

Next, and of clear importance is the sampling of the initial "starting" state of the soil itself (6.7; 7.1). This will be determinative as to what soil treatments can be prescribed to achieve particular results. This also acts as a gatekeeper in of itself as it is wholly possible that an enrollee's soil is already in a healthy state, or that if the soil is particularly unhealthy, or would require specific and rare amendments, the proffered parcel may not qualify for enrollment (7.2)

Further, if the soil is at a particular state of unhealthiness, this will necessarily weight the other requirements such as length of time of treatment, or what treatments and concentrations might be considered.

It is contemplated and appreciated that there may be a variety of initial sampling protocols depending on the composition of the field in question. In some instances, it may be sufficient to take a sampling, and simply indicate the location and depth the sample was taken at. Reasonably though, in other instances, in order to ensure a fields composition or to better account for variability, it may be necessary to take multiple samples from multiple core depths from multiple positions about the field. While topsoil typically only constitutes the top 5 to 10 inches of soil, because a rather complex natural biochemical shift in the composition of the field is being attempted, there may be factors to consider that extend past a depth of 10 inches. Similarly, there is likely that many fields may have been purposed for different processes, and as such, the initial starting state of the soil in one position of the field may not necessarily be reflected in another position, particularly when large areas are under scrutiny.

A final consideration, one that may or not be elective, but nevertheless contemplated is an assessment of both what crops the field in question has previously been producing, but also and perhaps more determinative as to if the enrollee will continue towards enrolling the parcel in question into the LCA program is what crops the field will be producing going forward. (6.6)

Understandably, different crops will have different nutrition and water demands. Further, different crops will also have their own effects in kind as to the soil biodiversity and chemistry. As such, it is considered and reasonable that in addition to requiring a enrollee to commit to amend the fertilizer that they apply to a particular parcel, in some embodiments there may be additional requirements as to what the enrollee produces on a particular parcel while it is enrolled in the contemplated gas credit program. This may be as specific as requiring an enrollee to grow specifically defined crops, or it may be a gatekeeper question which helps to define the fertilizer formulation that is created for the enrollee, or there may simply just be a moratorium as to crops which may be counterproductive to the greater goals of lowering emissions and improving soil health.

All of this information is submitted (6.4) and reviewed, and if the enrollee meets the threshold requirements the parcel is considered enrolled (6.5) at which time, enough identifying information is available such that a unique index marker can be created for the particular project and genesis occurs on the main blockchain.

From this point forward, until evaluation, this project will have either data located directly on the blockchain itself, or a defined data stream within the multi-stream architecture, and all subsequent data until evaluation can be clustered on the basis of this unique index marker. We will next step through the data collected and processes applied until this project is closed out, but a critical point to make and keep in mind is that by creating a unique data stream for each individual project, and then clustering all relevant data towards that portion of the blockchain, both operator, enrollee, and other interested $3^{rd}$ parties will be able to now locate this project on the blockchain and then add, manipulate, delete, the data with far less effort than the traditional blockchain model.

In traditional blockchain, as data enters the blockchain, it continually appends to the end of the blockchain, in the order that data is received. When no further data is expected, and the blockchain is more of a traditional ledger, that is, an entry is made to create a permanent record, this sequential data entry works fine.

That said, the disclosed invention, while heavily geared towards cataloging massive amounts of data, contemplates in some embodiments the evolving and modifyingthe standard typical blockchain model and allows for the creation of a master index which points towards all projects and other defined data clusters towards partitions for each project that are intentionally larger in storage size than the project reasonably should require. Then, as new data enters the chain that relevant to a particular project, that data can be stored next to what is most relevant. Eventually when a project is evaluated and closed out, what will then occur is a "clean-up" pass whereby any empty partition is released, and further, much of the data that had been stored on that cluster may also be discarded (redundant copies, working data files, dicta, buffers) and only vital, cleaned up data retained. It is this clean data that can then be deemed "final" or "master" copies, and a immutable copy of this data then entered into the blockchain.

The effect of such a design is that the blockchain works more similar to a distributed file system like Dropbox, whereby different users can limit what they download if they are only concerned with specific files. As indicated by this discussion, traditional blockchain would not allow a user to operate this way, and they would be expected to download the entire blockchain and then skip around the chain to find the data which they require for computations. Further, while this allows particular users to more effectively work, it also allows other users on the blockchain system to not be forced to update their versions of the blockchain if the cluster that is being worked on by some is disparate from them and the work that they are doing. Effectively, what this design allows is for each project to have its own "working space" which is then cleaned up on project closure and a smaller, cleaned up, and validated version of the data uploaded to the blockchain indicated as a master record and for all to work with.

The thought behind all of this being that while the decentralization of traditional blockchain has value, there is a need for greater granularity that what it allows for. Further, unlike traditional blockchain, the contemplated process has in theory many different projects running simultaneously, and the final results of those projects may not be known for some time, which would spread data all over a ordinate blockchain, making manipulations significantly more difficult.

Finally, there must also be a concession that the final records of projects are most likely to be of interest to all participants, but they are less concerned about the day to day data that a particular enrollee might be cataloguing prior to project evaluation. Like with any office that does collaborative projects, it is really only the final draft that others in the office will be interested in, and previous versions, drafts, and the like are not valuable enough to warrant recording to the master blockchain.

With those benefits of this improved design explained, let us now speak to the process that an enrollee will cycle through after a particular parcel has been enrolled into a project.

Figure 7:
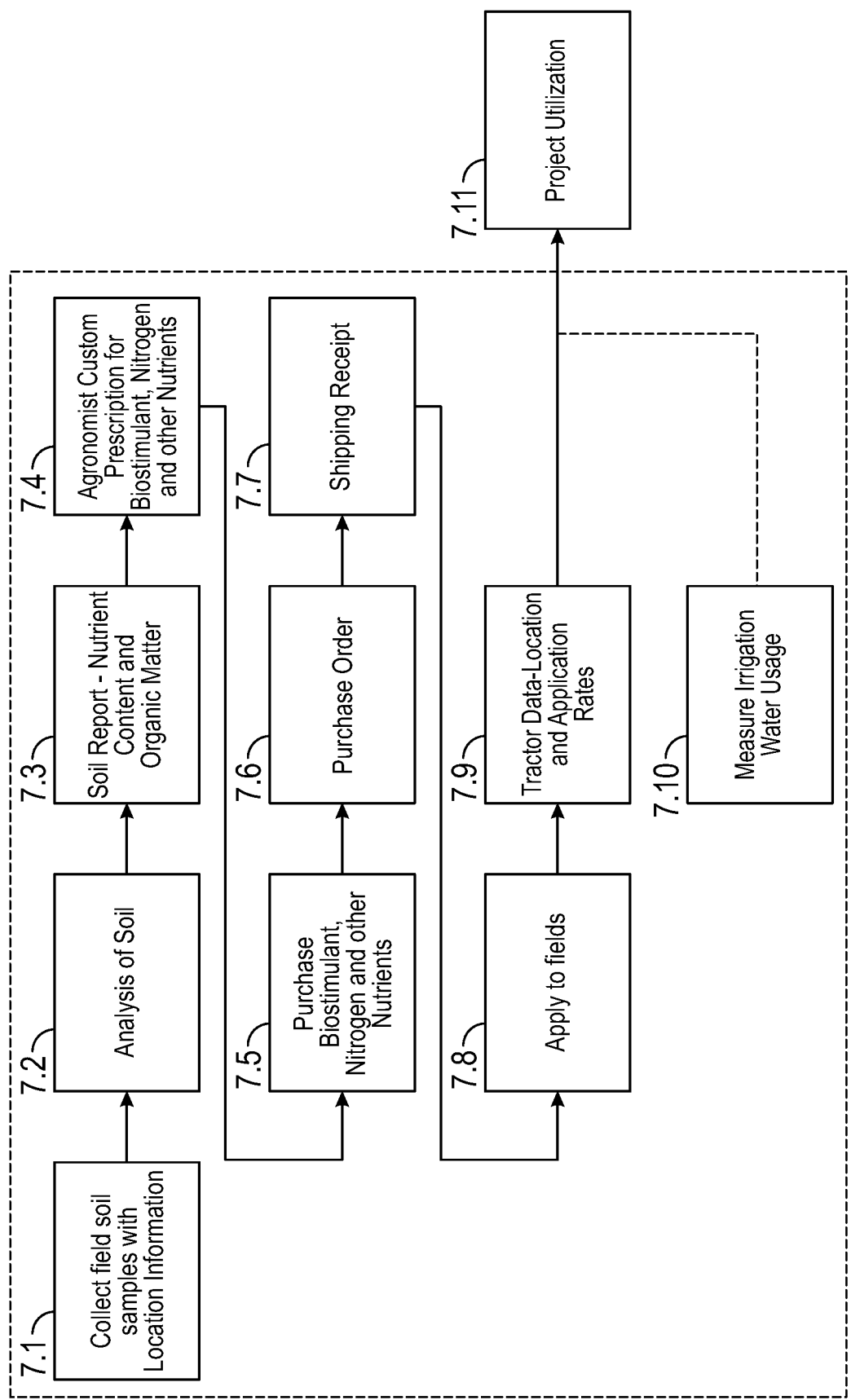
FIG. 7.—Project Utilization (1.11 of FIG. 1)

LCA Project Utilization (1.12; FIG. 7)

So far it has been discussed the greater problems to be addressed, greenhouse gas emissions and poor soil health, and it has been described a method for procuring humic precursors and that by applying a formulated soil treatment or fertilizer, an observable reduction in greenhouse gas emissions occurs. We have discussed a method for enrolling participants into an LCA program that would grant greenhouse emission credits for successful rehabilitation projects that they participate in and discussed the data that would be initially collected and the value of that data. We have also discussed, in part, how and why one would choose to apply a modified multi-chain blockchain architecture over traditional blockchain design.

Now, with the necessary components described we can finally describe how these methods can be brought together and function to award a farmer or enrollee a greenhouse emission credit when the enrollee follows the protocol that has been determined and assigned to their unique project.

As described above, the LCA Protocol provides for a specific formulation to be prescribed to farmers field, one that will optimize and balance soil health to crop yield to relative GHG output reduction and/or water quality improvement and/or water use reduction.

That said, in tandem with the enrollee submitting their parcel for project consideration a soil sample(s) is either taken or received (6.7; 7.1)

As was discussed, a biochemical soil analysis is performed to determine the initial make-up of the applicant's soil (7.2) and an initial nutrient content and organic matter report produced (7.3).

This initial report as one would reasonable guess is destined for the data stream allocated for the project as it will need to be retrievable both when a soil amendment formulation is determined, other restorative protocols considered, and to compare with subsequent measurements to see if the project is tracking correctly, indicating the enrollee's compliance, and then a final comparison at the final evaluation of the project to see if there was success in rehabilitating the field, and then recursively determining the greenhouse gas reduction that occurred as a consequence of a successful project.

Predictably and as has been described, the next step is the initial review of this soil and soil report, and a determination by a agronomist and a custom prescription for soil treatment which applies the humic substances described, other known biostimulants, nutrients, and fertilizer is determined, along with a recommended protocol for applying this soil amendment, for a predetermined time-frame. (7.4).

Assuming that the enrollee has accepted the terms of the project they have been enrolled in, it would be expected that they then procure this formulation, either by purchasing it directly (7.5) from the LCA Project Consortium or from an affiliated $3^{rd}$ party that is able to record purchases, track shipments, (7.6) and accurately have this information entered into either the data stream for the particular project (7.7), a data stream which is purposed specifically for in progress project formulation, purchase, and shipping information, or most likely a combination of the two.

The benefits of this modified multichain architecture is easily understood and appreciated when it is considered that the tracking of all of these shipments is unlikely to be data that is of high importance to most of the other users and participants on the system. As such, it makes sense to allow the various shippers to have their data protected by the blockchain architecture but to also give them the flexibility to structure their data and manipulate it in ways that are either impractical or impossible on a traditional blockchain. When a particular project evaluates and is determined to be successful, just as there is a cleanup which occurs on that projects particular datastream, so to will there be an opportunity to clear up any allocations or data that is stored on the shipping datastream. This analogy carries over to any agronomist's data streams, purchase orders, precursor mining and refinement streams, and so on.

Returning to the enrollee then, after procuring the soil treatment, necessarily the enrollee must apply it their field (7.8) according to the agronomist's directions. Potentially many treatments may be a matter of a single application, but it must also be considered that some treatments may take several treatments over a much larger time frame.

In situations where multiple applications must occur, it is reasonable, and the disclosed architecture would allow for subsequent soil sample procurement, analysis, and adjustment in soil amendments, and naturally all of this additional data could be clustered in the same project data stream. Effectively, an iterative process is enabled whereby those projects with longer time frames, and increased evaluations, are likely to yield better results.

That said, because all of this data is being stored on the blockchain and is accessible, once enough time and projects have occurred, the system has innate rudimentary artificial intelligence functions that can be capitalized on.

For example, once enough data collection has occurred, and previous projects have provided positive results that support applying particular formulations to particular soil states, much of the need for "tuning" prescriptions will dissipate. In theory, if another project field is submitted for consideration, and the state of that field is in conditions similar to what has been encountered before, there will be a continuously growing historical record to indicate what works and what does not.

Additional embodiments of this project utilization process have been considered whereby the specified project data stream would also include information received from the cpu of the enrollee's tractor or other field machinery (7.9), tracking of the enrollee's water usage (7.10), and potentially even account for temperature, weather conditions, or other factors that may have or are simply believed to have relevance or importance to commercial farming and soil health.

Figure 8:
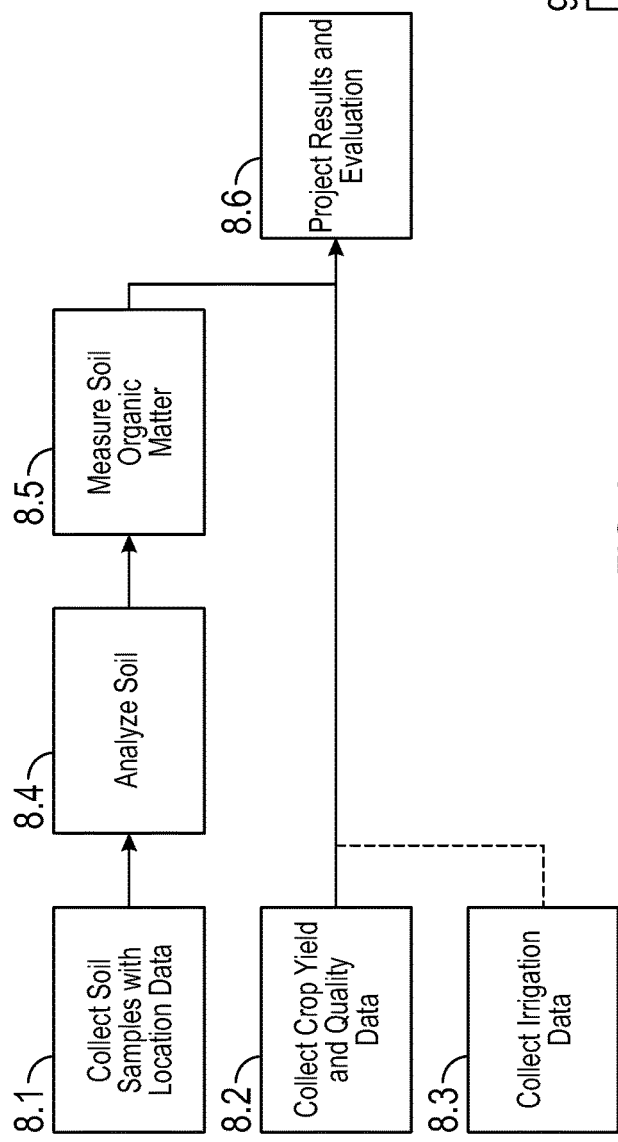
FIG. 8—Project Results and Evaluation (awkward wording. Propose just Evaluation) (1.13 of FIG. 1)
Figure 9:
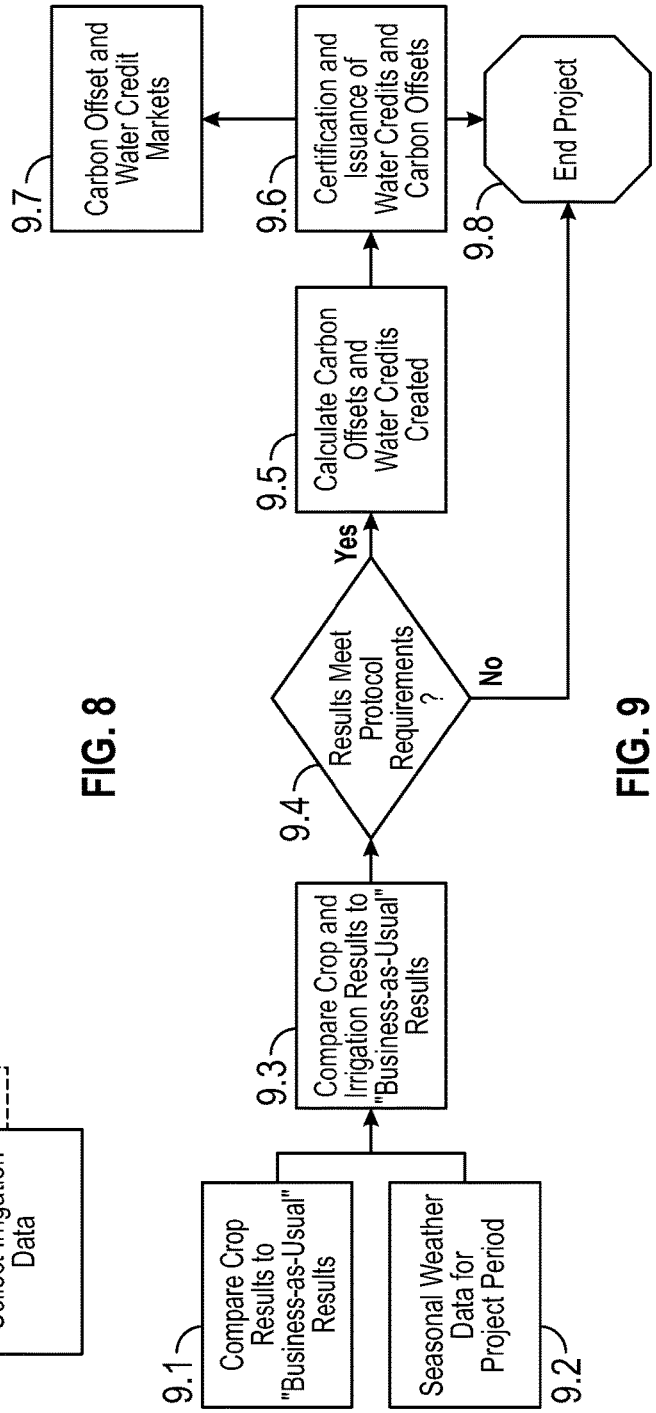
FIG. 9—Certification and Issuance of Water Credits and Carbon Offsets (1.14 of FIG. 1)
Figure 10:
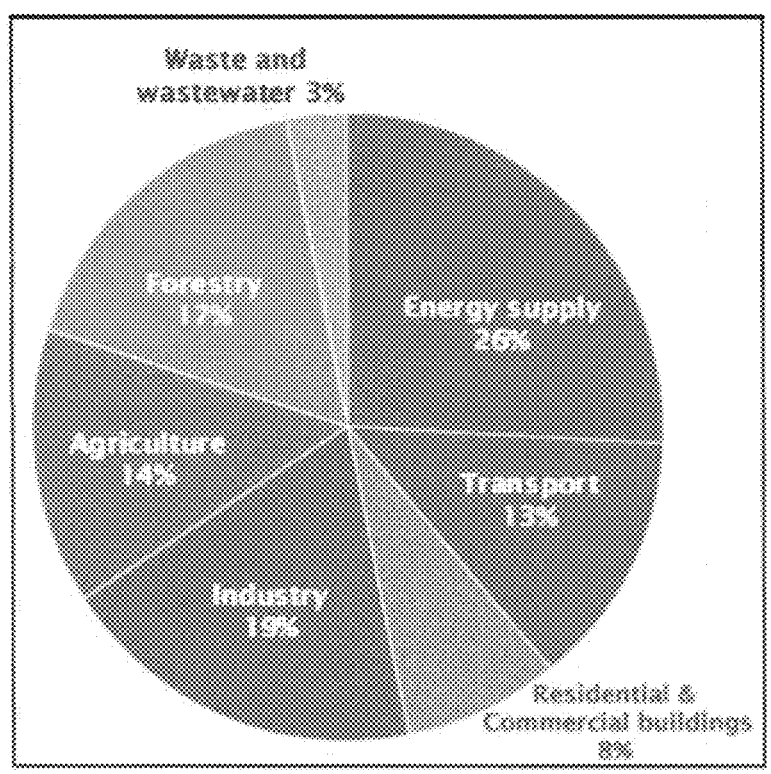
FIG. 10—prior art of green house gas emissions by source chart.
Figure 11:
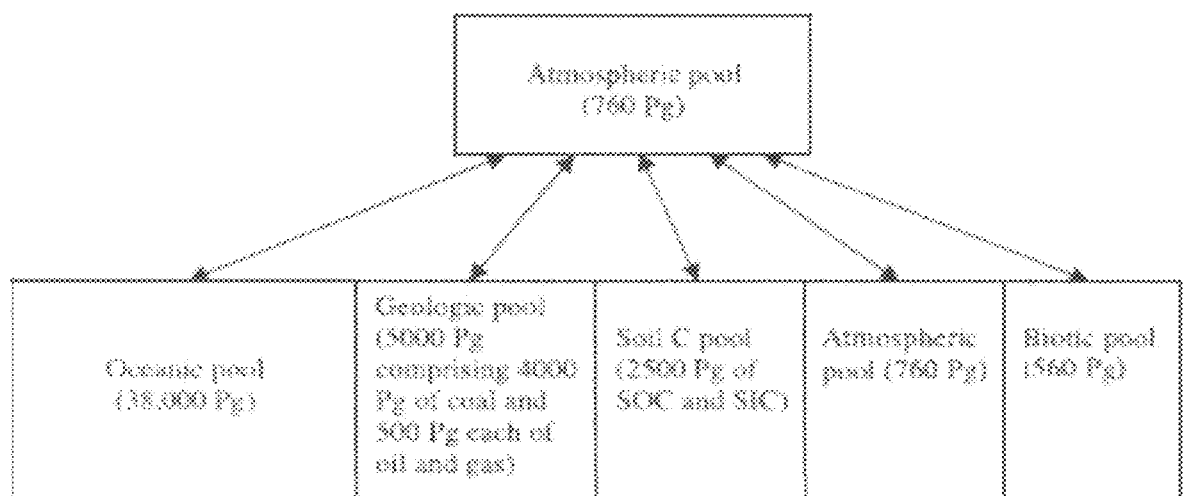
FIG. 11—prior art of principal global carbon pools chart.
Figure 12:
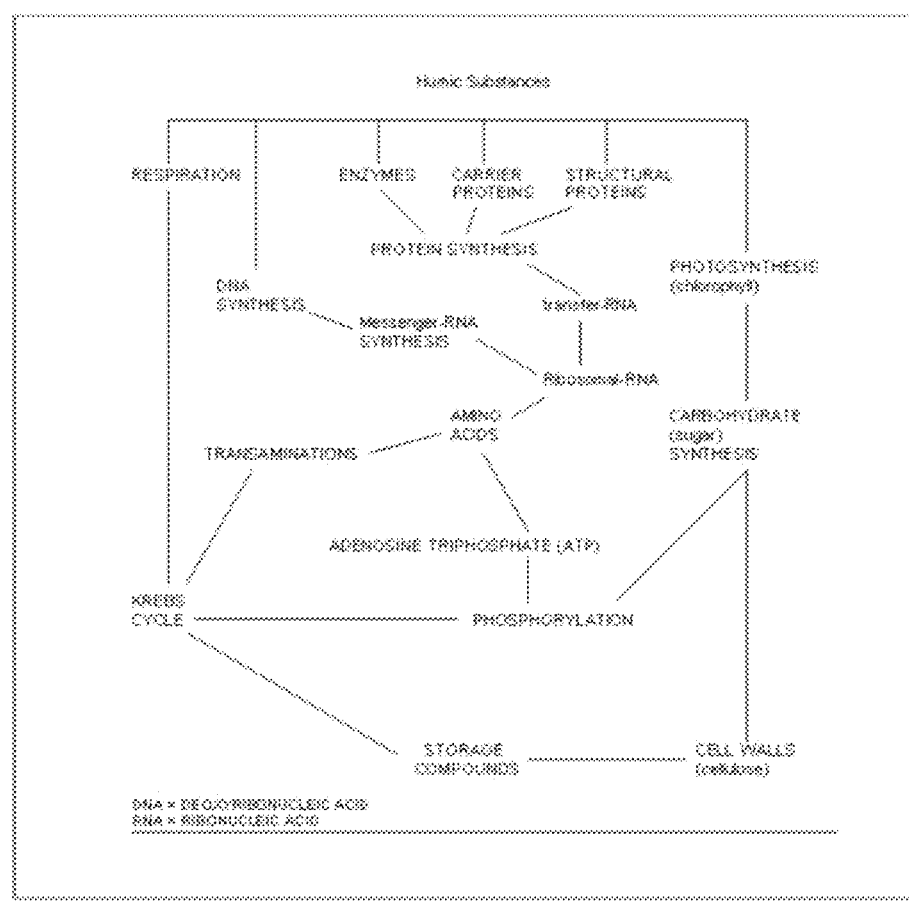
FIG. 12—prior art of bioorganic processes affected by introduction of humic substances chart.
Figure 13:
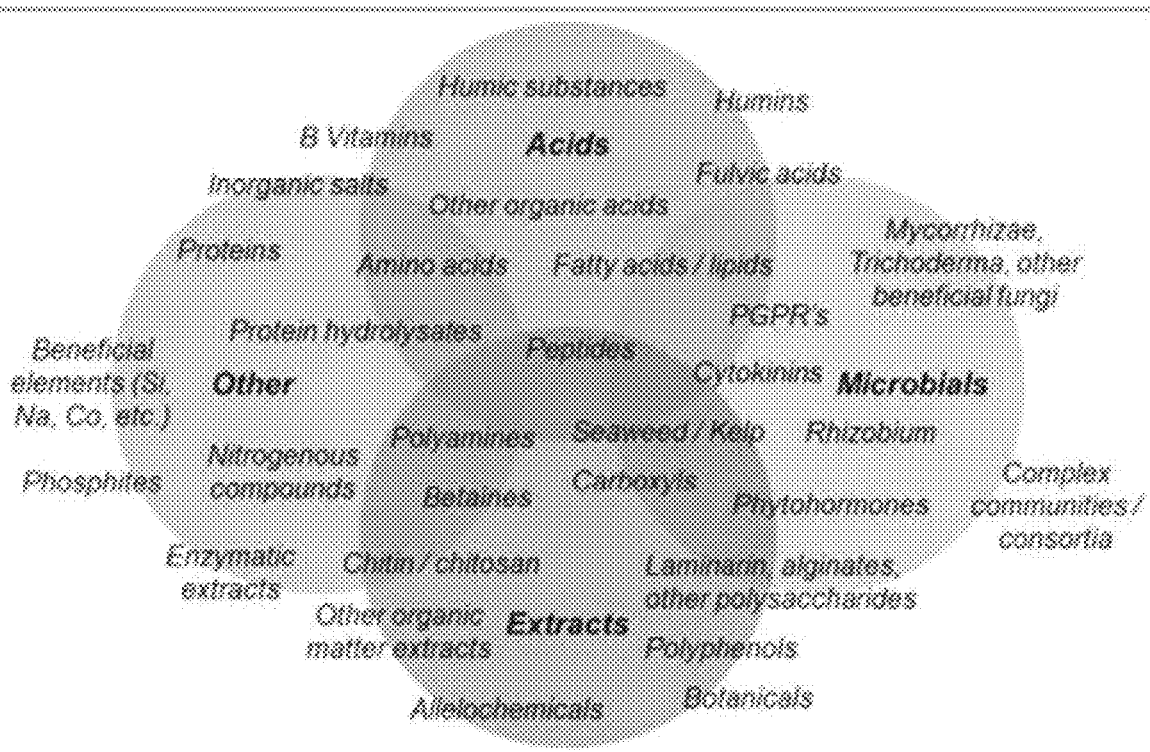
FIG. 13—prior art of the emerging landscape of products chart.
Figure 14:
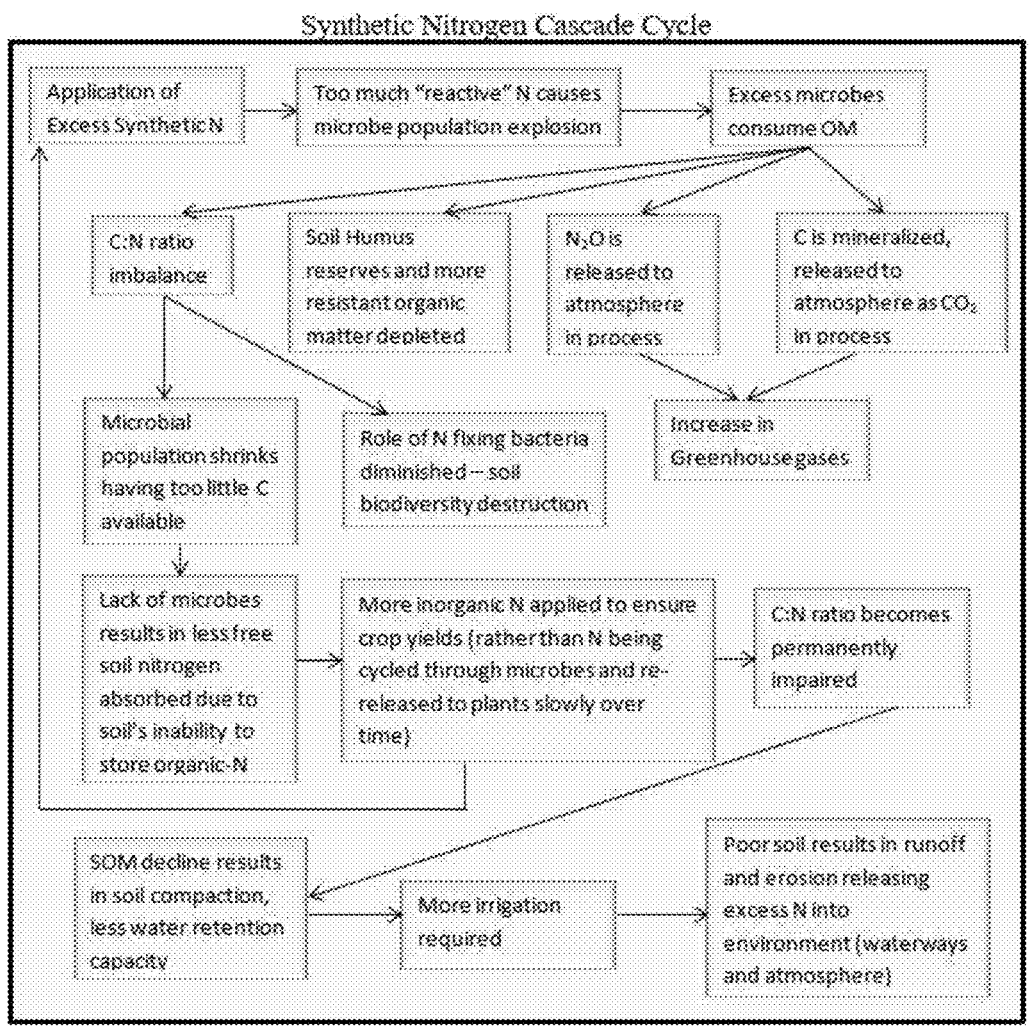
FIG. 14—prior art of synthetic nitrogen cascade cycle flowchart.
Figure 15:
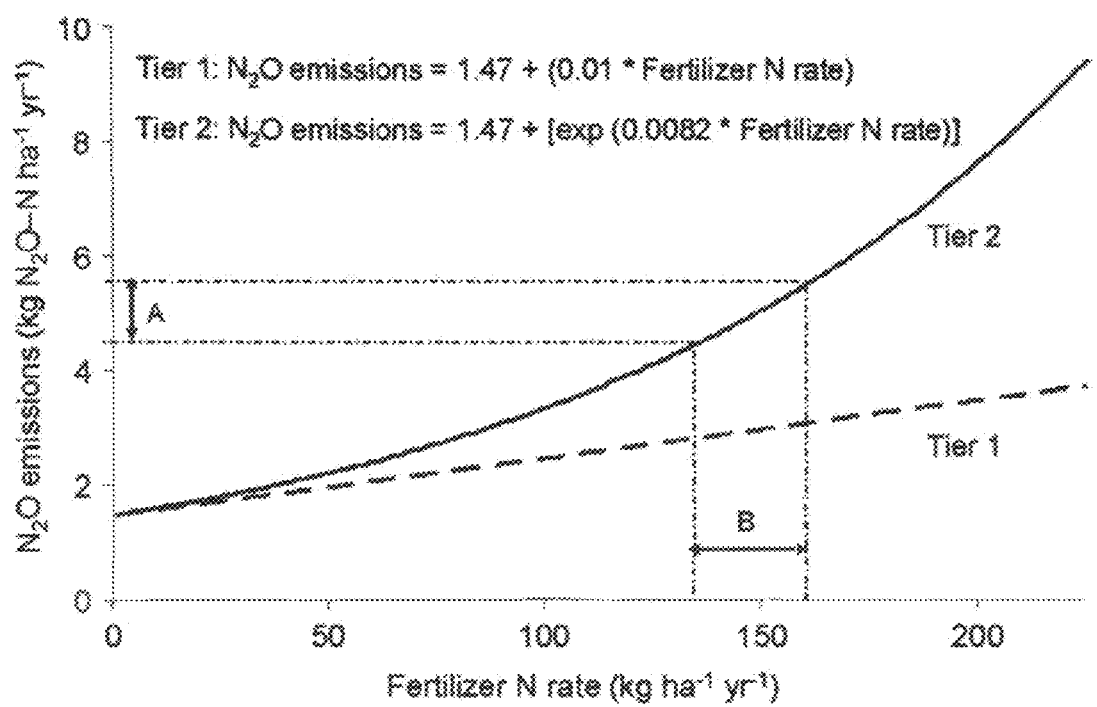
FIG. 15—prior art of fertilizer N rate equation and chart.

Project Evaluation (1.13; FIG. 8; FIG. 9)

At this point it is understood that a hypothetical enrollee has submitted their field for project acceptance, the field was evaluated and approved, a agronomist has formulated a protocol that covers what soil amendments to add to the field, and what other measures are to be taken, and that the enrollee is to follow this protocol until expiration and evaluation. If the project was a success, the project data stream is closed out, a master copy recorded on the blockchain, and most important of all to the enrollee, they receive their reward, a green house gas offset credit to be eventually used, saved, or sold.

FIG. 8 covers the data that has been collected, and what final data needs to still be collected and for what purpose. In FIG. 9 we will discuss the actual arithmetic and discuss the thresholds the enrollee needs to meet and why before a credit is awarded and the particular project data stream closed.

As the LCA at this point in the project already has a record of the initial baseline samples of soil health, and other metrics such as weather, water use, crop yield, and the like has been recorded as the project has progressed it ultimately becomes a matter of collecting a sample of the current state of the soil (8.1) to compare with the initial state listed in the data stream record.

It would be prudent, and because the data stream allows for data that may be of nominal benefit to nevertheless follow the same protocol that was followed in collecting the first soil sample, if not elevated protocols ensuring custody and validity as this comparison will be the one that determines payout. As such, it is contemplated and beneficial to also record the location data of these samples (8.1) in the event there is any question and subsequent interactions are required to prove or disprove results.

This soil would be analyzed (8.4) according to the same protocol applied to the first sample to ensure accurate comparison and measured for soil organic matter content, density, nutritional content, and biodiversity. (8.5)

This post project sample is then compared against the recorded initial state and both compared against the soil health and composition which was set as the target by the agronomist. Additional metrics such as crop yield and quality (8.2) might also be referenced in determining if enrollee did, in fact follow protocol, and whether the desired changes and improvements were achieved.

The effect of this physical sampling and evaluation is as such, it provides verification of the enrollee's work, or to borrow a term from blockchain, this acts as a proof of work mechanism. Referring back to the blockchain/multichain at work we now have collected data which considers where this field exists down to GPS coordinates, we have initial samples and evaluation of the field soil, we have a recommended soil treatment created for these conditions, we have catalogued the creation of this soil treatment all the way from the raw materials, to their refinement, to the fertilizer creation, we have shipping and tracking information, and a final sample of the soil. We additionally may have much more data which covers what was grown, the yield of those crops, weather, and irrigation information. All of this data collection however has occurred longitudinally, by various agents, but this data itself, is stored on a distributed file structure. Cumulatively, this creates an enormous obstacle for a would be bad actor to overcome, as it is much more complicated to create fraudulent entries when there are so many copies of the data, on disparate computers, and all of the data for a project has a certain degree of interconnectivity. That is to say, were a enroll attempt to defraud the system, there is a significant amount of data that will indicate that an anomaly is present and to be examined. While perhaps not impossible, it would take a significant amount of computing power and finesse to spoof or swap so much data so an enrollee could be awarded GHG offset credits for work that didn't occur.

It has also been contemplated that while the main focus of the disclosed method is towards greenhouse gas offset credits, there is reason to believe the same model can be simultaneously applied towards water quality or even just water use reduction credits. As irrigation data (8.3) is simply another data type, as with the soil health, water usage can also be monitored. As discussed previously, healthy soil has the benefit of retaining water, and transfers nutrition to plants more easily. It would be reasonable as such to believe that as an enrollee's soil health improves over the course of a project, there will be a reduction in water allocated to this same parcel, and potentially any runoff water will also be of a healthier condition. As such, there may lie the potential to award gas reduction credits, water use reduction credits, water quality credits, and so on, all on the basis of the same project if the data collection is sufficient to support validity through this same proof of work concept.

GHG Offset Credit Certification, Issuance, and Project Closeout (1.14; FIG. 9)

In terms of whether or not a credit can be issued, the entire purpose of the invention is aimed at answering if a particular project met the protocol requirements set forth (9.4) for it. This can be as simple as a comparison of most recent soil samples and their composition with the record of the initial state of the field and the estimated state that would be achieved by a participant faithfully following the prescribed protocol and using the soil amendments recommended. If the most recent soil samples are within acceptable range of the estimated soil composition, then a project can be deemed a success and greenhouse gas offset credits awarded. (9.6)

In order to do so, and because gas offsets are measured in volumetric tonnage, from the resulting soil composition and with the volume of the enrollees' parcel known, it can be recursively determined what amount of gas reduction occurred (9.5). On the basis of this recursive calculation then, the appropriate amount of credits can be then minted and certified (9.6) as a consequence of the successful project. Moreover, with the project's completion, the data stream which had been allocated to catalogue the projects data can be cleaned up and closed out (9.8), with the final copies being appended to the data storage partition of the blockchain.

What is gained in applying the described method though is that these particular carbon credits which have been minted are tied to physical processes which have been cataloged. Once this record is considered "fixed" on the blockchain itself, it is then also stored across a consortium of disparate networks and devices. As was already indicated above, this makes fraud nearly impossible, with the final product, a carbon offset, a number meant to indicate a reduction achieved as a result of behaviors, now being tied to verifiable physical processes with a complete genealogy that can explain specifically where this gas reduction occurred, in what amount, how it was achieved, and even the source of the raw materials which went into the soil amendments that helped achieve this result. This is a significant step up from the current state of carbon credits which lack any sort of chain of custody or title, or historical record.

This carries significant value as now individual credits can be traced and verified. Moreover, once a carbon credit is redeemed and applied towards someone's activities, this too can be accounted for, and a carbon credit can be indicated as exhausted on the blockchain/multichain (1.15).

In one embodiment, it may even be of benefit to tokenize the GHG offset credits themselves to track ownership of individual credits, to allow for individual to individual transfer or to allow the credits to be traded the same way more familiar stocks and commodities are currently traded (9.7).

Having a complete historical record tied to unique GHG credits is of course of significant importance to those who would be interested in purchasing carbon offsets on an open market as a purchaser can now come into the market after a significant amount of time may have passed, purchase one of these offsets, and then still be able to trace and validate that the credit is what it purports to be and that the credit has not already been redeemed previously. In a tokenized market, credit retirement would be tied to token death, that is once redeemed, a token could even be directed to a "burn" address and the ability to transfer any further removed entirely.

In other embodiments it may be of benefit to also track and account for weather (9.2) and its influence on final results or to separately (9.1) or additionally (9.3) also track and account for observed crop results to the yields the field had been producing prior to rehabilitation.

A final embodiment would again be consideration that what has been said and applied towards GHG reduction can simultaneously apply towards water use, so following the same logic, comparisons of use may be made, and applying the same principles, water reduction credits may be similarly minted and issued with the same historical backing, with the same open market implications.

What is claimed is:

1. A method of formulating novel humic material comprising:
   a. mixing one or more portions of Dimethylphenylpiperazinium (DMPP) with one or more portions of N-(N-butyl) thiophosphoric triamide (NBPT) to form a portion of non-organic biostimulant material;
   b. obtaining a portion of seaweed harvest and crushing and drying said portion of seaweed harvest to form a portion of seaweed powder;
   c. obtaining a portion of mined material and crushing said portion of mined material to form a portion of humic raw material;
   d. mixing one or more portions of animal manure with one or more portions of stover with one or more portions of organic waste to form a portion of composting mix and composting said composting mix to form a portion of composted product;
   e. obtaining a portion of plant waste and subjecting said portion of plant waste through an anaerobic combustion to form a portion of bio char;
   f. mixing said portion of bio char with said portion of composted product with said portion of humic raw material to form a portion of humic processed material;
   g. mixing said humic processed material with said portion of non-organic biostimulant material to form a portion of biostimulant humic product;
   h. adding a taggant to said portion of biostimulant humic product to form a portion of tagged biostimulant humic product;
   i. mixing one or more portions of phosphorus with a portion of potassium and a portion of nitrogen and a portion of trace minerals to form a portion of raw fertilizer;
   j. mixing said portion of raw fertilizer with said portion of tagged biostimulant humic product to form a portion of tagged fertilized biostimulant humic product.

2. The method of claim 1 wherein said method of formulating said novel humic material further comprises analyzing said tagged fertilized biostimulant humic product and generating a tagged fertilized biostimulant humic product report outlining said analysis and associating said tagged fertilized biostimulant humic product report to said tagged fertilized biostimulant humic product.

3. The method of claim 2 wherein said method of formulating novel humic material further comprises identifying a portion of farm land and analyzing a portion of soil of said farm land to generate a soil sample report of said portion of farm land and associating said soil sample report to said portion of farm land.

4. The method of claim 3 wherein said method of formulating novel humic material further comprises applying tagged fertilized biostimulant humic product to said portion of farm land and growing agriculture crop on said portion of farm land.

5. The method of claim 4 wherein said method of formulating novel humic material further comprises collecting a yield data of said crop to generate a yield report and analyze said yield report to verify the application of said tagged fertilized biostimulant humic product by comparing said yield report to said soil sample report and to said fertilized biostimulant humic product report and generating a carbon credit document for said application of said tagged fertilized biostimulant humic product.

6. The method of claim 5 wherein said carbon credit document is associated with said yield report and said soil report and said fertilized biostimulant humic product report.

7. The method of claim 6 wherein said method of associating said carbon credit document with said yield report and said soil report and said fertilized biostimulant humic product report is selected from a group consisting of utilizing blockchain data synchronization and utilizing multichain data synchronization.

8. The method of claim 3 wherein said method of associating said report to said tagged fertilized biostimulant humic product is selected from a group consisting of utilizing blockchain data synchronization and utilizing multichain data synchronization.

9. The method of claim 1 wherein said process of forming a portion of non-organic biostimulant material further comprises mixing with one or more portions of Isobutylidenediurea (IBDU).

10. The method of claim 9 wherein said process of forming a portion of non-biostimulant material further comprises mixing with one or more portions of Polyaspartic Acid.

11. The method of claim 10 wherein said process of forming a portion of non-organic biostimulant material further comprises mixing with one or more portions of Chitosan.

12. The method of claim 10 wherein said process of forming a portion of non-organic biostimulant material further comprises mixing with one or more portions of Mycorrhizae.

13. The method of claim 10 wherein said process of forming a portion of non-organic biostimulant material further comprises mixing with one or more portions of *Rhizobia*.

14. The method of claim 1 wherein said portion of humic processed material is in powder form.

15. The method of claim 1 wherein said portion of humic processed material is in liquid form.

16. The method of claim 1 wherein said mined material is selected from a group consisting of Leonardite, oxidized lignite, carbonaceous shales, and humates.

* * * * *